(12) United States Patent
Nakajima

(10) Patent No.: US 8,705,864 B2
(45) Date of Patent: Apr. 22, 2014

(54) MARKER GENERATION DEVICE, MARKER GENERATION DETECTION SYSTEM, MARKER GENERATION DETECTION DEVICE, MARKER, MARKER GENERATION METHOD, AND PROGRAM

(75) Inventor: Noboru Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 22 days.

(21) Appl. No.: 13/386,294

(22) PCT Filed: Jul. 22, 2010

(86) PCT No.: PCT/JP2010/062378
§ 371 (c)(1),
(2), (4) Date: Jan. 20, 2012

(87) PCT Pub. No.: WO2011/010703
PCT Pub. Date: Jan. 27, 2011

(65) Prior Publication Data
US 2012/0269446 A1    Oct. 25, 2012

(30) Foreign Application Priority Data
Jul. 23, 2009   (JP) ................................ 2009-171838

(51) Int. Cl.
*G06K 9/46*   (2006.01)
(52) U.S. Cl.
USPC ........................................................ 382/190
(58) Field of Classification Search
None
See application file for complete search history.

(56) References Cited

U.S. PATENT DOCUMENTS 5,412,487 A      5/1995   Nishimura et al.
2010/0104135 A1*  4/2010   Nakajima ..................... 382/103

FOREIGN PATENT DOCUMENTS

CN    1811793 A    8/2006

OTHER PUBLICATIONS

An Algorithm for Finding Maximal Whitespace Rectangle at Arbituary Orientation for Document Layout Analysis. Breuel. 2003.*
On the Optimal Detection of Curves in Noisy Pictures. Montanari et al. 1971.*
Separating Reflection Components of Textured Surfaces Using a Single Image. Tan et al. 2005.*
Breuel, "An Algorithm for Finding Maximal Whitespace Rectangle at Arbitrary Orientation for Document Layout Analysis", Seventh International Conference on Document Analysis and Recognition, vol. 1, Aug. 3-6, 2003, pp. 66-70.
Montanari, "On the Optimal Detection of Curves in Noisy Pictures", Communication of the ACM, vol. 14, No. 5, May 1971, pp. 335-345.
Tommasini et al, "Making Good Features Track Better", Proceedings of IEEE International Conference on Computer Vision and Pattern Recognition, 1998, 6 pages.

(Continued)

*Primary Examiner* — Stephen R Koziol
*Assistant Examiner* — Delomia Gilliard
(74) *Attorney, Agent, or Firm* — Sughrue Mion, PLLC

(57) ABSTRACT

Provided is a marker generation device which has a singular feature selection means and a marker pattern generation means. The singular feature selection means extracts feature points from an image, indicates the feature points in a predetermined space, and selects, as singular features, a plurality of parts where the number of feature points is equal to or less than a predetermined number in the space. The marker pattern generation means generates a plurality of kinds of marker patterns with the use of the whole or a part of the plurality of singular features.

19 Claims, 68 Drawing Sheets

(56) References Cited

OTHER PUBLICATIONS

Tan, et al., "Separating Reflection Components of Textured Surfaces Using a Single Image", IEEE Transactions on Pattern Analysis and Machine Intelligence, vol. 27, No. 2, Feb. 2005, pp. 178-193.
Finlayson, "On the Removal of Shadows from Images" IEEE Transactions on Pattern Analysis and Machine Intelligence, vol. 28, No. 1, Jan. 2006, pp. 59-68.
Pun, et al., "Log-Polar Wavelet Energy Signatures for Rotation and Scale Invariant Texture Classification", IEEE Transactions on Pattern analysis and Machine Intelligence, vol. 25, No. 5, May 2003, pp. 590-602.
Search Report dated Oct. 30, 2013, issued by the State Intellectual Property Office of the People's Republic of China in corresponding Application No. 201080032774.2.

* cited by examiner

FIG. 3

<FEATURE POINT DETECTION TABLE>

| A | B | C | D |
|---|---|---|---|
| k1 | $x_{k1}$ | $y_{k1}$ | 2 |
| k2 | $x_{k2}$ | $y_{k2}$ | 3 |
| k3 | $x_{k3}$ | $y_{k3}$ | 8 |
| k4 | $x_{k4}$ | $y_{k4}$ | 5 |
| k5 | $x_{k5}$ | $y_{k5}$ | 9 |
| k50 | $x_{k50}$ | $y_{k50}$ | 26 |
| k51 | $x_{k51}$ | $y_{k51}$ | 1 |
| k52 | $x_{k52}$ | $y_{k52}$ | 38 |
| k84 | $x_{k84}$ | $y_{k84}$ | 55 |
| k85 | $x_{k85}$ | $y_{k85}$ | 0 |
| k86 | $x_{k86}$ | $y_{k86}$ | 12 |
| k95 | $x_{k95}$ | $y_{k95}$ | 5 |
| k96 | $x_{k96}$ | $y_{k96}$ | 0 |
| k97 | $x_{k97}$ | $y_{k97}$ | 22 |

A: SEGMENT NUMBER
B: X COORDINATE OF SEGMENT
C: Y COORDINATE OF SEGMENT
D: FEATURE POINT NUMBER

FIG. 4
<UNIQUE FEATURE TABLE>
| A | B | C | D | E |
|---|---|---|---|---|
| t 1 | k51 | $x_{k51}$ | $y_{k51}$ | 1 |
| t 2 | k85 | $x_{k85}$ | $y_{k85}$ | 0 |
| t 3 | k96 | $x_{k96}$ | $y_{k96}$ | 0 |
| t 4 | k166 | $x_{k166}$ | $y_{k166}$ | 1 |
| t 5 | k230 | $x_{k230}$ | $y_{k230}$ | 0 |
A: UNIQUE FEATURE NUMBER
B: SEGMENT NUMBER
C: X COORDINATE OF SEGMENT
D: Y COORDINATE OF SEGMENT
E: FEATURE POINT NUMBER
FIG. 5
(FEATURE SPACE (UNIQUE FEATURE ARRANGEMENT DIAGRAM))
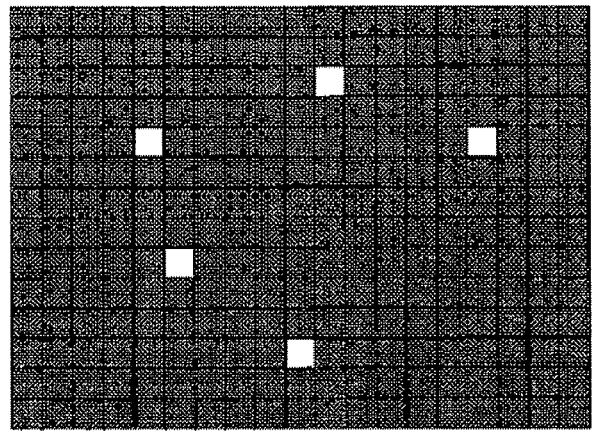
FIG. 6
(UNIQUE FEATURE)
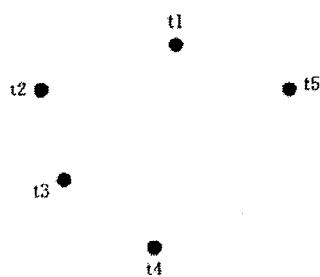

FIG. 7
<USE UNIQUE FEATURE COMBINATION TABLE>
| NUMBER OF UNIQUE FEATURES | COMBINATIONS OF USE UNIQUE FEATURES | NUMBER OF COMBINATIONS |
|---|---|---|
| 1 | t1　t2　t3　t4　t5 | 5 |
| 2 | t1-t2　t1-t3　t1-t4　t1-t5<br>t2-t3　t2-t4　t2-t5<br>t3-t4　t3-t5<br>t4-t5 | 10 |
| 3 | t1-t2-t3　t1-t2-t4　t1-t2-t5<br>t1-t3-t4　t1-t3-t5　t1-t4-t5<br>t2-t3-t4　t2-t3-t5　t2-t4-t5<br>t3-t4-t5 | 10 |
| 4 | t1-t2-t3-t4　t1-t2-t3-t5　t1-t2-t4-t5<br>t1-t3-t4-t5　t2-t3-t4-t5 | 5 |
| 5 | t1-t2-t3-t4-t5 | 1 |
| | | 31 OPTIONS |
FIG. 8
(MARKER PATTERN)
```
      t1
      +
t2 +     + t5
t3 +
      +
      t4
```
(i)　　　(ii)　　　(iii)　　　(iv)

(MARKER PATTERN)

(i) SELECTING "t1-t2-t3-t4"   (ii) SELECTING "t1-t2-t3-t5"   (iii) SELECTING "t1-t2-t4-t5"   (iv) SELECTING "t1-t3-t4-t5"

(DISTANCE BETWEEN UNIQUE FEATURES)

FIG. 11

<INTER-UNIQUE-FEATURE DISTANCE CALCULATION TABLE>

| USE UNIQUE FEATURE | COMPUTATION EQUATION | SUM TOTAL |
|---|---|---|
| t1 | - | 0 |
| t2 | - | 0 |
| t3 | - | 0 |
| t4 | - | 0 |
| t5 | - | 0 |
| t1, t2 | t1-2 | 6.3246 |
| t1, t3 | t1-3 | 7.8102 |
| t1, t4 | t1-4 | 9.0554 |
| t1, t5 | t1-5 | 5.3852 |
| t2, t3 | t2-3 | 4.1231 |
| t2, t4 | t2-4 | 8.6023 |
| t2, t5 | t2-5 | 11.0000 |
| t3, t4 | t3-4 | 5.0000 |
| t3, t5 | t3-5 | 10.7703 |
| t4, t5 | t4-5 | 9.2195 |
| t1, t2, t3 | (t1-2)+(t1-3)+(t2-3) | 18.2579 |
| t1, t2, t4 | (t1-2)+(t1-4)+(t2-4) | 23.9823 |
| t1, t2, t5 | (t1-2)+(t1-5)+(t2-5) | 22.7098 |
| t1, t3, t4 | (t1-3)+(t1-4)+(t3-4) | 21.8656 |
| t1, t3, t5 | (t1-3)+(t1-5)+(t3-5) | 23.9657 |
| t1, t4, t5 | (t1-4)+(t1-5)+(t4-5) | 23.6601 |
| t2, t3, t4 | (t2-3)+(t2-4)+(t3-4) | 17.7254 |
| t2, t3, t5 | (t2-3)+(t2-5)+(t3-5) | 25.8934 |
| t2, t4, t5 | (t2-4)+(t2-5)+(t4-5) | 28.8218 |
| t3, t4, t5 | (t3-4)+(t3-5)+(t4-5) | 24.9898 |
| t1, t2, t3, t4 | (t1-2)+(t1-3)+(t1-4)+(t2-3)+(t2-4)+(t3-4) | 40.9156 |
| t1, t2, t3, t5 | (t1-2)+(t1-3)+(t1-5)+(t2-3)+(t2-5)+(t3-5) | 45.4134 |
| t1, t2, t4, t5 | (t1-2)+(t1-4)+(t1-5)+(t2-4)+(t2-5)+(t4-5) | 49.5870 |
| t1, t3, t4, t5 | (t1-3)+(t1-4)+(t1-5)+(t3-4)+(t3-5)+(t4-5) | 47.2406 |
| t2, t3, t4, t5 | (t2-3)+(t2-4)+(t2-5)+(t3-4)+(t3-5)+(t4-5) | 48.7152 |
| t1, t2, t3, t4, t5 | (t1-2)+(t1-3)+(t1-4)+(t1-5)+(t2-3)+(t2-4)+(t2-5)+(t3-4)+(t3-5)+(t4-5) | 77.2906 |

FIG. 12

(COMBINATIONS IN CASE OF SELECTING TWO USE UNIQUE FEATURE GROUPS CONFIGURED OF THREE UNIQUE FEATURES)

| (t1, t2, t3) -(t1, t2, t4) | (t1, t2, t4) -(t1, t2, t5) | (t1, t2, t5) -(t1, t3, t4) | (t1, t3, t4) -(t1, t3, t5) | (t1, t3, t5) -(t1, t4, t5) | (t1, t4, t5) -(t2, t3, t4) | (t2, t3, t4) -(t2, t3, t5) | (t2, t3, t5) -(t2, t4, t5) | (t2, t4, t5) -(t3, t4, t5) |
|---|---|---|---|---|---|---|---|---|
| (t1, t2, t3) -(t1, t2, t5) | (t1, t2, t4) -(t1, t3, t4) | (t1, t2, t5) -(t1, t3, t5) | (t1, t3, t4) -(t1, t4, t5) | (t1, t3, t5) -(t2, t3, t4) | (t1, t4, t5) -(t2, t3, t5) | (t2, t3, t4) -(t2, t4, t5) | (t2, t3, t5) -(t3, t4, t5) | |
| (t1, t2, t3) -(t1, t3, t4) | (t1, t2, t4) -(t1, t3, t5) | (t1, t2, t5) -(t1, t4, t5) | (t1, t3, t4) -(t2, t3, t4) | (t1, t3, t5) -(t2, t3, t5) | (t1, t4, t5) -(t2, t4, t5) | (t2, t3, t4) -(t3, t4, t5) | | |
| (t1, t2, t3) -(t1, t3, t5) | (t1, t2, t4) -(t1, t4, t5) | (t1, t2, t5) -(t2, t3, t4) | (t1, t3, t4) -(t2, t3, t5) | (t1, t3, t5) -(t2, t4, t5) | (t1, t4, t5) -(t3, t4, t5) | | | |
| (t1, t2, t3) -(t1, t4, t5) | (t1, t2, t4) -(t2, t3, t4) | (t1, t2, t5) -(t2, t3, t5) | (t1, t3, t4) -(t2, t4, t5) | (t1, t3, t5) -(t3, t4, t5) | | | | |
| (t1, t2, t3) -(t2, t3, t4) | (t1, t2, t4) -(t2, t3, t5) | (t1, t2, t5) -(t2, t4, t5) | (t1, t3, t4) -(t3, t4, t5) | | | | | |
| (t1, t2, t3) -(t2, t3, t5) | (t1, t2, t4) -(t2, t4, t5) | (t1, t2, t5) -(t3, t4, t5) | | | | | | |
| (t1, t2, t3) -(t2, t4, t5) | (t1, t2, t4) -(t3, t4, t5) | | | | | | | |
| (t1, t2, t3) -(t3, t4, t5) | | | | | | | | |

(DISTANCE BETWEEN UNIQUE FEATURES)

FIG. 14

(SUM TOTAL OF RESPECTIVE DISTANCES BETWEEN UNIQUE FEATURES IN TWO USE UNIQUE FEATURE GROUPS)

| | | | | | | | | |
|---|---|---|---|---|---|---|---|---|
| 47.2402 | 55.9115 | 61.2907 | 55.0509 | 52.6258 | 67.7824 | 52.8384 | 59.7153 | 57.9348 |
| 51.7380 | 49.9710 | 50.7986 | 56.2961 | 63.3032 | 64.1122 | 57.3176 | 59.4856 | |
| 48.7259 | 57.9180 | 54.9721 | 45.9156 | 56.1837 | 58.8065 | 53.7153 | | |
| 53.2237 | 58.6424 | 66.9055 | 57.2353 | 62.6585 | 56.4602 | | | |
| 63.9480 | 49.5179 | 56.4134 | 58.4804 | 58.0110 | | | | |
| 45.0387 | 57.4649 | 60.5870 | 55.0509 | | | | | |
| 49.5365 | 58.1909 | 65.9661 | | | | | | |
| 60.2609 | 60.1958 | | | | | | | |
| 61.7466 | | | | | | | | |

(TWO SELECTED USE UNIQUE FEATURE GROUPS)

FIG. 16
(i) WHEN SUPERPOSING UNIQUE FEATURE t3' OF USE UNIQUE FEATURE GROUP β UPON UNIQUE FEATURE t1 OF USE UNIQUE FEATURE GROUP α
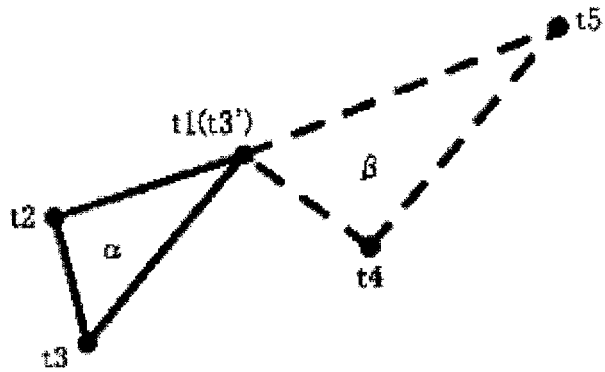
(ii) WHEN SUPERPOSING UNIQUE FEATURE t4 OF USE UNIQUE FEATURE GROUP β UPON UNIQUE FEATURE t1 OF USE UNIQUE FEATURE GROUP α
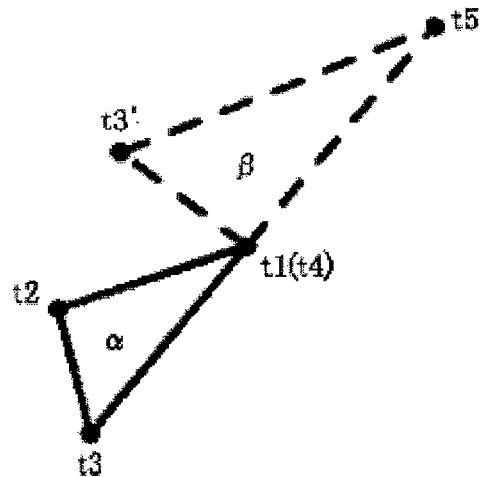
(iii) WHEN SUPERPOSING UNIQUE FEATURE t5 OF USE UNIQUE FEATURE GROUP β UPON UNIQUE FEATURE t1 OF USE UNIQUE FEATURE GROUP α
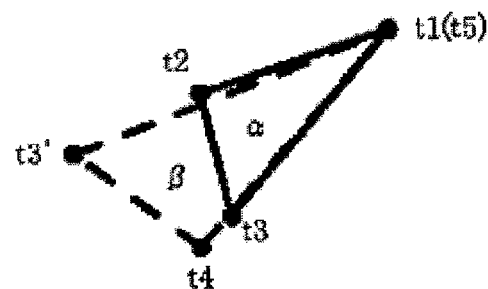

FIG. 17
(i)
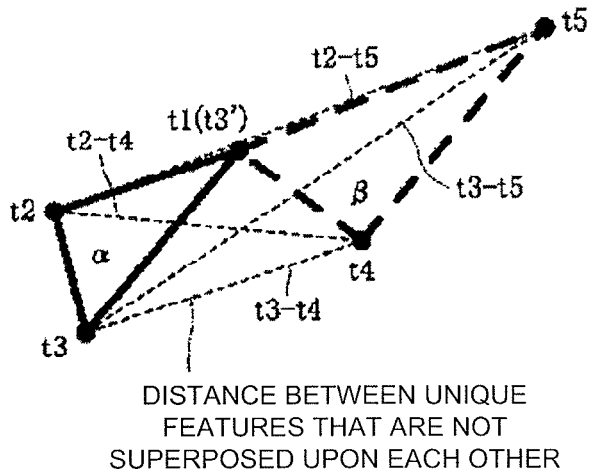
DISTANCE BETWEEN UNIQUE
FEATURES THAT ARE NOT
SUPERPOSED UPON EACH OTHER
(ii)
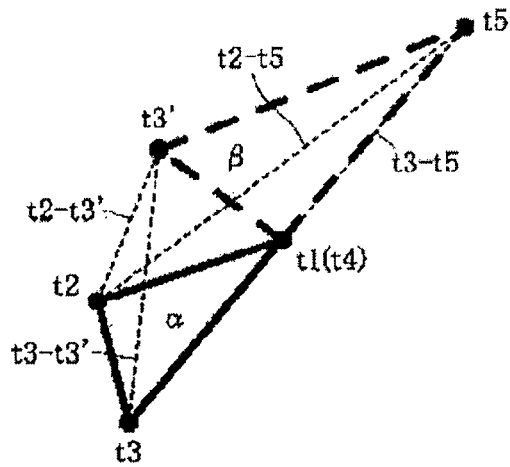
(iii)
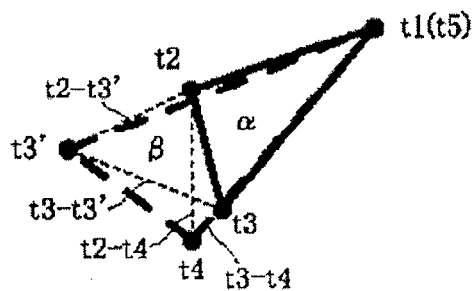

| | |
|---|---|
| (t2-t4) | 10.0499 |
| (t2-t5) | 17.0880 |
| (t3-t4) | 9.4868 |
| (t3-t5) | 18.0278 |
| SUM TOTAL | 54.6525 |

(ii)

| | |
|---|---|
| (t2-t3') | 5.3852 |
| (t2-t5) | 15.0000 |
| (t3-t3') | 9.0554 |
| (t3-t5) | 17.0294 |
| SUM TOTAL | 46.4699 |

(iii)

| | |
|---|---|
| (t2-t3') | 4.4721 |
| (t2-t4) | 5.0000 |
| (t3-t3') | 5.3852 |
| (t3-t4) | 1.4142 |
| SUM TOTAL | 16.2715 |

FIG. 19

(SUM TOTAL OF RESPECTIVE DISTANCES BETWEEN UNIQUE FEATURES THAT ARE NOT SUPERPOSED)

| β \ α | t1 | t2 | t3 |
|---|---|---|---|
| t3' | 54.6525 | 25.0612 | 34.0429 |
| t4 | 46.4699 | 35.7352 | 18.5168 |
| t5 | 16.2715 | 50.7038 | 59.1818 |

FIG. 20

(SHAPE APPROXIMATION)

| | | | | | | | | |
|---|---|---|---|---|---|---|---|---|
| | | | | | | | | 17.7254 |
| | | | | | | | 17.7254 | 17.7254 |
| | | | | | | 24.9899 | 24.9899 | 25.8934 |
| | | | | | 21.1819 | 27.7371 | 22.7097 | 21.8656 |
| | | | | 21.8656 | 25.8466 | 18.2579 | 24.5030 | 22.6966 |
| | | | 23.6601 | 23.9657 | 18.2579 | 29.5316 | 26.6032 | 23.6601 |
| | | 24.8662 | 18.2579 | 23.9823 | 27.7596 | 18.2579 | 23.6601 | 21.5962 |
| | 23.6601 | 17.7254 | 29.3427 | 22.7097 | 18.2579 | 27.4150 | 22.7097 | 25.1529 |
| 17.7254 | 23.9657 | 23.0343 | 28.5213 | 19.4152 | 17.3799 | 22.7097 | 20.2847 | 16.2715 | b: SHAPE APPROXIMATION CALCULATED FOR ALL
  COMBINATIONS OF USE UNIQUE FEATURE GROUPS?

(ALLOCATION OF USE UNIQUE FEATURE GROUPS TO OBJECTS)

( i )

| OBJECT |
|---|
| a |
| b |
| c |
| d |
| e |
| f |
| g |
| h |

( ii )

| USE UNIQUE FEATURE GROUP | NUMBER |
|---|---|
| t1, t2, t3 | 1 |
| t1, t2, t4 | 2 |
| t1, t2, t5 | 3 |
| t1, t3, t4 | 4 |
| t1, t3, t5 | 5 |
| t1, t4, t5 | 6 |
| t2, t3, t4 | 7 |
| t2, t3, t5 | 8 |
| t2, t4, t5 | 9 |
| t3, t4, t5 | 10 |

(iii)

| OBJECT | USE UNIQUE FEATURE GROUP |
|---|---|
| a | t1, t2, t3 |
| b | t1, t2, t4 |
| c | t1, t2, t5 |
| d | t1, t3, t4 |
| e | t1, t3, t5 |
| f | t1, t4, t5 |
| g | t2, t3, t4 |
| h | t2, t3, t5 |

FIG. 28

(LEVENSHTEIN DISTANCE BETWEEN USE UNIQUE FEATURE GROUPS)

| n \ m | 1 | 2 | 3 | 4 | 5 | 6 | 7 | 8 | 9 | 10 |
|---|---|---|---|---|---|---|---|---|---|---|
| 10 | 3 | 3 | 2 | 3 | 2 | 1 | 3 | 2 | 1 | |
| 9 | 3 | 3 | 2 | 3 | 2 | 1 | 2 | 1 | | |
| 8 | 3 | 3 | 2 | 2 | 1 | 2 | 1 | | | |
| 7 | 3 | 2 | 3 | 1 | 2 | 3 | | | | |
| 6 | 2 | 2 | 1 | 2 | 1 | | | | | |
| 5 | 2 | 2 | 1 | 1 | | | | | | |
| 4 | 2 | 1 | 2 | | | | | | | |
| 3 | 1 | 1 | | | | | | | | |
| 2 | 1 | | | | | | | | | |
| 1 | | | | | | | | | | | m, n: NUMBER OF USE UNIQUE FEATURE GROUP

FIG. 29

<ARRANGEMENT OF USE UNIQUE FEATURE GROUPS>

(i)

| NUMBER | USE UNIQUE FEATURE GROUP |
|---|---|
| 2 (REFERENCE) | t1, t2, t4 |
| 1 | t1, t2, t3 |
| 3 | t1, t2, t5 |
| 4 | t1, t3, t4 |
| 5 | t1, t3, t5 |
| 6 | t1, t4, t5 |
| 7 | t2, t3, t4 |
| 8 | t2, t3, t5 |
| 9 | t2, t4, t5 |
| 10 | t3, t4, t5 |

(ii)

| NUMBER | USE UNIQUE FEATURE GROUP |
|---|---|
| 8 (REFERENCE) | t2, t3, t5 |
| 5 | t1, t3, t5 |
| 7 | t2, t3, t4 |
| 9 | t2, t4, t5 |
| 3 | t1, t2, t5 |
| 4 | t1, t3, t4 |
| 6 | t1, t4, t5 |
| 10 | t3, t4, t5 |
| 1 | t1, t2, t3 |
| 2 | t1, t2, t4 |

FIG. 30

(DISTANCE BETWEEN USE UNIQUE FEATURE GROUP (t1,t2,t3), BEING REFERENCE, AND EACH OF OTHER USE UNIQUE FEATURE GROUPS)

| 1(REFERENCE) | (t1, t2, t3) | 0 |
|---|---|---|

| | | |
|---|---|---|
| 2 | (t1, t2, t4) | 47.2402 |
| 3 | (t1, t2, t5) | 51.7380 |
| 4 | (t1, t3, t4) | 48.7259 |
| 5 | (t1, t3, t5) | 53.2237 |
| 6 | (t1, t4, t5) | 63.9480 |
| 7 | (t2, t3, t4) | 45.0387 |
| 8 | (t2, t3, t5) | 49.5365 |
| 9 | (t2, t4, t5) | 60.2609 |
| 10 | (t3, t4, t5) | 61.7466 |

FIG. 31

(ARRANGEMENT EMPLOYING DISTANCE BETWEEN TWO
USE UNIQUE FEATURE GROUPS)

| 1(REFERENCE) | (t1, t2, t3) | 0 |
|---|---|---|
| 7 | (t2, t3, t4) | 45.0387 |
| 2 | (t1, t2, t4) | 47.2402 |
| 4 | (t1, t3, t4) | 48.7259 |
| 8 | (t2, t3, t5) | 49.5365 |
| 3 | (t1, t2, t5) | 51.7380 |
| 5 | (t1, t3, t5) | 53.2237 |
| 9 | (t2, t4, t5) | 60.2609 |
| 10 | (t3, t4, t5) | 61.7466 |
| 6 | (t1, t4, t5) | 63.9480 |

FIG. 32

(DISTANCE BETWEEN USE UNIQUE FEATURE GROUP (t1,t2,t4), BEING REFERENCE, AND EACH OF OTHER USE UNIQUE FEATURE GROUPS)

| 2(REFERENCE) | (t1, t2, t4) | 0 |
|---|---|---|

| | | |
|---|---|---|
| 1 | (t1, t2, t3) | 47.2402 |
| 3 | (t1, t2, t5) | 55.9115 |
| 4 | (t1, t3, t4) | 49.9710 |
| 5 | (t1, t3, t5) | 57.9180 |
| 6 | (t1, t4, t5) | 58.6424 |
| 7 | (t2, t3, t4) | 49.5179 |
| 8 | (t2, t3, t5) | 57.4649 |
| 9 | (t2, t4, t5) | 58.1909 |
| 10 | (t3, t4, t5) | 60.1958 |

FIG. 33

(ARRANGEMENT EMPLOYING DISTANCE BETWEEN
TWO USE UNIQUE FEATURE GROUPS)

| 2(REFERENCE) | (t1, t2, t4) | 0 |
|---|---|---|
| 1 | (t1, t2, t3) | 47.2402 |
| 7 | (t2, t3, t4) | 49.5179 |
| 4 | (t1, t3, t4) | 49.9710 |
| 3 | (t1, t2, t5) | 55.9115 |
| 8 | (t2, t3, t5) | 57.4649 |
| 5 | (t1, t3, t5) | 57.9180 |
| 9 | (t2, t4, t5) | 58.1909 |
| 6 | (t1, t4, t5) | 58.6424 |
| 10 | (t3, t4, t5) | 60.1958 |

FIG. 34

(DISTANCE BETWEEN USE UNIQUE FEATURE GROUP (t2,t3,t5), BEING REFERENCE, AND EACH OF OTHER USE UNIQUE FEATURE GROUPS)

| 8(REFERENCE) | (t2, t3, t5) | 0 |
|---|---|---|

| | | |
|---|---|---|
| 1 | (t1, t2, t3) | 49.5365 |
| 2 | (t1, t2, t4) | 57.4649 |
| 3 | (t1, t2, t5) | 56.4134 |
| 4 | (t1, t3, t4) | 57.2353 |
| 5 | (t1, t3, t5) | 56.1837 |
| 6 | (t1, t4, t5) | 64.1122 |
| 7 | (t2, t3, t4) | 52.8384 |
| 9 | (t2, t4, t5) | 59.7153 |
| 10 | (t3, t4, t5) | 59.4856 |

FIG. 35

(ARRANGEMENT EMPLOYING DISTANCE BETWEEN
TWO USE UNIQUE FEATURE GROUPS)

| 8(REFERENCE) | (t2, t3, t5) | 0 |
|---|---|---|
| 1 | (t1, t2, t3) | 49.5365 |
| 7 | (t2, t3, t4) | 52.8384 |
| 5 | (t1, t3, t5) | 56.1837 |
| 3 | (t1, t2, t5) | 56.4134 |
| 4 | (t1, t3, t4) | 57.2353 |
| 2 | (t1, t2, t4) | 57.4649 |
| 10 | (t3, t4, t5) | 59.4856 |
| 9 | (t2, t4, t5) | 59.7153 |
| 6 | (t1, t4, t5) | 64.1122 |

FIG. 36

(SHAPE APPROXIMATION BETWEEN USE UNIQUE FEATURE GROUP (t1,t2,t3), BEING REFERENCE, AND EACH OF OTHER USE UNIQUE FEATURE GROUPS)

| 1(REFERENCE) | (t1, t2, t3) | 0 |
|---|---|---|

| 2 | (t1, t2, t4) | 17.7254 |
|---|---|---|
| 3 | (t1, t2, t5) | 23.9657 |
| 4 | (t1, t3, t4) | 23.0343 |
| 5 | (t1, t3, t5) | 28.5213 |
| 6 | (t1, t4, t5) | 19.4152 |
| 7 | (t2, t3, t4) | 17.3799 |
| 8 | (t2, t3, t5) | 22.7097 |
| 9 | (t2, t4, t5) | 20.2847 |
| 10 | (t3, t4, t5) | 16.2715 |

FIG. 37

(ARRANGEMENT EMPLOYING SHAPE APPROXIMATION
BETWEEN TWO MARKERS)

| 1(REFERENCE) | (t1, t2, t3) | 0 |
|---|---|---|
| 10 | (t3, t4, t5) | 16.2715 |
| 7 | (t2, t3, t4) | 17.3799 |
| 2 | (t1, t2, t4) | 17.7254 |
| 6 | (t1, t4, t5) | 19.4152 |
| 9 | (t2, t4, t5) | 20.2847 |
| 8 | (t2, t3, t5) | 22.7097 |
| 4 | (t1, t3, t4) | 23.0343 |
| 3 | (t1, t2, t5) | 23.9657 |
| 5 | (t1, t3, t5) | 28.5213 |

FIG. 38

(SHAPE APPROXIMATION BETWEEN USE UNIQUE FEATURE GROUP (t1,t2,t4), BEING REFERENCE, AND EACH OF OTHER USE UNIQUE FEATURE GROUPS)

| 2(REFERENCE) | (t1, t2, t4) | 0 |
|---|---|---|

| | | |
|---|---|---|
| 1 | (t1, t2, t3) | 17.7254 |
| 3 | (t1, t2, t5) | 23.6601 |
| 4 | (t1, t3, t4) | 17.7254 |
| 5 | (t1, t3, t5) | 29.3427 |
| 6 | (t1, t4, t5) | 22.7097 |
| 7 | (t2, t3, t4) | 18.2579 |
| 8 | (t2, t3, t5) | 27.4150 |
| 9 | (t2, t4, t5) | 22.7097 |
| 10 | (t3, t4, t5) | 25.1529 |

FIG. 39

(ARRANGEMENT EMPLOYING SHAPE
APPROXIMATION BETWEEN TWO MARKERS)

| 2(REFERENCE) | (t1, t2, t4) | 0 |
|---|---|---|
| 1 | (t1, t2, t3) | 17.7254 |
| 4 | (t1, t3, t4) | 17.7254 |
| 7 | (t2, t3, t4) | 18.2579 |
| 6 | (t1, t4, t5) | 22.7097 |
| 9 | (t2, t4, t5) | 22.7097 |
| 3 | (t1, t2, t5) | 23.6601 |
| 10 | (t3, t4, t5) | 25.1529 |
| 8 | (t2, t3, t5) | 27.4150 |
| 5 | (t1, t3, t5) | 29.3427 |

FIG. 40

(SHAPE APPROXIMATION BETWEEN USE UNIQUE FEATURE GROUP (t2,t3,t5), BEING REFERENCE, AND EACH OF OTHER USE UNIQUE FEATURE GROUPS)

| 8(REFERENCE) | (t2, t3, t5) | 0 |
|---|---|---|
| 1 | (t1, t2, t3) | 22.7097 |
| 2 | (t1, t2, t4) | 27.4150 |
| 3 | (t1, t2, t5) | 18.2579 |
| 4 | (t1, t3, t4) | 29.5316 |
| 5 | (t1, t3, t5) | 18.2579 |
| 6 | (t1, t4, t5) | 27.7371 |
| 7 | (t2, t3, t4) | 24.9899 |
| 9 | (t2, t4, t5) | 17.7254 |
| 10 | (t3, t4, t5) | 17.7254 |

FIG. 41

(ARRANGEMENT EMPLOYING SHAPE
APPROXIMATION BETWEEN TWO MARKERS)

| 8(REFERENCE) | (t2, t3, t5) | 0 |
|---|---|---|
| 9 | (t2, t4, t5) | 17.7254 |
| 10 | (t3, t4, t5) | 17.7254 |
| 3 | (t1, t2, t5) | 18.2579 |
| 5 | (t1, t3, t5) | 18.2579 |
| 1 | (t1, t2, t3) | 22.7097 |
| 7 | (t2, t3, t4) | 24.9899 |
| 2 | (t1, t2, t4) | 27.4150 |
| 6 | (t1, t4, t5) | 27.7371 |
| 4 | (t1, t3, t4) | 29.5316 |

FIG. 42

(SHAPE APPROXIMATION)

| | | | | | | | | |
|---|---|---|---|---|---|---|---|---|
| 17.7254 | | | | | | | | |
| 17.7254 | 17.7254 | | | | | | | |
| 24.9899 | 24.9899 | 25.8934 | | | | | | |
| 21.1819 | 27.7371 | 22.7097 | 21.8656 | | | | | |
| 21.8656 | 25.8466 | 18.2579 | 24.5030 | 22.6966 | | | | |
| 23.6601 | 23.9657 | 18.2579 | 29.5316 | 26.6032 | 23.6601 | | | |
| 24.8662 | 18.2579 | 23.9823 | 27.7596 | 18.2579 | 23.6601 | 21.5962 | | |
| 23.6601 | 17.7254 | 29.3427 | 22.7097 | 18.2579 | 27.4150 | 22.7097 | 25.1529 | |
| 17.7254 | 23.9657 | 23.0343 | 28.5213 | 19.4152 | 17.3799 | 22.7097 | 20.2847 | 16.2715 |

FIG. 43

(ARRANGEMENT EMPLOYING SHAPE APPROXIMATION BETWEEN TWO MARKERS)

| 4(REFERENCE) | (t1, t3, t4) | 0 |
|---|---|---|
| 2 | (t1, t2, t4) | 17.7254 |
| 7 | (t2, t3, t4) | 18.2579 |
| 1 | (t1, t2, t3) | 23.0343 |
| 5 | (t1, t3, t5) | 23.6601 |
| 10 | (t3, t4, t5) | 23.6601 |
| 6 | (t1, t4, t5) | 23.9657 |
| 3 | (t1, t2, t5) | 24.8662 |
| 9 | (t2, t4, t5) | 26.6032 |
| 8 | (t2, t3, t5) | 29.5316 |

FIG. 44

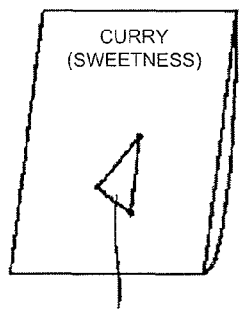
CURRY (SWEETNESS)

MARKER BASED UPON USE UNIQUE FEATURE GROUP OF No. "4"

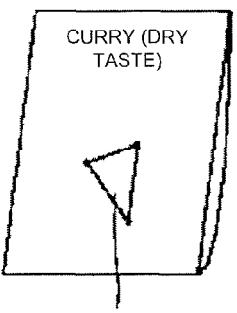
CURRY (DRY TASTE)

MARKER BASED UPON USE UNIQUE FEATURE GROUP OF No. "2"

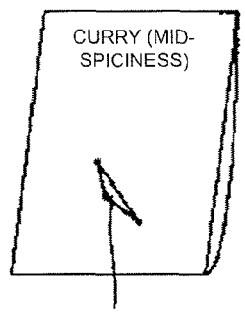
CURRY (MID-SPICINESS)

MARKER BASED UPON USE UNIQUE FEATURE GROUP OF No. "7"

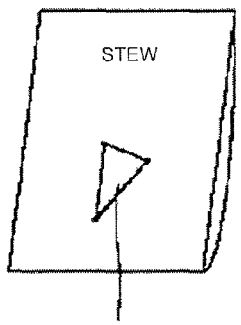
STEW

MARKER BASED UPON USE UNIQUE FEATURE GROUP OF No. "6"

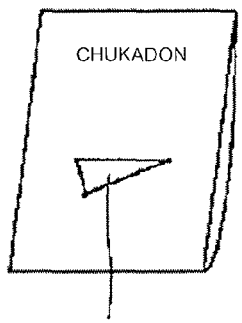
CHUKADON

MARKER BASED UPON USE UNIQUE FEATURE GROUP OF No. "8"

FIG. 45

<OBJECT-MARKER CORRESPONDENCE TABLE>

| A | B |
|---|---|
| CURRY (SWEETNESS) | 4 |
| CURRY (DRY TASTE) | 2 |
| CURRY (MID-SPICINESS) | 7 |
| STEW | 6 |
| CHUKADON | 8 |

A: KIND OF OBJECT
B: NO. OF USE UNIQUE FEATURE GROUP (BACKGROUND VIDEO IMAGE)

(FEATURE SPACE)

FIG. 53

<FEATURE POINT INFORMATION TABLE>

| A | B | C | D | E | F |
|---|---|---|---|---|---|
| i-11 | 1 | $x_{1001}$ | $y_{1001}$ | | EDGE |
| | 2 | $x_{1002}$ | $y_{1002}$ | | INTERSECTION |
| | 3 | $x_{1003}$ | $y_{1003}$ | | EDGE, RED, BRIGHTNESS 52% |
| | 4 | $x_{1004}$ | $y_{1004}$ | | |
| | 5 | $x_{1005}$ | $y_{1005}$ | | |
| | | | | | |

A: SERIAL NUMBER OF FRAME IMAGE
B: SERIAL NUMBER OF FEATURE POINT
C: X COORDINATE OF FEATURE POINT
D: Y COORDINATE OF FEATURE POINT
E: COORDINATE OF SEGMENT IN WHICH FEATURE POINT IS POSITIONED
F: INFORMATION RELATED TO FEATURE POINT

FIG. 56

<SEGMENT COORDINATE TABLE>

|  | x1 | x2 | x3 | x4 |  |
|---|---|---|---|---|---|
| y1 | SEGMENT (1,1) COORDINATE (x1,y1) | SEGMENT (2,1) COORDINATE (x2,y1) | SEGMENT (3,1) COORDINATE (x3,y1) | SEGMENT (4,1) COORDINATE (x4,y1) |  |
| y2 | SEGMENT (1,2) COORDINATE (x1,y2) | SEGMENT (2,2) COORDINATE (x2,y2) | SEGMENT (3,2) COORDINATE (x3,y2) | SEGMENT (4,2) COORDINATE (x4,y2) |  |
| y3 | SEGMENT (1,3) COORDINATE (x1,y3) | SEGMENT (2,3) COORDINATE (x2,y3) | SEGMENT (3,3) COORDINATE (x3,y3) | SEGMENT (4,3) COORDINATE (x4,y3) |  |
| y4 | SEGMENT (1,4) COORDINATE (x1,y4) | SEGMENT (2,4) COORDINATE (x2,y4) | SEGMENT (3,4) COORDINATE (x3,y4) | SEGMENT (4,4) COORDINATE (x4,y4) |  |
|  |  |  |  |  |  |

FIG. 57

<FEATURE POINT NUMBER DISTRIBUTION DIAGRAM>

| 0 | 0 | 0 | 0 | 0 | 0 | 1 | 0 | 0 | 0 | 0 | 0 | 0 | 0 | 0 | 0 |
|---|---|---|---|---|---|---|---|---|---|---|---|---|---|---|---|
| 0 | 0 | 0 | 1 | 1 | 2 | 1 | 2 | 2 | 1 | 0 | 0 | 0 | 1 | 1 | 1 |
| 1 | 2 | 2 | 0 | 0 | 4 | 2 | 4 | 2 | 0 | 0 | 0 | 0 | 1 | 3 | 0 |
| 1 | 3 | 0 | 0 | 2 | 0 | 0 | 0 | 1 | 0 | 1 | 1 | 2 | 4 | 3 | 0 |
| 2 | 3 | 0 | 0 | 1 | 0 | 0 | 0 | 0 | 0 | 0 | 0 | 3 | 3 | 4 | 0 |
| 0 | 2 | 1 | 0 | 0 | 0 | 0 | 0 | 0 | 0 | 0 | 0 | 4 | 3 | 2 | 0 |
| 1 | 0 | 2 | 1 | 0 | 0 | 0 | 0 | 0 | 0 | 0 | 0 | 3 | 0 | 0 | 0 |
| 0 | 0 | 0 | 0 | 0 | 0 | 0 | 0 | 0 | 0 | 1 | 1 | 0 | 0 | 0 | 0 |

FIG. 58

<FEATURE POINT INFORMATION TABLE>

| A | B | C | D | E | F |
|---|---|---|---|---|---|
| i-11 | 1 | $x_{1001}$ | $y_{1001}$ | (x7, y1) | EDGE |
| | 2 | $x_{1002}$ | $y_{1002}$ | (x5, y2) | INTERSECTION |
| | 3 | $x_{1003}$ | $y_{1003}$ | (x9, y2) | EDGE, RED, BRIGHTNESS 52% |
| | 4 | $x_{1004}$ | $y_{1004}$ | (x14, y2) | |
| | 5 | $x_{1005}$ | $y_{1005}$ | (x15, y2) | |

A: SERIAL NUMBER OF FRAME IMAGE
B: SERIAL NUMBER OF FEATURE POINT
C: X COORDINATE OF FEATURE POINT
D: Y COORDINATE OF FEATURE POINT
E: COORDINATE OF SEGMENT IN WHICH FEATURE POINT IS POSITIONED
F: INFORMATION RELATED TO FEATURE POINT

FIG. 59

(UNIQUE FEATURE ARRANGEMENT DIAGRAM)

FIG. 60

(UNIQUE FEATURE ARRANGEMENT DIAGRAM)

(INVARIANT FEATURE SPACE)

(INVARIANT FEATURE SPACE)

(INVARIANT FEATURE SPACE)

(MARKER PATTERN GENERATION SCOPE)

(DETECTION-TARGETED VIDEO IMAGE)

(FEATURE SPACE)

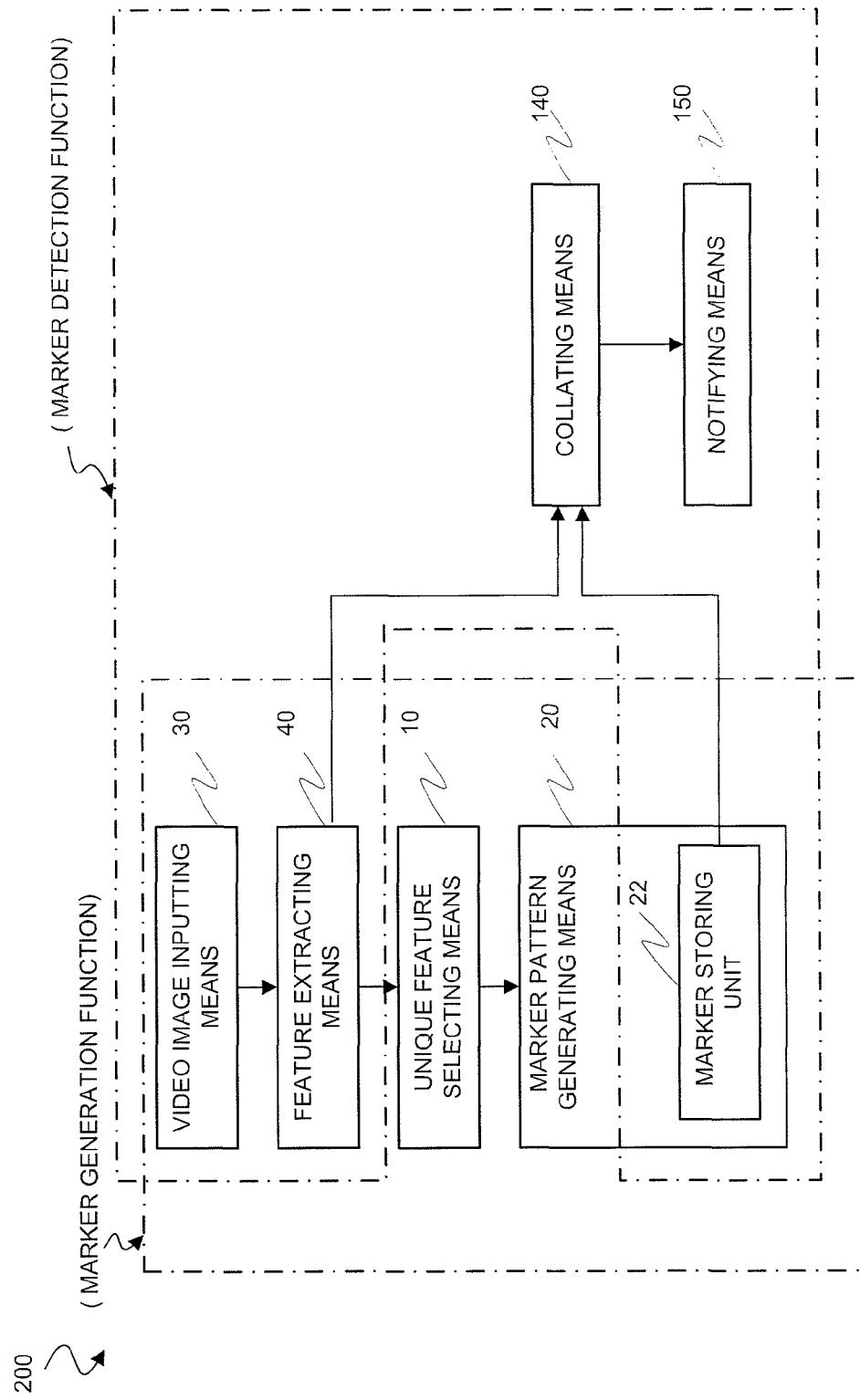

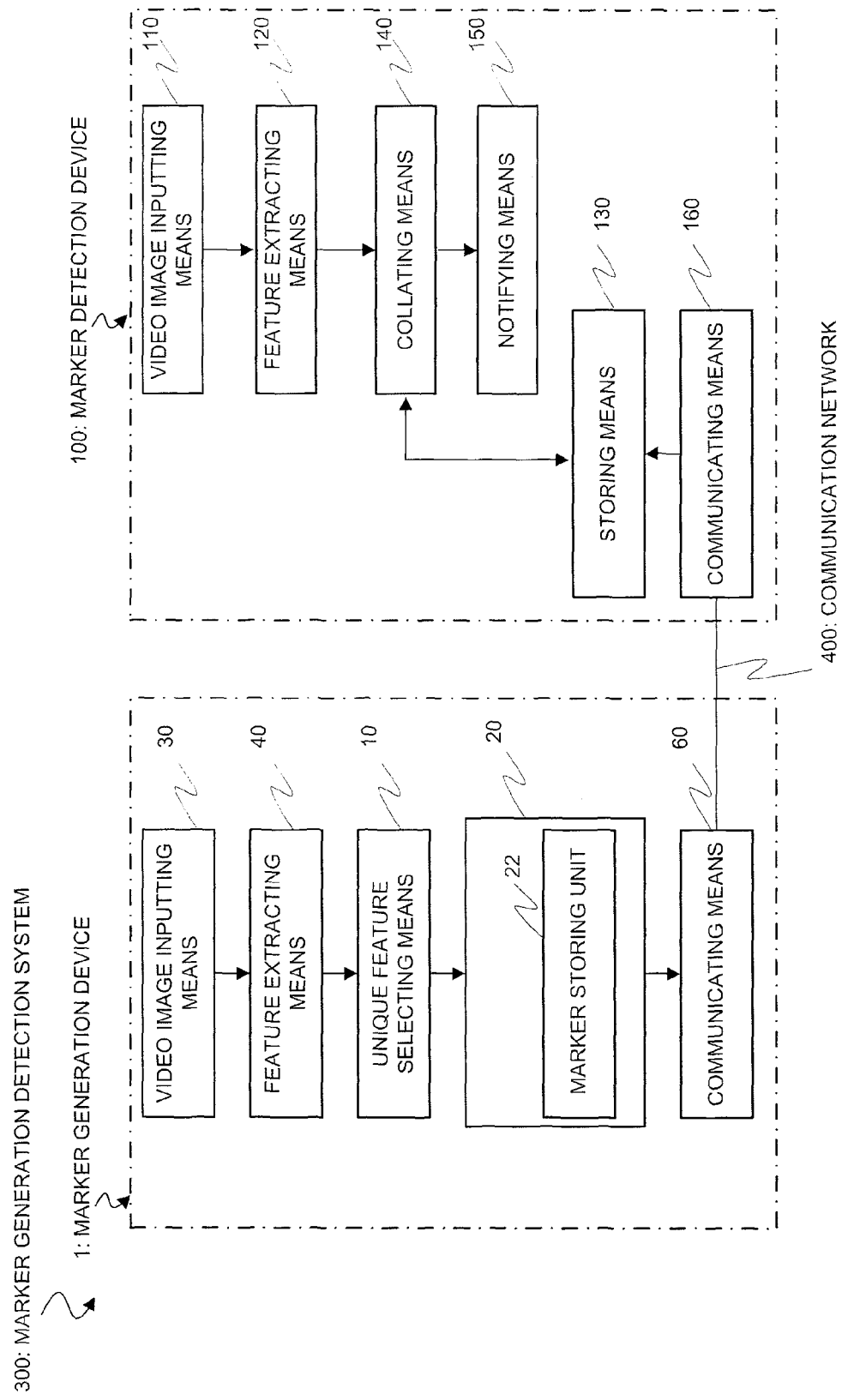

MARKER GENERATION DEVICE, MARKER GENERATION DETECTION SYSTEM, MARKER GENERATION DETECTION DEVICE, MARKER, MARKER GENERATION METHOD, AND PROGRAM

CROSS REFERENCE TO RELATED APPLICATIONS

This application is a National Stage of International Application No. PCT/JP2010/062378 filed Jul. 22, 2010, claiming priority based on Japanese Patent Application No. 2009-171838, filed Jul. 23, 2009, the contents of all of which are incorporated herein by reference in their entirety.

TECHNICAL FIELD

The present invention relates to a marker generation device for generating markers, a marker generation detection system provided with this marker generation device, a marker generation detection device provided with a marker generation function and a marker detection function, its marker, a marker generation method of generating its marker, and a marker generation program for executing this marker generation method.

BACKGROUND ART

As a method of identifying whether or not a desired object exists in a certain space, the following method exists.

For example, the technology of imaging the image of the space in which no marker exists as a background video image with an video image inputting means in a marker generation stage, extracting feature points from the above background video image, mapping these feature points onto an invariant feature space, thereby to define them as invariant features, defining portions in which these invariant features do not appear as unique features, generating a marker pattern based upon these unique features, and in a marker detection stage, imaging the image of the space containing the object added with the marker as a detection-targeted video image, extracting the feature points from this detection-targeted video image, determining whether or not a segment matching with an arrangement of the feature points extracted from the marker pattern exists in an arrangement of these feature points, and detecting this as the marker when the matching one exists (for example, see Patent Literature 1).

With this technology, the pattern not appearing in the background video image can be generated as the marker pattern in the marker generation stage. This prevents the marker from being erroneously detected from a location in which no marker exists, out of the detection-targeted video images, thereby enabling the marker added to the objet to be surely detected in the marker detection stage.

CITATION LIST

Patent Literature

PTL 1: International Publication No. WO2008/090908 (pamphlet)

SUMMARY OF INVENTION

Technical Problem

However, in the technology described in the above-mentioned Patent literature 1 (hereinafter, referred to as a literature technology), the following situation surfaces.

It is only one kind of marker pattern that is generated in this literature technology.

For this, also when the objects, being to-be-detected targets, can be divided into a plurality of kinds, an identical marker is added to any object, irrespectively of the above kinds. Thus, the object can be detected; however, the kind thereof cannot be detected.

The present invention has been accomplished in consideration of the above-mentioned problems, and an object thereof is to provide a marker generation device, a marker generation detection system, a marker generation detection device, a marker, a marker generation method, and a marker generation program that enable plural kinds of marker patterns to be generated, and together herewith, the objects to be detected for each kind.

Solution to Problem

The present invention is a marker generation device comprising: a unique feature selecting means that selects, in a predetermine space in which feature points extracted from an image are displayed, portions of said predetermine space in which the number of said feature points is equal to or less than a predetermined number in a plural number as unique features; and a marker pattern generating means that generates plural kinds of marker patterns by employing the whole or one part of said plurality of the unique features.

The present invention is a marker generation detection system comprising a marker generation device and a marker detection device: wherein said marker generation device comprises: a first video image inputting means that inputs an image; a first arranging means that extracts feature points from said image inputted by this first video image inputting means; and displays these extracted feature points onto a predetermined space; a unique feature selecting means that selects as unique features portions of said space in which the number of said feature points is equal to or less than a predetermined number; and a marker generating means that generates plural kinds of marker patterns by employing said unique features; and wherein said marker detection device comprises: a marker storing means that stores said plural kinds of the marker patterns; a second video image inputting means that inputs the image; a second arranging means that extracts the feature points based upon said image inputted by this second video image inputting means, and displays these extracted feature points onto the predetermined space; and a collating means that determines whether or not an arrangement of the unique feature based upon said marker pattern exists in an arrangement of a feature point group displayed onto said predetermined space.

The present invention is a marker generation detection device comprising: a first video image inputting means that inputs an image; a first arranging means that extracts feature points from said image inputted by this first video image inputting means, and displays these extracted feature points onto a predetermined space; a unique feature selecting means that selects as unique features portions of said space in which the number of said feature points is equal to or less than a predetermined number; a marker generating means that generates plural kinds of marker patterns by employing said unique features; a marker storing means that stores said marker patterns; a second video image inputting means that inputs the image; a second arranging means that extracts the feature points based upon said image inputted by this second video image inputting means, and displays these extracted feature points onto the predetermined space; and a collating means that determines whether or not an arrangement of the unique feature based upon said marker pattern exists in an arrangement of a feature point group displayed onto said predetermined space.

The present invention is a marker generated in plural kinds by selecting, in a predetermined space onto which feature points extracted for each image are displayed, portions in which the number of said feature points are equal to or less than a predetermined number as unique features, and employing these selected unique features.

The present invention is a marker generation method comprising the steps of: inputting an image; extracting feature points from said image; displaying said feature points onto a predetermined space; selecting as unique features portions of said space in which the number of said feature points is equal to or less than a predetermined number in a plural number; and generating plural kinds of marker patterns by employing the whole or one part of said plurality of the unique features.

The present invention is a marker generation program for causing an information processing device to execute the processes of: inputting an image; extracting feature points from said image; displaying said feature points onto a predetermined space; selecting as unique features portions of said space in which the number of said feature points is equal to or less than a predetermined number in a plural number; and generating plural kinds of marker patterns by employing the whole or one part of said plurality of the unique features.

Advantageous Effect of Invention

The marker generation device, the marker generation detection system, the marker generation detection device, the marker, the marker generation method, and the marker generation program of the present invention enable plural kinds of marker patterns to be generated by changing a combination of the unique features to be selected at the time of designing the marker from unique feature groups. And, causing the kinds of the marker patterns and the kinds of the objects to correspond to each other, and adding the corresponding kind of the marker for each of these objects enable not only the object but also the kind of the object to be detected.

BRIEF DESCRIPTION OF DRAWINGS

FIG. 3 is a chart illustrating a configuration of a feature point detection table.

FIG. 4 is a chart illustrating a configuration of a unique feature table.

FIG. 5 is a view illustrating a configuration of a unique feature arrangement diagram.

FIG. 6 is a view illustrating an arrangement of the unique features.

FIG. 7 is a chart illustrating a configuration of a use unique feature combination table.

FIG. 8 is a view illustrating an example of marker patterns.

FIG. 11 is a chart illustrating a configuration of an inter-unique-feature distance calculation table.

FIG. 12 is a view illustrating a combination in a case of selecting two use unique feature groups comprised of three unique features.

FIG. 14 is a view illustrating a sum total of respective distances between the unique features in the two use unique feature groups.

FIG. 16 is a view illustrating positions of respective use unique feature groups when superposing one unique feature in one use unique feature group upon one unique feature in another use unique feature group.

FIG. 17 is a view illustrating distances between the unique features that are not superposed when superposing one unique feature in one use unique feature group upon one unique feature in another use unique feature group.

FIG. 18 is a chart illustrating a sum total of distances between the unique features that are not superposed when superposing one unique feature in one use unique feature group upon one unique feature in another use unique feature group.

FIG. 19 is a chart illustrating a list of sum totals of distances between the unique features that are not superposed when sequentially superposing one unique feature in one use unique feature group upon one unique feature in another use unique feature group.

FIG. 20 is a view illustrating shape approximations.

FIG. 28 is a view illustrating Levenshtein distances between two use unique feature groups.

FIG. 29 is s a view illustrating a situation in which a plurality of the use unique feature groups are put side by side based upon the Levenshtein distances, wherein (i) is indicative of the case in which a use unique feature group (t1,t2,t4) with No. 2 is defined as a reference, and (ii) is indicative of the case in which a use unique feature group (t2,t3,t5) with No. 8 is defined as a reference.

FIG. 30 is a chart illustrating the distance over a predetermined space between a use unique feature group (t1,t2,t3), being a reference, and each of the other use unique feature groups.

FIG. 31 is a chart illustrating a situation in which respective use unique feature groups are put side by side in an ascending order based upon the distance over a predetermined space between a use unique feature group (t1,t2,t3), being a reference, and each of the other use unique feature groups.

FIG. 32 is a chart illustrating the distance over a predetermined space between the use unique feature group (t1,t2,t4), being a reference, and each of the other use unique feature groups.

FIG. 33 is a chart illustrating a situation in which respective use unique feature groups are put side by side in an ascending order based upon the distance over a predetermined space between the use unique feature group (t1,t2,t4), being a reference, and each of the other use unique feature groups.

FIG. 34 is a chart illustrating the distance over a predetermined space between a use unique feature group (t2,t3,t5), being a reference, and each of the other use unique feature groups.

FIG. 35 is a chart illustrating a situation in which respective use unique feature groups are put side by side in an ascending order based upon the distance over a predetermined space between the use unique feature group (t2,t3,t5), being a reference, and each of the other use unique feature groups.

FIG. 36 is a chart illustrating the shape approximation between the use unique feature group (t1,t2,t3), being a reference, and each of the other use unique feature groups.

FIG. 37 is a chart illustrating a situation in which respective use unique feature groups are put side by side in an ascending order of the shape approximations based upon the shape approximation between the use unique feature group (t1,t2,t3), being a reference, and each of the other use unique feature groups.

FIG. 38 is a chart illustrating the shape approximation between the use unique feature group (t1,t2,t4), being a reference, and each of the other use unique feature groups.

FIG. 39 is a chart illustrating a situation in which respective use unique feature groups are put side by side in an ascending order of the shape approximations based upon the shape approximation between the use unique feature group (t1,t2,t4), being a reference, and each of the other use unique feature groups.

FIG. 40 is a chart illustrating the shape approximation between the use unique feature group (t2,t3,t5), being a reference, and each of the other use unique feature groups.

FIG. 41 is a chart illustrating a situation in which respective use unique feature groups are put side by side in an ascending order of the shape approximations based upon the shape approximation between the use unique feature group (t2,t3,t5), being a reference, and each of the other use unique feature groups.

FIG. 42 is a view illustrating the shape approximation having a large value, out of the shape approximations shown in FIG. 20, with shading in a gray color.

FIG. 43 is a chart illustrating a situation in which respective use unique feature groups are put side by side in an ascending order of the shape approximations based upon the shape approximation between the use unique feature group (t1,t3,t4), being a reference, and each of the other use unique feature groups.

FIG. 44 is a view illustrating a situation in which different markers are added object by object.

FIG. 45 is a chart illustrating a configuration of an object-marker-correspondence table.

FIG. 53 is a chart illustrating a configuration of a feature point information table.

FIG. 56 is a chart illustrating a configuration of a segment coordinate table.

FIG. 57 is a view illustrating a configuration of a feature point number distribution diagram.

FIG. 58 is a chart illustrating a configuration of the feature point information table containing segment coordinates.

FIG. 59 is a view illustrating a configuration of the unique feature arrangement diagram.

FIG. 60 is a view illustrating another configuration of the unique feature arrangement diagram.

FIG. 79 is a block diagram illustrating a detailed configuration of the marker generation detection device.

FIG. 80 is a block diagram illustrating a configuration of the marker generation detection system.

DESCRIPTION OF EMBODIMENTS

Hereinafter, the preferred exemplary embodiments of the marker generation device, the marker generation detection system, the marker generation detection device, the marker, the marker generation method, and the marker generation program relating to the present invention will be explained by making a reference to the accompanied drawings.

[The First Exemplary Embodiment of the Marker Generation Device and the Marker Generation Method]

At first, the first exemplary embodiment of the marker generation device and the marker generation method of the present invention will be explained by making a reference to FIG. 1. The same figure is a block diagram illustrating a configuration of the marker generation device of this exemplary embodiment.

(Marker Generation Device)

Figure 1:
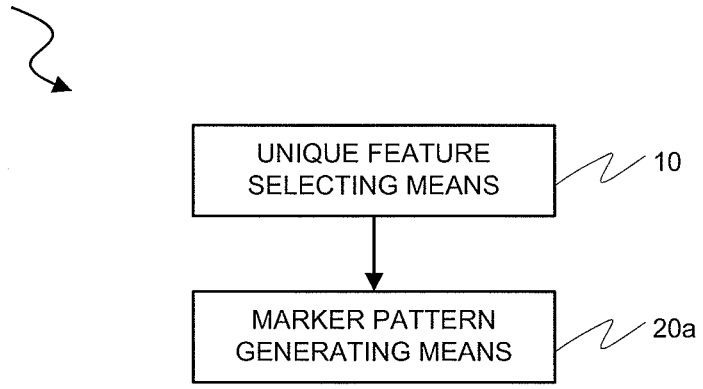
FIG. 1 is a block diagram illustrating a configuration of the marker generation device in a first exemplary embodiment of the present invention.

As shown in FIG. 1, a marker generation device 1a is provided with a unique feature selecting means 10 and a marker pattern generating means 20a.

Figure 2:
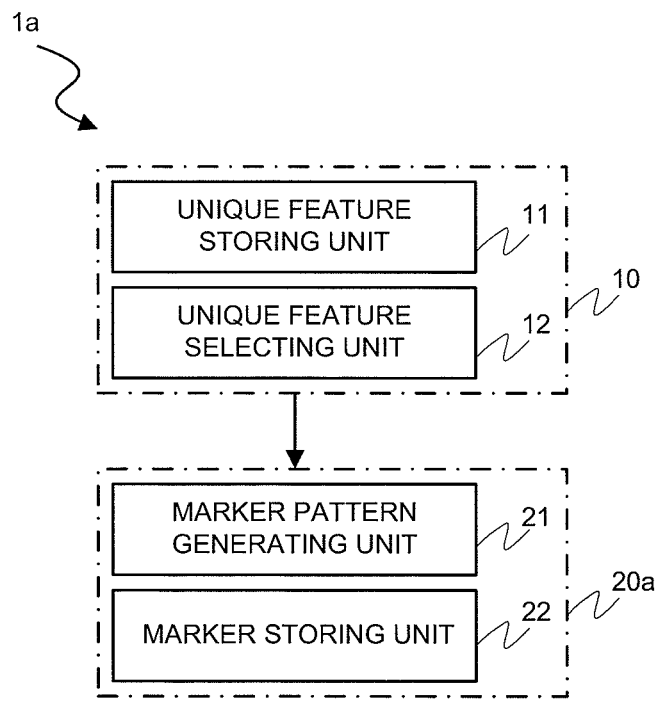
FIG. 2 is a block diagram illustrating a detailed configuration of the marker generation device in the first exemplary embodiment of the present invention.

Herein, the unique feature selecting means 10 includes a unique feature storing unit 11 and a unique feature selecting unit 12 as shown in FIG. 2.

The unique feature storing unit 11 stores "the feature point detection table" and "the unique feature table".

"The feature point detection table" is a table indicative of the coordinate of each segment in the feature space and the number of the feature points arranged in each segment. This "feature point detection table", as shown in FIG. 3, may include "a segment number" (A), "an X coordinate of the segment" (B), an Y coordinate of the segment" (C), and "a feature point number" (D) as an item, respectively.

"The segment number" is a serial number added to each segment at the time of partitioning the feature space into a plurality of segments.

"The X coordinate of the segment" is an X coordinate in which the above segment is positioned.

"The Y coordinate of the segment" is an Y coordinate in which the above segment is positioned.

"The feature point number" is the number of the feature points that are positioned in the above segment.

Additionally, "a Z coordinate of the segment" may be furthermore added to "the feature point detection table" as an item when the feature space is displayed in a three-dimension.

"The unique feature table" is a table configured of information related to the unique features. This "unique feature table", as shown in FIG. 4, may include "a unique feature number" (A), "a segment number" (B), "an X coordinate of the segment" (C), "a Y coordinate of the segment" (D), and "a feature point number" (E) as an item, respectively.

"The unique feature number" is a serial number added to each unique feature.

"The segment number" is a segment number of the segment selected as the unique feature.

"The X coordinate of the segment" is an X coordinate in which the above segment selected as the unique feature is positioned.

"The Y coordinate of the segment" is a Y coordinate in which the above segment selected as the unique feature is positioned.

"The feature point number" is the number of the feature points that are positioned in the above unique feature.

Additionally, "the segment number", "the X coordinate of the segment", "the Y coordinate of the segment", and "the feature point number" of "the unique feature table" correspond to "the segment number", "the X coordinate of the segment", "the Y coordinate of the segment", and "the feature point number" of "the feature point detection table" respectively. Further, "the Z coordinate of the segment" may be furthermore added to "the unique feature table" as an item when the feature space is displayed in a three-dimension.

The unique feature selecting unit 12, when "the feature point detection table" is inputted from the outside, causes the unique feature storing unit 11 to store it.

Further, the unique feature selecting unit 12 selects the segments of the feature space of which the number of the feature points is equal to or less than a predetermined number as unique features. That is, the unique feature selecting unit 12 takes out "the feature point detection table" from the unique feature storing unit 11 at a predetermined timing. And, the unique feature selecting unit 12 makes a reference to "the feature point number" of this taken-out "feature point detection table", extracts the feature point numbers with a number equal to or less than a predetermined number, out of the feature point numbers shown in this "feature point number", and selects the segments with the segment number caused to correspond to this extracted feature point number as the unique features.

Specifically, for example, when it is assumed that the predetermined number is "1", segment no. k51, segment no. k85 and segment no. k96 are selected as the unique features in "the feature point detection table" shown in FIG. 3. Additionally, while it was assumed that the predetermined number was "1" in this exemplary embodiment, the predetermined number is not limited to "1", and the predetermined number could be "zero" and "two" or more.

Continuously, the unique feature selecting unit 12 extracts data related to the selected unique features from "the feature point detection table", and puts together the data as "the unique feature table". At this time, the unique feature selecting unit 12 adds the serial number (unique feature number) to each unique feature, and adds it to "the unique feature table". And, the unique feature selecting unit 12 causes the unique feature storing unit 11 to store the above "unique feature table".

In such a manner, the unique feature selecting unit 12 selects the segments of the feature space in which the number of the feature points is equal to or less than a predetermined number (containing zero) as unique features. That is, as will be explained in the third exemplary embodiment, the unique feature selecting unit 12 selects portion of the feature space in which the number of the feature points extracted from the background video image is equal to or less than the predetermined number as the unique features. With this, the unique feature selecting unit 12 can extract the feature not matching with the feature of the background pattern, and the marker pattern generating means 20a can generate the marker pattern not matching with the background pattern by employing the above unique features.

However, so as to avoid an unexpected event in which the unique feature becomes similar to the background pattern afterwards due to an error in extraction of the feature points or the like, the unique features may be selected from a large region of the feature space in which none of the features of the background patterns exists.

This selection of the unique features may be regarded as equivalent to a problem of finding a large blank space from a distribution of the feature points in the feature space, whereby the algorithm such as, for example, "An Algorithm for Finding Maximal Whitespace Rectangles at Arbitrary Orientations for Document Layout Analysis" presented in Proceedings of the International Conference on Document Analysis and Recognition (2003) may be used to extract a large region, or a center of the obtained rectangular region that contains no feature point may be defined as the unique feature.

Another method may involve quantizing the feature space in a mesh having a particular size, generating a one-dimensional or multi-dimensional histogram, and defining the center of the mesh of which an occurrence frequency of the feature point becomes zero, or equal to or less than a predetermined number as the unique feature. When the mesh of which the frequency becomes zero, or equal to or less than a predetermined number does not exist, the width of the mesh may be reduced to generate a histogram, and when the mesh of which the frequency becomes zero, or equal to or less than a predetermined number appears, the unique feature may be selected from the meshes at this time. When no mesh cell of which the frequency becomes zero, or equal to or less than a predetermined number is found, a threshold process may be applied to the histogram by using a predetermined value to select the unique features from the mesh cells having a value equal to or less than the predetermined value.

An example of the unique features selected by the unique feature selecting unit 12 is shown in FIG. 5 and FIG. 6. In the feature space (unique feature arrangement diagram) shown in FIG. 5, the segment determined to be a segment of the unique feature is displayed in white color, and the segment determined not to be a segment of the unique feature is shaded in a gray color. FIG. 6 is a view in which respective unique features are displayed with "●" based upon the unique feature arrangement diagram shown in FIG. 5. Additionally, the unique features may be configured of the segments of which the number of the feature points is equal to less than the predetermined value, and further, the segments containing the center of the feature space (unique feature arrangement diagram) may be defined as the unique feature besides these segments.

The marker pattern generating means 20a includes a marker pattern generating unit 21 and a marker storing unit 22 as shown in FIG. 2.

The marker pattern generating unit 21 takes out "the unique feature table" from the unique feature storing unit 11. And, the marker pattern generating unit 21 generates the marker patterns by employing the unique features shown in the above "unique feature table.

Herein, the marker pattern generating unit 21 selects one unique feature, or two or more from among a plurality of the unique features, and defines this as a use unique feature. And, the marker pattern generating unit 21 generates the marker pattern by employing this use unique feature.

The use unique feature is configured of a combination of one unique feature, or two or more. This number of the combinations of the unique features is decided, dependent upon the number of the unique features. That is, when the number of the unique features is plural (tn pieces), the combination of the unique features has $\{(2tn)-1\}$ options. Specifically, for example, when the number of the unique features, as shown in FIG. 6, is five (t1 to t5), the combination of the unique features, as shown in FIG. 7, has 31 options. That is, the marker pattern generating unit 21 can generate at most 31 kinds of the marker patterns when the number of the unique features is five.

Additionally, "the combination" in this context is a combination with the whole numbers of 1 to tn targeted. For this reason, for example, the number of numerical figures that can be drawn from n numerical figures is not limited to one kind, i.e. m or r as is the case of "Combination" denoted by $_nC_m$, and "Repeated combination" denoted by $_nH_r$. However, "the combination" in this context could be a combination with one figure, out of 1 to tn, targeted.

In such a manner, the marker pattern generating unit 21 selects one combination, or two or more from among plural options of combinations of the unique features. This selection may be performed at random, or may be performed at certain regularity. This method of selecting the combination of the unique features will be explained in details in "a method of selecting the use unique features" to be later described.

Continuously, the marker pattern generating unit 21 generates the marker pattern by employing the use unique features.

There exist various methods as the method of generating the marker pattern. For example, the case in which vertices, intersections, and endpoints in the image are used as the feature points will be exemplified.

When the aforementioned method disclosed in "On the option detection of curves in noisy pictures", or the like is employed, the detection of the feature point groups required in generating the marker pattern depends upon the feature point detection algorithm used by a feature extracting means 40.

For example, the methods of generating the marker pattern are exemplified as described below.

(1) The pattern having intersections (cross hairs) arranged at the positions of the unique features (FIG. 8 (*i*)):

(2) The pattern generated by repeating a process of finding a convex hull of the unique feature and filling its inside with a specific color, and in addition hereto, finding another convex hull again using the unique feature that is not used in the first convex hull and filling its inside with another color, until all unique features are used (FIG. 8 (*ii*);

(3) The pattern formed of an aggregation of filled-in rectangles having the vertices lying at the positions of the unique features and having horizontal and vertical sides (FIG. 8 (*iii*)); and (4) The pattern in which nearest neighbor ones of the unique feature points are connected with line segments (FIG. 8 (*iv*)).

The patterns shown in FIG. 8 (*i*) to (*iv*) can be generated when all five unique features shown in FIG. 6 are selected as the use unique features.

Figure 9:
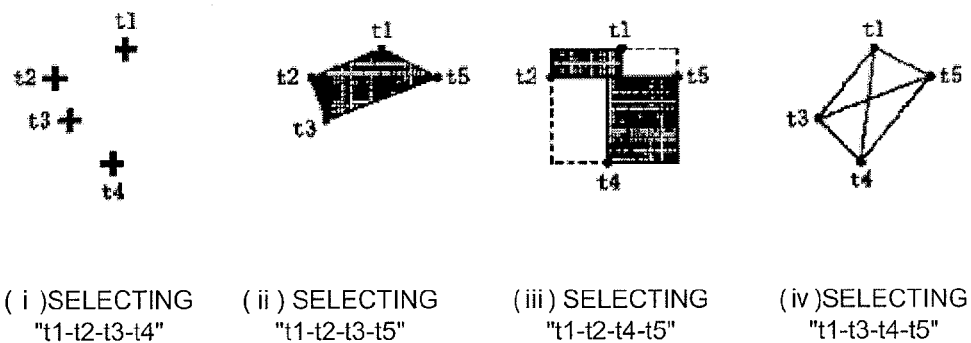
FIG. 9 is a view illustrating another example of marker patterns.

On the other hand, the patterns as shown in FIG. 9 (*i*) to (*iv*) can be generated when four unique features, out of all five unique features shown in FIG. 6, are selected as the use unique features.

Additionally, when a feature extracting means to be later described extracts the features by using the brightness value or the color difference value, the device for adding the marker to the object may print the marker with paints corresponding to the brightness value and the color difference value that correspond to the unique features.

Further, it is possible to combine the method of utilizing the vertices, the intersections, the endpoints as the figurative feature, and the method of utilizing the brightness value or the color difference value as the feature. In this case, the marker pattern generating unit 21 may generate the markers having the brightness, the color, and the shape corresponding to the selected unique features.

The marker storing unit 22 stores data related to the markers generated by the marker pattern generating unit 21.

For example, the marker storing unit 22 stores the coordinates of the unique features when the marker pattern is one shown in FIG. 8 (*i*). Further, the marker storing unit 22 stores the coordinates constituting the convex hull besides the coordinates of the unique features when the marker pattern is one shown in FIG. 8 (ii).

(The Method of Selecting the Use Unique Features)

Next, the method of selecting the use unique features that is executed by the marker pattern generating unit 21 will be explained.

The marker pattern generating unit 21 generates the marker pattern by employing the unique features shown in "the unique feature table".

Herein, the marker pattern generating unit 21 selects one unique feature, or two or more to be employed for generating the marker pattern from among a plurality of unique features, and assumes this as the use unique feature.

The methods of selecting the use unique features include the following techniques.

(1) The use unique features are selected in such a manner that the number of the unique features becomes many.

(2) The use unique features are selected in such a manner that a sum total of respective distances between the unique features becomes large.

(3) The use unique features are selected in such a manner that a sum total of respective distances between the unique features in two use unique feature groups becomes large.

(4) The use unique features are selected in such a manner that an extent in which two markers differs from each other in the shape becomes large.

Hereinafter, the methods of selecting the use unique features will be explained in an order of (1) to (4).

(1) The use unique features are selected in such a manner that the number of the unique features becomes many.

When the unique feature selecting means 10 selects the unique features in a plural number, the marker pattern generating unit 21 may select one unique feature, or two or more as the use unique feature from among this plurality of the unique features.

For example, as shown in FIG. 6, when five unique features exist, the selectable combination of the unique features has 31 options as shown in FIG. 7. At this time, the number of the unique features that are selected as the use unique feature is any of one, two, three, four, and five.

Herein, upon paying an attention to robustness of the marker, the more the number of the unique features to selected as the use unique feature, the better.

The so-called robustness points to certainty of the detection of the marker that is not governed by the environment.

For example, now suppose the case in which, at the time of detecting the marker, one part of the above marker is obstructed for some reason or other. Herein, when, in a case in which the number of the feature points to be extracted from an entirety of the marker is three, two of three are obstructed, it follows that the detection of this marker is judged by using the remaining one. On the other hand, when, in a case in which the number of the feature points of an entirety of the marker is ten, two of them are obstructed, the detection of this marker can be judged by using the remaining eight. That is, the marker can be surely detected because the more the feature points, the more the judgment elements when the markers each having a different feature point number are put in the similar environment. From this, it can be safely said that the marker of which the number of the feature points is many involves high robustness as compared with the marker of which the number of the feature points is few.

Thereupon, so as to generate the marker with high robustness, it is desirable to allow the marker pattern generating unit 21 to select the use unique features as many as possible.

For example, when only one marker pattern is generated, all unique features (unique features t1, t2, t3, t4, and t5 in FIG. 6) are selected as the use unique features.

Further, when two marker patterns are generated, all five unique features may be selected as a first use unique feature, and a combination of four unique features (for example, t1, t2, t3, and t4) may be selected as a second use unique feature.

In addition, when three marker patterns are generated, all five unique features may be selected as a first use unique feature, a combination of four unique features (for example, t1, t2, t3, and t4) may be selected as a second use unique feature, and a combination of four unique features (for example, t2, t3, t4, and t5) other than a combination of four unique features selected as this second use unique feature may be selected as a third use unique feature.

Herein, when the use unique feature group having all five unique features (t1, t2, t3, t4, and t5) selected therein is referred to as an wholly-designated unique feature group, the marker pattern generating unit 21 may define the use unique feature group of one marker pattern, out of two marker patterns or more to be generated, as the wholly-designated unique feature group. Further, the marker pattern generating unit 21 may select all use unique features of two marker patterns or more without employing the wholly-designated unique feature group (by employing only the use unique feature groups that are comprised of four unique features, three, or two).

The reason is that when, in a case in which the wholly-designated unique feature group and each of the use unique feature groups other than this are compared, these two markers are likely to be confused because they resembles each other in the shape, this confusion need to be avoided. For example, it is desirable no to select the wholly-designated unique feature group when the confusion is easily avoided in a case in which any use unique feature group is configured of four unique features.

Additionally, in a case in which an extent of the confusion is not changed so much when the case of employing the use unique feature group configured of four unique features is compared with the case of employing the use unique feature group configured of three unique features, the use unique feature group configured of four unique features may be employed by giving the robustness preference.

(2) The use unique features are selected in such a manner that a sum total of respective distances between the unique features becomes large.

It can be safely said that upon comparing the case in which a distance between two feature points to be extracted from one marker pattern is near with the case in which a distance is faraway, the latter involves the high robustness.

When, in a case in which the object having the marker added hereto is arranged in a position faraway from a video image inputting means (to be later described), a distance between two feature points (t1, t2), out of the feature point group to be executed from the marker, is very near, a distinction of these two feature points (t1 and t2) is obscured in some cases, which causes the robustness to decline because these two feature points (t1 and t2) are processed as one feature point, or the number of the unique features to be detected is decreased as a result of appearance of these two feature points in an identical segment of the feature space and these feature points are not detected as the marker. To the contrary, when a distance between two feature points to be executed from one marker pattern is faraway, the robustness is enhanced because these feature points can be distinguished sufficiently.

Thereupon, so as to enhance the robustness of the marker, it is desirable to select the use unique features in such a manner that a sum total of respective distances between the unique features becomes large.

Figure 10:
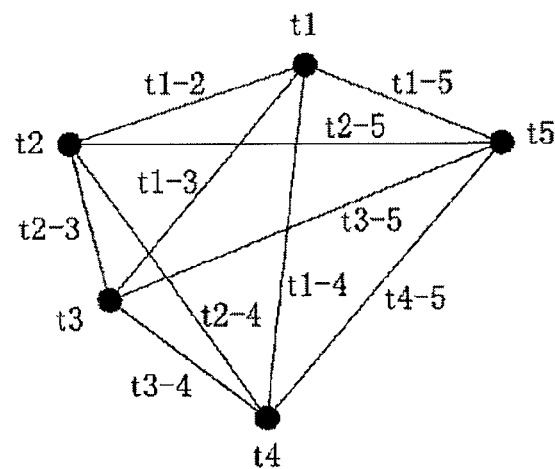
FIG. 10 is a view illustrating respective distances between the feature points.

Herein, it is assumed that five unique features (t1, t2, t3, t4, and t5) are selected as shown in FIG. 6. Further, it is assumed that respective distance between the unique features, as shown in FIG. 10, are displayed as "t1-2", "t1-3", "t1-4", "t1-5", "t2-3", "t2-4", "t2-5", "t3-4", "t3-5", and "t4-5". Out of them, for example, "t1-2" is indicative of a distance between the unique feature t1 and the unique feature t2.

The combination of the unique features has 31 options as shown in FIG. 7. For this, a sum total of the distances between the unique features in each combination may be calculated as follows.

For example, when the use unique feature is configured of five unique features, a sum total $\Sigma t12345$ of the distances between the unique features in each combination may be calculated with the following equation.

$$\Sigma t12345=(t1\text{-}2)+(t1\text{-}3)+(t1\text{-}4)+(t1\text{-}5)+(t2\text{-}3)+(t2\text{-}4)+(t2\text{-}5)+(t3\text{-}4)+(t3\text{-}5)+(t4\text{-}5) \quad \text{(Equation 1)}$$

Next, it is assumed that the coordinate of each unique feature is the next value.

The coordinate of t1: (6,9)
The coordinate of t2: (0,7)
The coordinate of t3: (1,3)
The coordinate of t4: (5,0)
The coordinate of t5: (11,7)

Continuously, respective distances between the unique features are calculated. Respective distances between the unique features may be calculated as follows.

For example, the distance of the unique feature is displayed with an n-dimensional Euclidean distance in the predetermined space. Specifically, for example, when, in a case in which two unique features exist, the coordinate of the first unique feature and the coordinate of the second unique feature are (x1,y1) and (x2,y2), respectively, the Euclidean distance L1 thereof may be calculated with following equation.

$$L1=\{(x2-x1)2+(y2-y1)2\}^{\frac{1}{2}} \quad \text{(Equation 2)}$$

Calculating respective distances between the unique features by employing this Equation 2 and the coordinate of each unique feature yields the following values.

$$(t1\text{-}2)=6.3246 \quad \text{(Equation 3)}$$

$$(t1\text{-}3)=7.8102 \quad \text{(Equation 4)}$$

$$(t1\text{-}4)=9.0554 \quad \text{(Equation 5)}$$

$$(t1\text{-}5)=5.3852 \quad \text{(Equation 6)}$$

$$(t2\text{-}3)=4.1231 \quad \text{(Equation 7)}$$

$$(t2\text{-}4)=8.6023 \quad \text{(Equation 8)}$$

$$(t2\text{-}5)=11.0000 \quad \text{(Equation 9)}$$

$$(t3\text{-}4)=5.0000 \quad \text{(Equation 10)}$$

$$(t3\text{-}5)=10.7703 \quad \text{(Equation 11)}$$

$$(t4\text{-}5)=9.2195 \quad \text{(Equation 12)}$$

When these distances between the unique features are substituted in the Equation 1, a sum total $\Sigma t12345$ of the distances between the unique features becomes the following value.

$$\Sigma t12345=77.2906 \quad \text{(Equation 13)}$$

Likewise, for example, when the use unique feature is configured of four unique features (t1, t2, t3, and t4), a sum total $\Sigma t1234$ of the distances between the unique features may be calculated with the following equation.

$$\Sigma t1234=(t1\text{-}2)+(t1\text{-}3)+(t1\text{-}4)+(t2\text{-}3)+(t2\text{-}4)+(t3\text{-}4) \quad \text{(Equation 14)}$$

When the distances between the unique features displayed by Equation 3, Equation 4, Equation 5, Equation 7, Equation 8, and Equation 10 are substituted in this Equation 14, a sum total $\Sigma t12345$ of the distances between the unique features becomes the following value.

$$\Sigma t1234=40.9156 \quad \text{(Equation 15)}$$

A sum total of the distances between the unique features may be calculated in such a sequence for each combination of the use unique features shown in FIG. 7. This calculated sum total of the distances between the unique features is shown in FIG. 11. The combination of the use unique features, the computation equation for calculating a sum total of the distances between the unique features, and the calculated sum total of the distances between the unique features are shown in a left column, a middle column, and a right column of the same figure, respectively. Additionally, the sum total is zero when the number of the use unique features is one (1) because no distance between the unique features exists.

When the calculation of a sum total of the distances between the unique features is finished, the use unique features are selected in a descending order of the sum total, to begin with the unique feature having a largest value.

In FIG. 11, the use unique feature having a largest sum total of the distances between the unique features is a use unique feature (t1, t2, t3, t4, t5) configured of five unique features. Next, the use unique feature having a second largest sum total of the distances between the unique features is a use unique feature (t1, t2, t4, t5) configured of four unique features. The use unique feature having a third largest sum total of the distances between the unique features is a use unique feature (t2, t3, t4, t5) configured of four unique features.

And, when two use unique features are selected, the use unique features (t1, t2, t3, t4, t5) and (t1, t2, t4, t5) are selected. Further, when three use unique features are selected, the use unique features (t1, t2, t3, t4, t5), (t1, t2, t4, t5), and (t2, t3, t4, t5) are selected.

Thus, selecting the use unique features in such a manner that a sum total of the distances between the unique features becomes large enables the robustness of the above marker to be enhanced.

Additionally, a sum total of the distances between the unique features becomes large inevitably as the number of the unique features becomes many. For this, this technique selects the use unique feature group of which the number of the unique features is most numerous in the end. However, setting the condition such that the number of the unique features is four beforehand enables the use unique feature groups of which the number of the unique features is most numerous to be prevented from being selected.

(3) The use unique features are selected in such a manner that a sum total of respective distances between the unique features in two use unique feature groups becomes large.

When, in a case in which two use unique feature groups are selected from among a plurality of the unique features, these two use unique feature groups are located closely to each other in the feature space, an erroneous recognition/confusion is likely to occur between these marker patterns.

The reason is that when, in a case in which two use unique feature groups are (t1, t2, t3) and (t1, t2, t4), the feature points or the invariant features extracted from the detection-targeted video image at the time of the detecting the marker are t1, t2, and t3, a determination as to which marker is detected needs to be made only by using t3.

To the contrary, when, in a case in which two use unique feature groups are (t1, t2, t3) and (t4, t5, t6), the feature points or the invariant features extracted from the detection-targeted video image at the time of the detecting the marker are t1, t2, and t3, a determination as to which marker is detected can be made by using any of t1, t2, and t3. That is, when these two use unique feature groups are located faraway from each other, the robustness is enhanced and the erroneous recognition/confusion hardly occurs.

Thereupon, as a technique of numeralizing an extent in which two markers differs from each other in the shape, the technique exists of calculating a sum total of respective distances between each of the unique features of one use unique feature group and each of another use unique feature group.

So as to make the explanation easily understandable, the case of constituting one use unique feature group by using three unique features will be explained.

The number of the unique features selected by the unique feature selecting means 10 is five as shown in FIG. 6, and the combination in the case of constituting one use unique feature group by using three unique features has ten options as shown in FIG. 7. Further, when two use unique feature groups are selected from among ten options of the use unique feature groups, the combination of two use unique feature groups to be selected has 45 options as shown in FIG. 12.

A sum total of the distances between each of the unique features of one use unique feature group and each of another use unique feature group is calculated for each of 45 options of the combinations.

Figure 13:
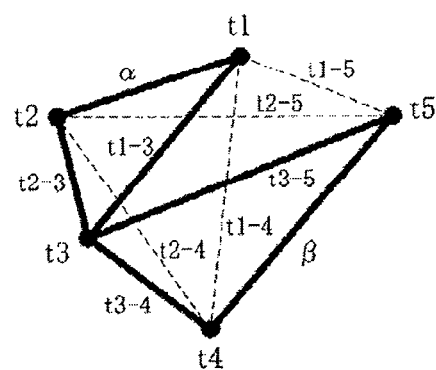
FIG. 13 is a view illustrating respective distances between the unique features in the two use unique feature groups.

For example, in a case in which the number of the unique features is five as shown in FIG. 6, it is assumed that two use unique feature groups α (t1, t2, t3) and β (t3, t4, t5) are selected as shown in FIG. 13.

Herein, each of these use unique feature groups α and β is configured of three unique features. Further, t3 of the use unique feature group α and β of the use unique feature group β, which are the identical unique feature t3, are shared by the use unique feature group α and the use unique feature group β.

A sum total of respective distances between the unique features is calculated in terms of these use unique feature group α and use unique feature group β.

For example, a sum Dt1 of the distances between the unique feature t1 of the use unique feature group α and each of the unique features (t3, t4, and t5) of the use unique feature group β can be calculated with the following equation.

$$Dt1=(t1-3)+(t1-4)+(t1-5) \quad \text{(Equation 16)}$$

Further, a sum Dt2 of the distances between the unique feature t2 of the use unique feature group α and each of the unique features (t3, t4, and t5) of the use unique feature group β can be calculated with the following equation.

$$Dt2=(t2-3)+(t2-4)+(t2-5) \quad \text{(Equation 17)}$$

In addition, a sum Dt3 of the distances between the unique feature t3 of the use unique feature group α and each of the unique features (t3, t4, and t5) of the use unique feature group β can be calculated with the following equation.

$$Dt3=(t3-3)+(t3-4)+(t3-5) \quad \text{(Equation 18)}$$

Additionally, a distance (t3-3) between the unique feature t3 of the use unique feature group α and the unique feature t3 of the use unique feature group β is zero in the Equation 18.

And, a sum total Dtotal of respective distances between each of the unique features (t1, t2, and t3) of the use unique feature group α and each of the unique features (t3, t4, and t5) of the use unique feature group β can be calculated with the following equation.

$$Dtotal=Dt1+Dt2+Dt3 \quad \text{(Equation 19)}$$

According to such a procedure, specifically, substituting the numerical values of Equation 3 to Equation 12 in Equation 16 to Equation 18, and calculating Dtotal by employing Equation 19 yields the value of 61.7466.

A sum total Dtotal of respective distances between the unique features can be calculated with a similar procedure in terms of combinations (respective combinations of two use unique feature groups shown in FIG. 12) other than a combination of the use unique feature group α (t1, t2, t3) and the use unique feature group β (t3, t4, t5).

The sum totals Dtotal calculated in such a manner are shown in FIG. 14. The calculation result shown in the same figure is arranged to an arrangement of the combinations of the use unique feature groups shown in FIG. 12. Further, in the calculation result shown in FIG. 14, "the sum total" of "the inter-unique-feature distance calculation table" of FIG. 11 is employed as respective distances between the unique features.

Next, the marker pattern generation unit 21 selects the combination having a largest sum total Dtotal of respective distances between the unique features, out of the combinations of the two use unique features.

In the calculation result shown in FIG. 14, the combination of the use unique feature group (t1, t4, t5) and the use unique feature group (t2, t3, t4) is a combination having a largest sum total of respective distances between the unique features.

Employing this technique enables the combination of the use unique feature groups in which the erroneous detection is not likely to occur in the least to be selected.

(4) The use unique features are selected in such a manner that an extent of a difference in the shapes of two markers becomes large.

When, in a case in which two markers are generated, they resemble each other in the shape, the robustness declines and the erroneous recognition/confusion are likely to occur. This situation is similar to that of the case (3)

Thereupon, it is desirable to selects the used unique features in such a manner that an extent of a difference in the shapes of two markers becomes large.

The extent in which the shapes of two markers differ from each other may be calculated with following technique.

For example, upon one unique feature (for example, t1) in the one use unique feature group α is superposed one unique feature (for example t3) in another use unique feature group β to calculate a sum total of respective distances between the unique features at this time. Next, upon one unique feature (for example, t1) in the one use unique feature group α is superposed one unique feature (for example, t4) in another use unique feature group β to calculate a sum total of respective distances between the unique features at this time. In such a manner, upon each unique feature of one unique feature in one use unique feature group is sequentially superposed one unique feature in the another use unique feature group, and a sum total of respective distances between the unique features is calculated whenever the superposition is performed. And, when, for all unique features in one use unique feature group, the superposition of all unique features in the another use unique feature group is finished, a superposition aspect that is obtained when a sum total of the distances becomes minimized is stored as an approximation situation.

This processing is performed for each combination of the two use unique feature groups to obtain the approximation situation in each combination. And, when the approximation situations are obtained for all combinations, a predetermined number of the sum totals are selected in a descending order of the sum total, to begin with the unique feature having a largest one, out of the sum totals of the respective distances between the unique features in these approximation situations, and two use unique feature groups in this selected approximation situation are defined as the use unique features that are employed for generating the marker.

Specifically, the sum total may be calculated with the next technique.

Figure 15:
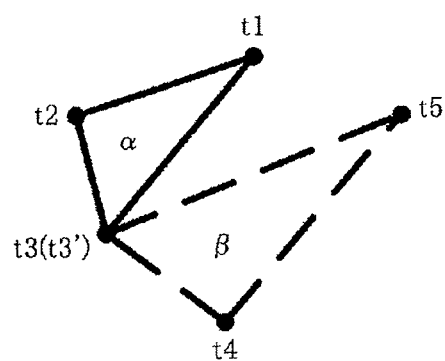
FIG. 15 is a view illustrating two selected use unique feature groups.

As show in FIG. 15, out of the plurality of the unique features (t1, t2, t3, t4; and t5 in the same figure), the three unique features (t1, t2, and t3) are selected as the use unique feature group α and the three unique features (t3, t4, and t5) are selected as the use unique feature group β. Additionally, the unique feature t3 of the use unique feature group β is defined as t3' because t3 is shared.

Next, one of a plurality of the unique features that the use unique feature group α has is superposed upon one of a plurality of the unique features that the use unique feature group β has. For example, as shown in FIG. 16 (i) t3' of the use unique feature group β is superposed upon t1 of the use unique feature group α.

And, the respective distances between the unique features that are not superposed are calculated in a situation of the superposition to obtain a sum total thereof.

For example, in the situation shown in FIG. 16 (i) t2 and t3 of the use unique feature group α, and t4 and t5 of the use unique feature group β are the unique features that are not superposed. For this, as shown in FIG. 17 (i), respective distances between each of the unique features t2 and t3 and each of the unique features t4 and t5 are calculated.

This calculation may be operated by employing the following equation.

$$t1(t3')=(t2\text{-}t4)+(t2\text{-}t5)+(t3\text{-}t4)+(t3\text{-}t5) \quad \text{(Equation 20)}$$

Where, "t2-t4" is indicative a distance between the unique feature t2 and the unique feature t4.

Herein, it is assumed that the coordinate of each unique feature is the following value.

t2=(0,4)
t3=(1,0)
t4=(10,3)
t5=(16,10)

When these coordinates of the unique features are substituted in Equation 2, respective distances between the unique features are calculated as follows.

$$(t2\text{-}t4)=10.0499 \quad \text{(Equation 21)}$$

$$(t2\text{-}t5)=17.0880 \quad \text{(Equation 22)}$$

$$(t3\text{-}t4)=9.4868 \quad \text{(Equation 23)}$$

$$(t3\text{-}t5)=18.0278 \quad \text{(Equation 24)}$$

When these respective distances between the unique features are substituted in Equation 20, a sum total of the distances between each of the unique features t2 and t3 of the use unique feature group α and each of the unique features t4 and t5 of the use unique feature group β becomes the following value.

$$\Sigma t1(t3')=54.6525$$

This value of Σt1(t3') and the numerical values calculated in Equation 21 to equation 24 are shown in FIG. 18 (i).

Next, as shown in FIG. 16 (ii) t4 of the use unique feature group β is superposed upon t1 of the use unique feature group α.

And, as shown in FIG. 17 (ii) respective distance between each of unique features t2 and t3 of the use unique feature group α and each of the unique features t4 and t5 of the use unique feature group β that are not superposed are calculated.

This calculation may be operated by employing the following equation.

$$\Sigma t1(t4)=(t2\text{-}t3')+(t2\text{-}t5)+(t3\text{-}t3')+(t3\text{-}t5) \quad \text{(Equation 25)}$$

Herein, it is assumed that the coordinate of each unique feature is the following value.

t2=(0,4)
t3=(1,0)
t3'=(2,6)
t5=(12,13)

When these coordinates of the unique features are substituted in Equation 2, respective distances between the unique features are calculated as follows.

$$(t2\text{-}t3')=5.3852 \quad \text{(Equation 26)}$$

$$(t2\text{-}t5)=15.0000 \quad \text{(Equation 27)}$$

$$(t3\text{-}t3')=9.0554 \quad \text{(Equation 28)}$$

$$(t3\text{-}t5)=17.0294 \quad \text{(Equation 29)}$$

When respective distances between the unique features are substituted in Equation 25, a sum total of respective distances between each of the unique features t2 and t3 of the use unique feature group α and each of the unique features t4 and t5 of the unique feature group β becomes the following value.

$$\Sigma t1(t4)=46.4699$$

This value of Σt1(t4) and the numerical values calculated in Equation 26 to Equation 29 are shown in FIG. 18 (ii).

Likewise, as shown in FIG. 16 (iii), when t5 of the use unique feature group β is superposed upon t1 of the use unique feature group α, a sum total of respective distances between each of the unique feature t2 and t3 of the use unique feature group α and each of the unique feature t3' and t4 of the use unique feature group β becomes the following value.

$$t1(t5)=16.2715$$

This value of Σt1(t5) and respective distances between the unique features that are not superposed are shown in FIG. 18 (iii).

Continuously, t3', t4, and t5 of the use unique feature group β are superposed upon t2 of the use unique feature group α, respectively, and the distances between the unique features that are not superposed are calculated to obtain a sum total thereof.

In addition, t3', t4, and t5 of the use unique feature group β are superposed upon t3 of the use unique feature group α, respectively, and respective distances between the unique features that are not superposed are calculated to obtain a sum total thereof.

A sum total of respective distances between the unique features that are not superposed in these situations of the superposition is shown in FIG. 19.

In the same figure, "54.6525" shown in a column in which the unique feature t1 of the use unique feature group α intersects the unique feature t3' of the use unique feature group β is indicative of a sum total of respective distances (t2-t4, t2-t5, t3-t4, and t3-t5) between the unique features that are not superposed when superposing the unique feature t3' of the use unique feature group β upon t1 of the use unique feature group α.

And, the marker pattern generating unit 21 selects a sum total having a smallest value, out of the sum totals shown in the same figure. Herein, the value that is obtained when superposing the unique feature t5 of the use unique feature group β upon t1 of the use unique feature group α is smallest (the hatched part of the same figure). This numerical value is defined as a shape approximation between the use unique feature group α and the use unique feature group β.

Selecting the shape approximation in such a manner allows an extent in which the shape of marker based upon the use unique feature group α and that of the marker based upon the use unique feature group p resembles each other to be known. When, in a case in which the shape of marker based upon the use unique feature group α and that of the marker based upon the use unique feature group β are completely identical to each other, these are superposed, they matches with each other and no discrepancy occurs. On the other hand, when, in a case in which the shape of marker based upon the use unique feature group α and that of the marker based upon the use unique feature group β differs from each other, these are superposed, discrepancy occurs by an amount equivalent to the above difference. The so-called case in which a sum total of respective distances between the unique features that are not superposed when superposing one unique feature of the use unique feature group α upon one unique feature of the use unique feature group β is smallest is the case in which the above discrepancy is smallest, namely, the situation in which the marker based upon the use unique feature group α and the marker based upon the use unique feature group β are superposed most closely. In other words, the shape approximation is calculated in order to search for the situation in which the marker based upon the use unique feature group α and the marker based upon the use unique feature group β are superposed most closely, and hence, an extent in which each shape shifts can be grasped simultaneously. This is apparent from the fact that when arrangements of the use unique feature group α and the use unique feature group β are in situations of being shown in FIG. 16 (*i*) to (*iii*), α and β are superposed most closely in the same figure (*iii*), a sum total of respective distances between the unique features is smallest in this case, and the above value is selected as the shape approximation (see FIG. 19).

Next, the above shape approximation is calculated for each combination of two markers.

In a case in which five unique features are selected as shown in FIG. 6, combinations of two use unique feature groups at the time of configuring one use unique feature group by using three unique features are shown in FIG. 12.

And, calculating the shape approximation for each of these combinations of the two use unique feature groups yields the calculation result shown in FIG. 20. It can be safely said in the same figure that the shapes of two marker based upon two use unique feature groups resemble each other all the more as the shape approximation is smaller. On the other hand, it can be safely said that the shapes of two markers based upon two use unique feature groups differ from each other all the more as the shape approximation is larger.

And, the largest shape approximation is selected from among shape approximations shown in FIG. 20 because it can be safely said that when the shapes of two markers differ from each other, the erroneous recognition/confusion between these markers hardly occur. In the same figure, 29.5316 is the largest value (the numerical value indicated in a gray color).

And, the combination of the use unique feature groups indicative of this value is selected. 29.5316 mentioned before is the value that is obtained when the use unique feature group α is (t1, t3, t4) and the use unique feature group β is (t2, t3, t5).

In such a manner, calculating the shape approximation for each combination of the two use unique feature groups, and selecting the combination of the use unique feature groups having a largest shape approximation enables a plurality of the markers in which the erroneous recognition/confusion hardly occur to be generated.

Additionally, when three use unique feature groups or more are selected, a combination of the use unique feature groups each having a large shape approximation is selected by making a reference FIG. 20.

For example, it is assumed that the two use unique feature groups are (t1, t3, t4) and (t2, t3, t5) as described above, (t2, t4, t5), being a combination having a second largest shape approximation, may be selected in comparison with (t1, t3, t4). Or (t1, t4, t5), being a combination having a third largest shape approximation, may be selected in compared with (t2, t3, t5).

While four techniques (1) to (4) were explained until this, only one of these techniques may be employed or a combination of a plurality of the techniques may be selected when the use unique features are selected.

Further, preference may be given to each technique at the time of combining a plurality of the techniques.

In addition, each of the techniques (2) to (4), out of the techniques explained until this, is a technique of selecting the unique features in such a manner that the distance associated with the use unique feature becomes large. While the above distance was explained in this exemplary embodiment by supposing the second-dimensional space, the space is not limited to the second-dimensional space, and the distance may be calculated with the similar technique also in the multi-dimensional space such as a three-dimensional space.

(A Method of Generating the Marker)

Next, an operational procedure of the marker generation device (a method of generating the marker) will be explained by making a reference to FIG. 21 to FIG. 25.

Figure 21:
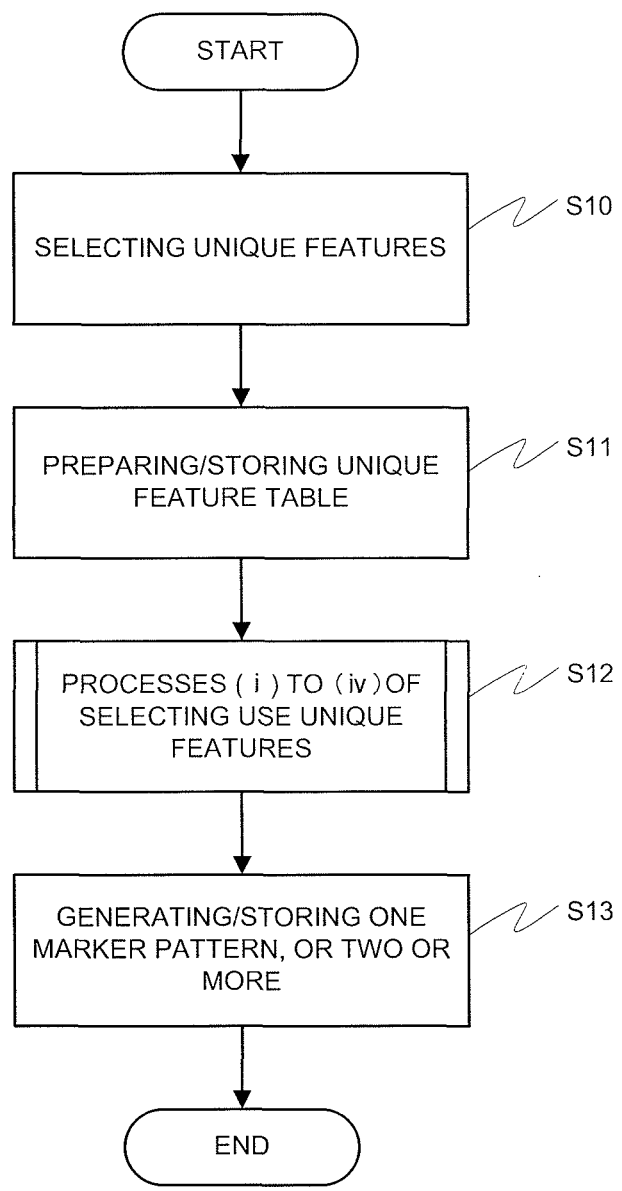
FIG. 21 is a flowchart illustrating an operational procedure of the marker generation device (marker generation method) in the first exemplary embodiment of the present invention.
Figure 22:
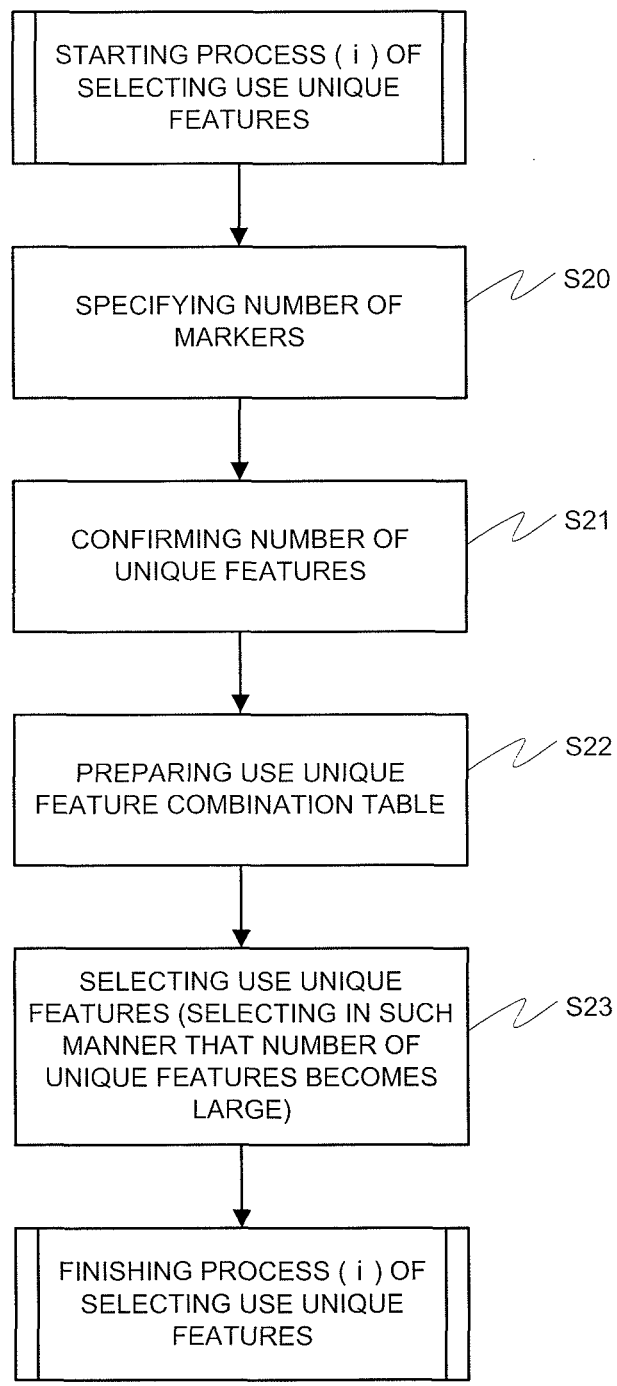
FIG. 22 is a flowchart illustrating an operational procedure of a process (i) of selecting the use unique features.
Figure 23:
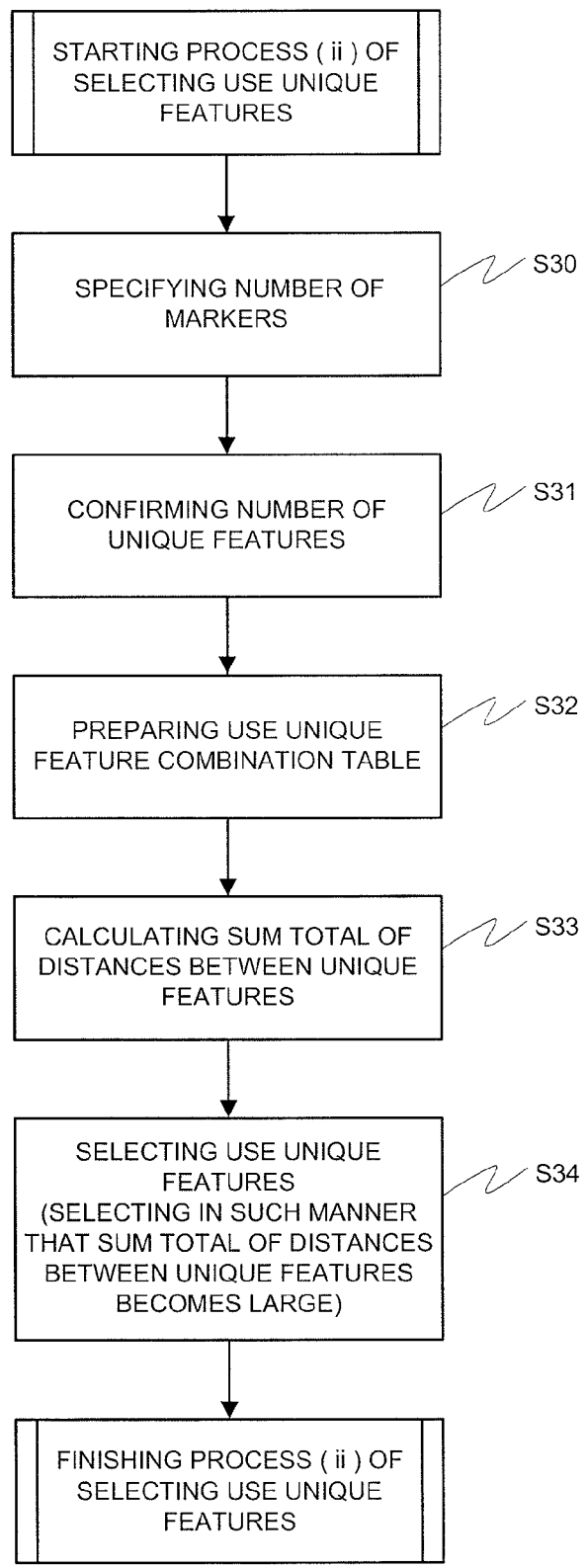
FIG. 23 is a flowchart illustrating an operational procedure of a process (ii) of selecting the use unique features.
Figure 24:
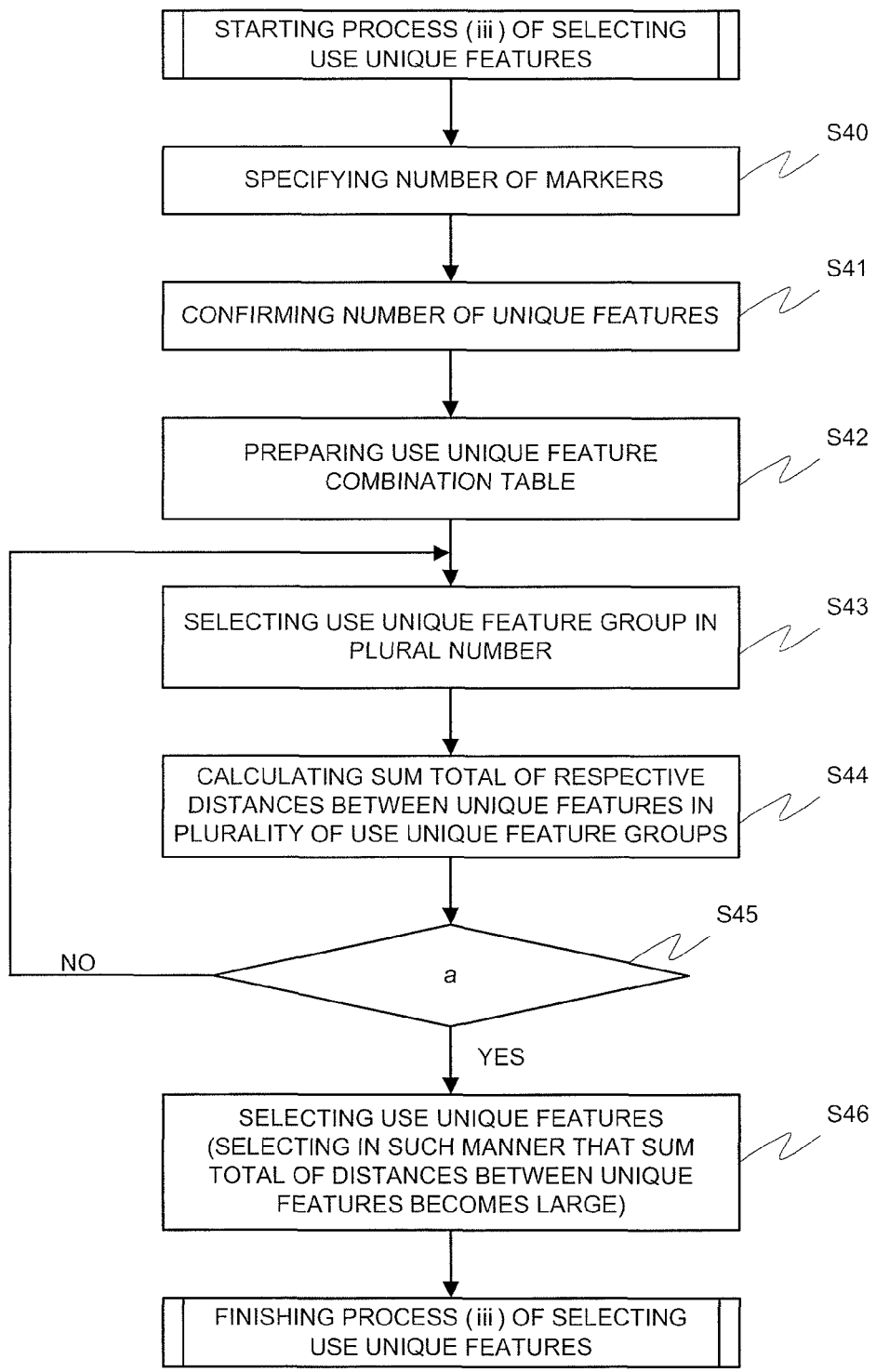
FIG. 24 is a flowchart illustrating an operational procedure of a process (iii) of selecting the use unique features.
Figure 25:
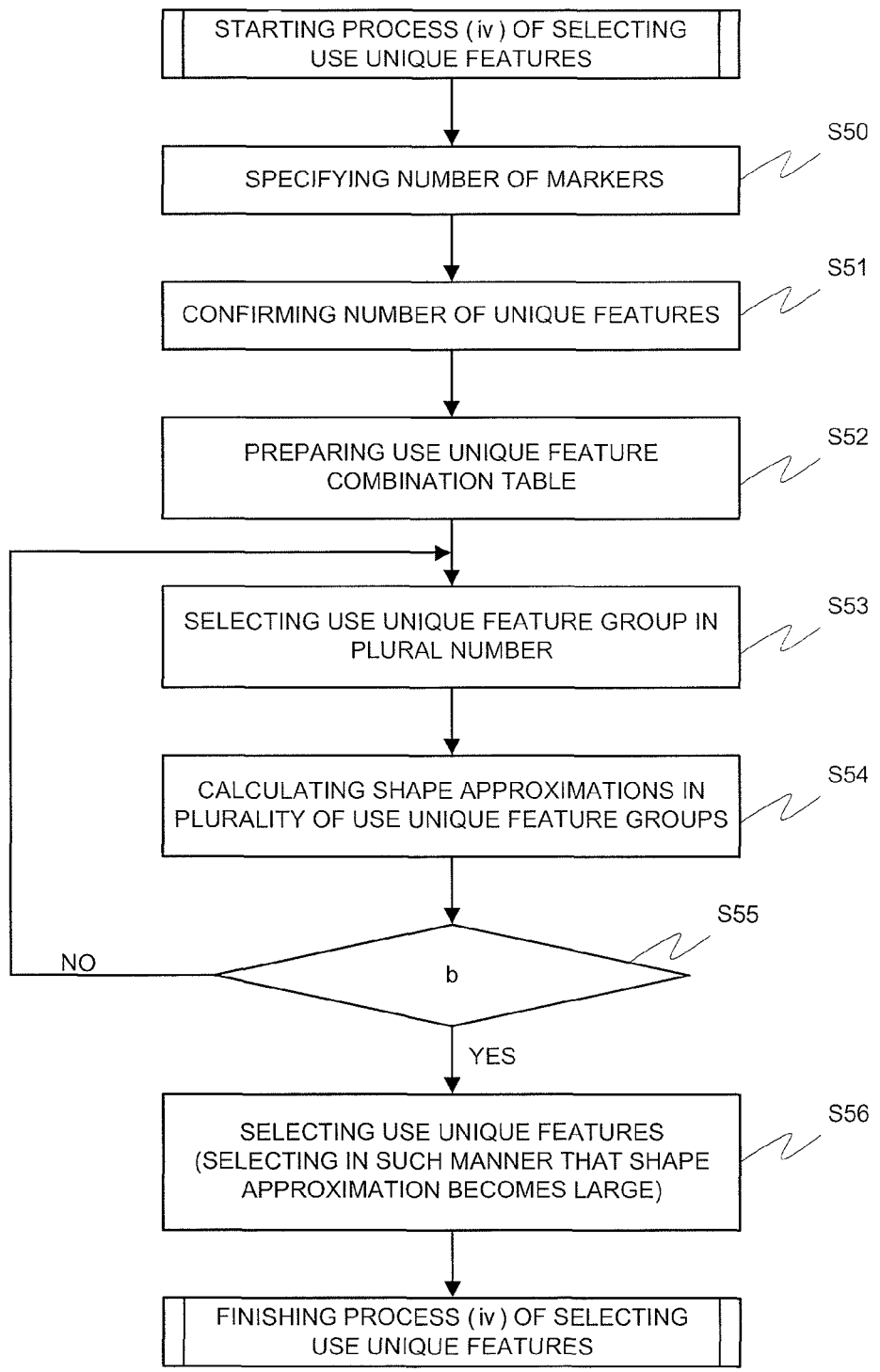
FIG. 25 is a flowchart illustrating an operational procedure of a process (iv) of selecting the use unique features.

FIG. 21 is a flowchart illustrating a processing procedure of the marker generation method.

(A) The Procedure of Generating the Marker

In the marker generation device 1*a*, the unique feature selecting unit 12 of the unique feature selecting means 10 takes out "the feature point detection table" from the unique feature storing unit 11.

And, the unique feature selecting unit 12 selects the segments of which the number of the feature points is zero, or is equal to or less than a predetermined number from the by-segment feature point numbers by making a reference to "the feature point detection table", and defines these segments as the unique features (Step 10).

Next, the unique feature selecting unit 12 puts together data related to the selected unique features into "the unique feature table" (Step 11). And, the unique feature selecting unit 12 causes the unique feature storing unit 11 to store the above "unique feature table".

The marker pattern generating unit 21 of the marker pattern generating means 20*a* takes out "the unique feature table" from the unique feature storing unit 11. And, the marker pattern generating unit 21 selects one unique feature, or two or more that is employed for generating the marker pattern from a plurality of the unique features shown in "the unique feature table", and defines these as the use unique features (Step 12).

As this process of selecting the use unique features, one technique, or two or more, out of four techniques in "the method of selecting the use unique feature" described before may be selected. The procedures of these techniques will be described in details in (B) to (E) to be later mentioned.

Next, the marker pattern generating unit 21 generates one marker pattern, or two or more by employing the use unique features (Step 13). The marker storing unit 22 stores data related to the marker patterns generated by the marker pattern generating unit 21.

(B) The Process of Selecting the Unique Features (i)

(The Use Unique Features are Selected in Such a Manner that the Number of the Unique Features Becomes Many)

The marker pattern generating unit 21 specifies the number of the markers (Step 20).

Next, the marker pattern generating unit 21 confirms the number of the unique features by making a reference to "the unique feature table" (Step 21). Herein, it is assumed that there exist five unique features as shown in FIG. 6.

Continuously, the marker pattern generating unit 21 prepares a list of combinations of the unique features as "a use unique feature combination table" (Step 22). Herein, as shown in FIG. 7, it is assumed that the marker pattern generating unit 21 prepares "the use unique feature combination table" in which 31 options of the combinations of the use unique features each of which is comprised of one unique feature to five unique, features are displayed as a list.

And, the marker pattern generating unit 21 selects the combinations, of which the number of the unique features is many, in a number identical to the number of the specified markers (Step 23). Herein, when it is assumed that the number of the specified markers is three, the marker pattern generating unit 21 selects two, out of the combinations of the use unique feature comprised of five unique features and the use unique feature comprised of four unique features.

(C) The Process of Selecting the Unique Features (II)

(The Use Unique Features are Selected in Such a Manner that a Sum Total of Respective Distances Between the Unique Features Becomes Large.)

The marker pattern generating unit 21 specifies the number of the markers (Step 30).

Next, the marker pattern generating unit 21 confirms the number of the unique features by making a reference to "the unique feature table" (Step 31). Herein, it is assumed that there exist five unique features as shown in FIG. 6.

Continuously, the marker pattern generating unit 21 prepares a list of combinations of the unique features as "a use unique feature combination table" (Step 32). Herein, it is assumed that "the use unique feature combination table" shown in FIG. 7 is prepared.

In addition, the marker pattern generating unit 21 calculates a sum total of the distances between the unique features for each combination of the use unique features shown in "the use unique feature combination table" (Step 33). This result of the calculation is put together as "an inter-unique-feature distance calculation table" (See FIG. 11).

And, the marker pattern generating unit 21 selects the combinations having a large sum total of the distances between the unique features in a number identical to the number of the markers, out of these combinations of the use unique features (Step 34). Herein, when it is assumed that the number of the specified markers is three, the marker pattern generating unit 21 makes a reference to "the inter-unique-feature distance calculation table" (FIG. 11) and selects a combination the use unique features having a largest sum total (the use unique feature comprised of five unique features), a combination of the use unique features having a second largest sum total (the combination of which the sum total is "49.5870", out of the combinations of the use unique features comprised of four unique features), and a combination of the use unique features having a third largest sum total (a combination of which the sum total is "48.7152", out of the combinations of the use unique features comprised of four unique features).

(D) The Process of Selecting the Unique Features (i)

(The Use Unique Feature are Selected in Such a Manner that a Sum Total of Respective Distances Between the Unique Features in Two Use Unique Feature Groups Becomes Large.

The marker pattern generating unit 21 specifies the number of the markers (Step 40).

Next, the marker pattern generating unit 21 confirms the number of the unique features by making a reference to "the unique feature table" (Step 41). Herein, it is assumed that there exist five unique features as shown in FIG. 6.

Continuously, the marker pattern generating unit 21 prepares a list of combinations of the unique features as "a use unique feature combination table" (Step 42). Herein, it is assumed that "the use unique feature combination table" shown in FIG. 7 is prepared.

In addition, the marker pattern generating unit 21 defines each of the combinations of the use unique features shown in "the use unique feature combination table" as the use unique feature group. And, the marker pattern generating unit 21 selects two use unique feature groups or more, out of this plurality of the use unique feature groups (Step 43). The marker pattern generating unit 21 calculates a sum total of respective distances between the unique features in these selected two use unique feature groups or more (Step 44). This calculation of a sum total of respective distances between the unique features is performed for all combinations of two use unique feature groups or more that are selectable, out of a plurality of the use unique feature groups in "the use unique feature combination table" (Step 45).

Additionally, the number of the unique features that constitute the use unique feature group may be limited. For example, as shown in FIG. 14, the number of the unique features that constitute the use unique feature group may be limited to two. In this case, the combination of two use unique feature groups to be selected has 80 options as shown in the same figure. And, a sum total of respective distances between the unique features in these two use unique feature groups to be selected is obtained as shown in FIG. 14.

In addition, the marker pattern generating unit 21 selects the combinations having a large sum total of respective distances between the unique features in a plurality of the use unique feature groups, out of the combinations of these use unique feature groups, in a number identical to the number of the marks to be specified (Step 46). Herein, when two use unique feature groups that are employed for generating the marker are selected by making a reference to FIG. 14, the marker pattern generating unit 21 selects the use unique feature groups (t1, t4, t5) and (t2, t3, t4) of which the sum total is "67.7824" as the combination of the use unique feature group having a largest sum total.

(E) The Process of Selecting the Unique Features (IV)

(The Use Unique Features are Selected in Such a Manner that an Extent of a Difference in the Shapes of the Two Markers Becomes Large.

The marker pattern generating unit 21 specifies the number of the markers (Step 50).

Next, the marker pattern generating unit 21 confirms the number of the unique features by making a reference to "the unique feature table" (Step 51). Herein, it is assumed that there exist five unique features as shown in FIG. 6.

Continuously, the marker pattern generating unit 21 prepares a list of combinations of the unique features as "a use unique feature combination table" (Step 52). Herein, it is assumed that "the use unique feature combination table" shown in FIG. 7 is prepared.

In addition, the marker pattern generating unit 21 defines each of the combinations of the use unique features shown in "the use unique feature combination table" as the use unique feature group. And, the marker pattern generating unit 21 selects two use unique feature groups or more, out of this plurality of the use unique feature groups (Step 53). The marker pattern generating unit 21 calculates the shape approximation in these selected two use unique feature groups or more (Step 54). The marker pattern generating unit 21 performs this calculation of the shape approximation for all combinations of two use unique feature groups or more that are selectable, out of a plurality of the use unique feature groups shown in "the use unique feature combination table" (Step 55).

Additionally, the number of the unique features that constitute the use unique feature group may be limited. For example, as shown in FIG. 20, the number of the unique features that constitute the use unique feature group may be limited to two. In this case, the combination of two use unique feature groups to be selected has 80 options as shown in the same figure. And, the shape approximations in these two use unique feature groups to be selected are obtained as shown in FIG. 20.

In addition, the marker pattern generating unit 21 selects the combinations having a large shape approximation in a plurality of the use unique feature groups, out of the combinations of these use unique feature groups, in a number identical to the number of the marks to be specified (Step 56). Herein, when the marker pattern generating unit 21 selects two use unique feature groups to be employed for generating the marker are selected by making a reference to FIG. 20, it selects the use unique feature groups (t1, t3, t4) and (t2, t3, t5) of which the sum total is "29.5316" as the combination of the use unique feature groups having a largest shape approximation.

Additionally, the number of the use unique features to be selected in the marker pattern generating unit 21, the method of combining the use unique features, the kind and number of the marker pattern to be generated may be arbitrary, respectively.

As explained above, the marker generation device and the marker generation method of this exemplary embodiment makes it possible to generate plural kinds of the marker patterns by employing one part or the whole of a plurality of the unique features.

Further, with regard to the marker pattern to be generated, increasing the number of the above unique features or making the distance between the unique features long enables the marker pattern of which the robustness is high and of which the erroneous detection is not likely to occur to be produced in a plural number.

[The Second Exemplary Embodiment of the Marker Generation Device and the Marker Generation Method]

Next, the second exemplary embodiment of the marker generation device and the marker generation method of the present invention will be explained by making a reference to FIG. 26. The same figure is a block diagram illustrating a configuration of the marker generation means in the marker generating device of this exemplary embodiment.

This exemplary embodiment, as compared with the first exemplary embodiment, differs in a configuration of the marker pattern generating means. That is, while the marker pattern generating means includes the marker pattern generating unit and the marker storing unit in the first exemplary embodiment, the marker pattern generating means further includes a marker ID setting unit in this exemplary embodiment. Other components are similar to those of the first exemplary embodiment. Thus, in FIG. 26, identical codes are added to the component parts similar to FIG. 1, and its detailed explanation is omitted.

(Marker Generation Device)

Figure 26:
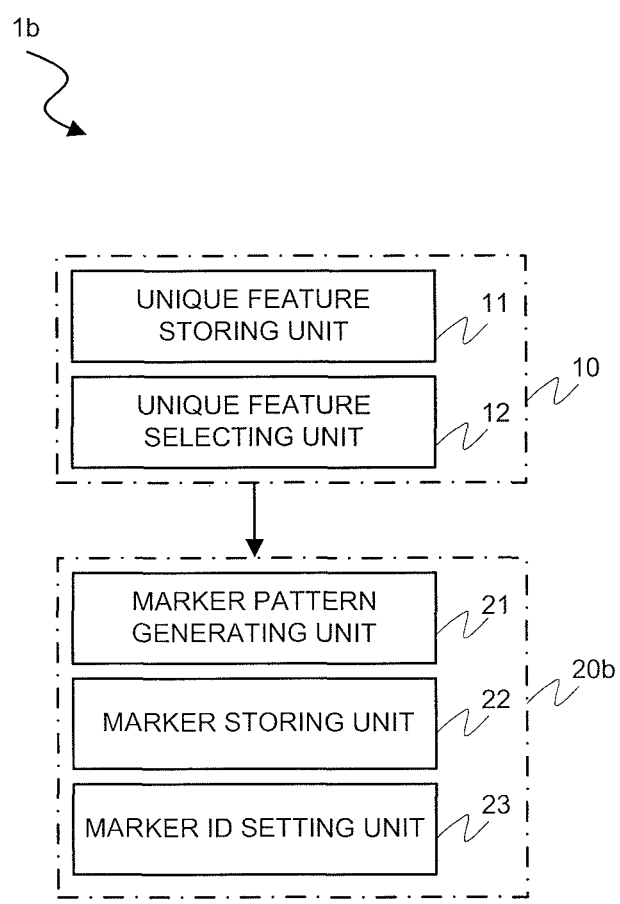
FIG. 26 is a block diagram illustrating a configuration of the marker generation device in a second exemplary embodiment of the present invention.

As shown in FIG. 26, a marker generation device 1*b* includes a unique feature selecting means 10 and a marker pattern generating means 20*b*. Herein, the marker pattern generating means 20*b* includes a marker pattern generating unit 21, a marker storing unit 22, and a marker ID setting unit 23.

The marker ID setting unit (marker setting means) 23 decides which marker is added to which object at the moment of using a plurality of the marker patterns generated in the marker pattern generating unit 21 as IDs.

This deciding procedure could be, for example, (1) a procedure of "specifying the kind of the object", (2) a procedure of "specifying the use unique feature group", (3) a procedure of "putting the use unique feature groups side by side", (4) a procedure of "narrowing down the use unique feature groups", and (5) a procedure of "setting the order in which the markers are added to the objects.

(1) "Specifying the Kind of the Object"

The marker ID setting unit 23 specifies the kind of the object that is distinguished with the marker, namely, the kind of the object that the marker detection device is caused to identify.

For example, when the object is "a drink container", "an aluminum can", "a steel can", "a pet bottle", and the like may be defined as the kind of the object, respectively. Further, when the object is "product to be wholesaled to retailers, "A shop", "B shop", C shop", . . . to which the product is wholesaled may defined as the kind of the object, respectively.

Figure 27:
FIG. 27 is a view illustrating an allocation of the use unique feature groups to the objects.

Additionally, in this exemplary embodiment, it is assumed that the number of the kinds of the objects is eight (objects a, b, c, d, e, f, g, and h) as shown in FIG. 27(*i*). However, the number of the kinds of the objects is not limited to eight, and it could be arbitrary.

(2) "Specifying the Use Unique Feature Group"

Next, the marker ID setting unit 23 specifies the use unique feature groups of which the number is identical to the number of the kinds of the objects.

Herein, the marker ID setting unit 23 firstly decides the number of the unique features constituting the use unique feature group.

The number of the unique features constituting the use unique feature group is governed by the number of the unique features selected by the unique feature selecting means 10. For example, when the number of the unique features selected by the unique feature selecting means 10 is five as shown in FIG. 6, the number of the unique features constituting the use unique feature group is any of "1", "2", "3", "4", and "5" as shown in FIG. 7 as "the number of the unique features".

Further, the number of the combinations of the unique features is 5 with "1", 10 with "2", 10 with "3", 5 with "4", and 1 with "5" as shown in the same figure.

Herein, eight of the markers are required because the number of the kinds of the objects is eight. Thereupon, the marker ID setting unit 23 selects the combinations of which the number of the combinations is eight or more. With the case shown in FIG. 7, the combinations of which the number of the unique features is "2" and "3" matches with this category. And, from a viewpoint of the robustness of the marker, the more the number of the unique features, the better. For this reason, not "2" but "3" is desirably selected as the number of the unique features.

Additionally, while the combination of the unique features (the use unique feature group) is selected in such a manner that the number of the unique features becomes identical in any use unique feature group in this exemplary embodiment, the use unique feature groups do not need to be identical to each other in the number of the unique features, and they may differ from each other. For example, a configuration may be made so that one use unique feature group of which the number of the unique features is "5", five use unique feature groups of which the number of the unique features is "4", and two use unique feature groups of which the number of the unique features is "3" are selected.

(3) "Putting the Use Unique Feature Groups Side by Side"

When a plurality of the use unique feature groups are selected, the marker ID setting unit 23 may put them side by side according to an arbitrary or a certain constant rule (a distance to be calculated with a determined distance calculation process), add the number responding to this putting, and select the marker to be added to the object responding to this number.

The method of putting the above plurality of the use unique feature groups side by side involves (i) putting side by side arbitrarily, (ii) putting side by side by employing the Levenshtein distances, (iii) putting side by side by employing each distance between the unique features in two use unique feature groups, and (iv) putting side by side based upon the shape approximation between two use unique feature groups.

Out of them, the Levenshtein distance, each distance between the unique features in two use unique feature groups, and the shape approximation between two use unique feature groups are equivalent to "the distance to be calculated with the predetermined distance calculation process", respectively. Further, when each distance between the unique features in two use unique feature groups and the shape approximation between two use unique feature groups are calculated by employing an Euclidean distance, this Euclidean distance is equivalent to "the distance to be calculated with the predetermined distance calculation process".

In addition, the process of calculating the Levenshtein distance, the process of calculating each distance between the unique features in two use unique feature groups, the process of calculating the shape approximation between two use unique feature groups, and the process of calculating the Euclidean distance are equivalent to "the predetermined distance calculation process", respectively.

(i) Putting Side by Side Arbitrarily

The marker ID setting unit 23 puts a plurality (ten options in the same figure) of the combinations of the unique features side by side as shown in FIG. 27 (ii) and add the number thereto.

The method of putting a plurality of the combinations of the unique features side by side could be arbitrary (random). Additionally, in FIG. 27 (ii) the number (No.) of each unique feature is regarded as a three-digit numerical figure, and is put side by side in an ascending order. For example, "t1, t2, t3", "t1, t2, t4", and "t3, t4, t5" are defined as "123", "124", and "345", respectively, and are put side by side in an ascending order.

(ii) Putting Side by Side by Employing the Levenshtein Distance

The so-called Levenshtein distance is a numerical value indicating an extent in which two character sequences differ from each other in an information processing logic. For example, the Levenshtein distance is given as a minimum number of times of the procedure necessary for deforming one character sequence into another character sequence by insertion, deletion and replacement of the character.

The specific examples are used for explanation.

The combination of three unique features has ten options as shown in FIG. 7. Specifically, (t1, t2, t3), (t1, t2, t4), (t1, t2, t5), . . . (t3, t4, t5) are combinations thereof.

Herein, attention is paid to the unique feature number (No.) added to each unique feature. For example, when (t1, t2, t3) is compared with (t1, t2, t4), the former becomes identical to the latter by replacing "t3" of the former with "t4". That is, the former can be converted into the latter with one-time replacement, whereby the Levenshtein distance between them is "1".

Further, when (t1, t2, t3) is compared with (t1, t4, t5), the former becomes identical to the latter by replacing "t2" of the former with "t4", and in addition, replacing "t3" of the former with "t5". That is, the former can be converted into the latter with two-time replacement, whereby the Levenshtein distance between them is "2".

Calculating the Levenshtein distance between each of a plurality of the use unique feature groups between the other in such a manner yields a result shown in FIG. 28.

In the same figure, for example, the Levenshtein distance between (t1, t2, t4) with use unique feature group "No. 2" and (t1, t3, t4) with "No. 4" is "1", and the Levenshtein distance between (t1, t4, t5) with use unique feature group "No. 6" and (t2, t3, t4) with "No. 7" is "3".

And, a plurality of the use unique feature groups are put side by side based upon the Levenshtein distances thereof.

At first, one use unique feature group, being a reference, is decided. Herein, (t1, t2, t3) with "No. 1" is defined as the use unique feature group, being a reference. This use unique feature group, being a reference, is arranged in a first place of a plurality of the use unique feature groups Next, the use unique feature groups other than the use unique feature group, being a reference, are put side by side in a second place and after it in an ascending order of the Levenshtein distances, to begin with the use unique feature group having a smallest Levenshtein distance.

For example, the smallest value of the Levenshtein distance is "1". And, the use unique feature groups of which the Levenshtein distance with the use unique feature group (t1, t2, t3) is "1" are the use unique feature group with "No. 2" and the use unique feature group with "No. 3". Thereupon, these "No. 2" and "No. 3" are arranged in the second place and the third place, respectively. Additionally, any of "No. 2" and "No. 3" may be arranged in the second place or in the third place because each has the Levenshtein distance of "1".

Continuously, the second smallest value of the Levenshtein distance, next to "1", is "2". In this case, the use unique feature groups of which the Levenshtein distance with the use unique feature group (t1, t2, t3), being a reference, is "2" are the use unique feature groups with "No. 4", "No. 5", and "No. 6". Thereupon, these "No. 4", "No. 5" and "No. 6" are arranged in the fourth place, the fifth place, and the sixth place, respectively. Additionally, any of "No. 4", "No. 5", and "No. 6" may be arranged in the fourth place, the fifth place, and the sixth place because each has the Levenshtein distance of "2".

In addition, the similar process is performed for the use unique feature groups of which the Levenshtein distance is "3".

As a result, a plurality of the use unique feature groups are arranged similarly to the left column of FIG. 27 (ii).

Further, when "t1, t2, t4" with "No. 2" is defined as the use unique feature group, being a reference, a plurality of the use unique feature groups are arranged based upon the Levenshtein distances as shown in FIG. 29 (*i*).

In addition, when "t2, t3, t5" with "No. 8" is defined as the use unique feature group, being a reference, a plurality of the use unique feature groups are arranged based upon the Levenshtein distances as shown in FIG. 29 (*ii*).

Additionally, also when "No. 3" to "No. 7", "No. 9", and "No. 10" are defined as the reference, respectively, the use unique feature groups may be arranged based upon the Levenshtein distances.

(iii) Putting Side by Side by Employing Each Distance Between the Unique Features in Two Use Unique Feature Groups When a plurality of the use unique feature groups are put side by side, respective distances between the unique features in these use unique feature groups may be employed.

Respective distances between the unique features in a plurality of the use unique feature groups was explained in "(3) the technique of selecting the use unique features in such a manner that a sum total of respective distances between the unique features in two use unique feature groups becomes large" of "(the method of selecting the use unique features)" of the first exemplary embodiment.

According to this explanation, for example, when, in a case where five use unique features are selected as shown in FIG. 6, the marker is generated by using three unique features of them, a sum total of respective distances between the unique features in two use unique feature groups is calculated as shown in FIG. 14.

Herein, when the use unique feature group (t1, t2, t3) with "No. 1" is defined as the use unique feature group, being the reference, the distance between this use unique feature group, being the reference, and each of the other use unique feature groups is shown in FIG. 30. In the same figure, out of the sum totals shown in FIG. 14, ones associated with the use unique feature group (t1, t2, t3) are extracted and put side by side in an order of the number (No.) of the use unique feature group.

Next, the use unique feature groups other than the use unique feature group, being the reference, are put side by side in an ascending order of the sum total (the distance), to begin with the use unique feature group having a smallest sum total (to begin with the use unique feature group having a nearest distance). A result of the putting is shown in FIG. 31. Putting a plurality of the use unique feature groups side by side by employing the distance between two use unique feature groups in such a manner yields an order of "1", "7", "2", "4", "8", "3", "5", "9", "10", and "6" as shown in the same figure.

Likewise, when the use unique feature group with "No. 2" is defined as the reference, the distance between this and each of the other use unique feature groups is shown In FIG. 32.

And, when respective use unique feature groups are re-put side by side based upon a sum total of respective distances between the unique features in these use unique feature groups, a result shown in FIG. 33 is obtained. That is, a plurality of the use unique feature groups are put side by side in an order of "2", "1", "7", "4", "3", "8", "5", "9", "6", and "10".

In addition, the use unique feature group with "No. 8" is defined as the reference, the distances between this and each of the other use unique feature groups is shown in FIG. 34

And, when respective use unique feature groups are re-put side by side based upon each distance between the unique features in these use unique feature groups, a result shown in FIG. 35 is obtained. That is, a plurality of the use unique feature groups are put side by side in an order of "8", "1", "7", "5", "3", "4", "2", "10", "9", and "6".

(iv) Putting Side by Side by Employing the Shape Approximation Between Two Use Unique Feature Groups When a plurality of the use unique feature groups are put side by side, respective shape approximations between each of these use unique feature groups and the other may be employed.

The shape approximation between two use unique feature groups was explained in "(4) the technique of selecting the use unique features in such a manner that an extent of a difference in the shapes of two markers becomes large" of "the method of selecting the use unique features" of the first exemplary embodiment. According to this explanation, when, in a case where the unique features are selected as shown in FIG. 6, the marker is generated by using three unique features, the shape approximation between two use unique feature groups is calculated as shown in FIG. 20.

Herein, when the use unique feature group (t1, t2, t3) with "No. 1" is defined as the use unique feature group, being the reference, the shape approximation between this use unique feature group, being the reference, and each of the other use unique feature groups is shown in FIG. 36.

And, the use unique feature groups can be put side by side in an ascending order of these shape approximations, to begin with the use unique feature group having a smallest shape approximation. A result of this putting is shown in FIG. 37. Putting a plurality of the use unique feature groups side by side by employing the shape approximation between two use unique feature groups in such a manner yields an order of "1", "10", "7", "2", "6", "9", "8", "4", "3", and "5" as shown in the same figure.

Likewise, when the use unique feature group with "No. 2" is defined as the reference, the shape approximation between this and each of the other use unique feature groups is shown in FIG. 38.

And, when respective use unique feature groups are re-put side by side based upon the shape approximation of these use unique feature groups, a result shown in FIG. 39 is obtained. That is, a plurality of the use unique feature groups are put side by side in an order of "2", "1", "4", "7", "6", "9", "3", "10", "8", and "5".

In addition, the use unique feature group with "No. 8" is defined as the reference, the shape approximation between this and each of the other use unique feature groups is shown in FIG. 40.

And, when respective use unique feature groups are re-put side by side based upon the shape approximation of these use unique feature groups, a result shown in FIG. 41 is obtained. That is, a plurality of the use unique feature groups are put side by side in an order of "8", "9", "10", "3", "5", "1", "7", "2", "6", and "4".

(4) "Narrowing Down the Use Unique Feature Groups"

When a plurality of the use unique feature groups are put side by side, next, the marker ID setting unit 23 selects the use unique feature groups to be employed for generating the marker from among this plurality of the use unique feature groups.

For example, when the number of the options of the use unique feature groups is ten, and the number of the kinds of the object is eight, eight are selected from among ten use unique feature groups.

This selection method involves "selecting by using the number (No.), "selecting responding to the kind of the object", and "selecting responding to the robustness of the marker"

(i) "Selecting by Using the Number"

The number is added to each of a plurality of the use unique feature groups to select the use unique feature groups of which the number of the unique features is identical to that of the kinds of the objects in an ascending order of the number and these are defined as the use unique feature groups to be employed for generating the marker.

Specifically, for example, as shown in FIG. 27 (*i*) to (*iii*), when, in a case where the number of the kinds of the object is eight (the same figure (i)), the number is sequentially added to each of a plurality of the use unique feature groups, to begin with "1" (the same figure (ii)), the use unique feature groups with "No. 1" to "No. 8" are selected in this order of No., and these selected use unique feature groups are defined as the use unique feature groups that are employed for generating the marker, and are caused to correspond for each kind of the object (the same figure (iii)).

Additionally, while this exemplary embodiment selected the use unique feature groups in an order of the number on the assumption that eight use unique feature groups are selected in an ascending order, to begin with "1", in such a manner of an order of "1" to "8", the selection order is not limited hereto, and, for example, eight continuous numbers may be selected, to begin with the number other than "1" in such a manner of "3" to "10", or eight numbers including the continuous numbers having a predetermined number in a plural number may be selected as a whole in such a manner of "1" to "4" and "7" to "10".

Further, when the number of the kinds of the objects is four, for example, the use unique feature groups with "1", "3", "5", and "7" my be selected.

(ii) "Selecting to Responding to the Robustness of the Marker"

When two use unique feature groups exist, it can be safely said that the larger the shape approximation between them, the higher the mutual robustness. Thereupon, at the moment of selecting the use unique feature groups, it is preferable to select them in such a manner that the shape approximation becomes high.

Herein, when the use unique feature group of "1" is defined as the reference, the shape approximation between the use unique feature group of "1" and each of other use unique feature groups is shown in FIG. 36.

And, the use unique feature groups of which the shape approximation is high are selected from the same figure.

For example, the use unique feature group of which the shape approximation is largest from a viewpoint of the use unique feature group "1", being the reference, is the use unique feature group of "No. 5".

The use unique feature group having a second largest shape approximation is the use unique feature group of "No. 3".

With the use unique feature group "1" defined as the reference, a situation in which the other use unique feature groups are put side by side so as to yield a descending order of the shape approximations is shown in FIG. 37.

And, the use unique feature groups that are employed for generating the marker may be selected by employing the same figure in such a manner that the shape approximation as against the use unique feature group, being the reference, becomes large. Specifically, with the case of FIG. 37, the use unique feature groups to be selected are "5", "3", "4", "8", "9", "6", and "2" besides "1".

Additionally, herein, while the robustness of "5" to "2" is high as against "1", it is not known from FIG. 37 whether the robustness between "5" and "3" and the robustness between "9" and "6" are high. In this case, employing the shape approximation of "3" when "5" is defined as the reference, employing the shape approximation of "6" when "9" is defined as the reference, or the like enables the use unique feature groups for generating the marker to be selected.

(iii) "Selecting Responding to the Kind of the Object"

The kind of the object may be arbitrarily decided by a user of the marker generation device or the marker detection device, and the like.

For example, as described before, when the object is a beverage container, and the kind of the object is an aluminum can, a steel can, a pet bottle, and the like, the kind of the object can be identified by adding the different marker for each kind because no vertical relationship (hierarchy) among these kinds exists, and they are equal.

On the other hand, when a vertical relationship (hierarchy) among the kinds of the objects exists, it is desirable to perform the selection of the marker according hereto.

For example, it is thinkable that the object is retort food, wherein the kinds of the objects are curry, stew, and chukadon, respectively, and the kinds such as sweetness, dry taste, and mid-spiciness are prepared. In this case, each of curry, stew, and chukadon is a high-level hierarchy, and each of sweetness, dry taste, and mid-spiciness is a low-level hierarchy as against curry. At this time, upon comparing the erroneous recognition between curry and stew with the erroneous recognition between sweetness and dry taste, the former erroneous recognition should be eliminated all the more as compared with the latter one. That is, it is desirable that each robustness between the kinds is enhanced in the high-level hierarchy as compared with the low-level hierarchy.

Thereupon, the use unique feature groups are selected in such a manner that the robustness fluctuates responding to the hierarchical level of the kind of the object. This is done by employing the shape approximation between the markers.

The shape approximation between the markers is shown in FIG. 20. In the same figure, the shape approximation between the use unique feature group of "No. 4" and the use unique feature group of "No. 8" is highest.

Next, the marker ID setting unit 23 arranges the other use unique feature groups side by side with the use unique feature group of "No. 4" defined as the reference. A result of this arrangement is shown in FIG. 43.

As shown in the same figure, when the use unique feature group of "No. 4" is defined as the reference, the use unique feature groups are arranged side by side in such a manner of "4", "2", "7", "1", "5", "10", "6", "3", "9", and "8".

Continuously, the marker ID setting unit 23 selects the use unique feature groups for generating the marker based upon an arrangement of the use unique feature groups. Herein, it is assumed that the marker ID setting unit 23 selects three (curry, stew, and chukadon) as the high-level kinds, and three (sweetness, dry taste, and mid-spiciness) as the low-level kinds of curry.

At first, the marker ID setting unit 23 selects "4" and "8" because the robustness between them is highest.

Next, when it is assumed that that "4" is curry, the marker ID setting unit 23 selects the numbers from among the numbers close to this "4" as the low-level kinds of curry. Specifically, the marker ID setting unit 23 selects "2" and "7" located next to "4".

In addition, the marker ID setting unit 23 selects the numbers located between "7" and "8". The marker ID setting unit 23 selects, for example, "6" in an arrangement shown in FIG. 43. This is done for a purpose of enhancing the robustness of one of the high-level kinds with the other as much as possible.

With this, "4", "2", "7", "6", and "8" may be selected.

(5) "Setting the Order in which the Markers are Added to the Objects"

The marker ID setting unit 23, upon selecting the use unique feature groups for generating the marker from among a plurality of the use unique feature groups, decides which kind of the object is used for allocation to each of these selected use unique feature groups.

In the example described before, "4", "2", "7", "6", and "8" were selected as the use unique feature groups for generating the marker.

"4", "2", and "7", out of them, are allocated to the low-level kinds because the shape approximation between each of them and the other is small. Specifically, "4", "2", and "7" are allocated to sweetness, dry taste, and mid-spiciness of curry, respectively.

Further, "6" and "8" are allocated to the high-level kinds because the shape approximation of "6" and "8" with "4" is large. Specifically, "6" and "8" are allocated to stew and chukadon.

A situation in which the markers are added to the objects according to this allocation is shown in FIG. 44.

Next, the marker ID setting unit 23 puts together a result of the allocation as "an object-marker correspondence table".

A configuration example of this "object-marker correspondence table" is shown in FIG. 45.

As shown in the same figure, "the object-marker correspondence table" may be configured with "the kind of the object" and "the number of the marker pattern" taken as an item, respectively.

Making a reference to this "object-marker correspondence table" enables the kind of the object to which the detected marker corresponds to be grasped.

This "object-marker correspondence table" is stored in the marker storing unit 22.

The different marker can be added for each kind of the object, and the kind of each object can be distinguished and detected in the marker detection stage by executing these procedures (1) to (5), thereby to select two use unique feature groups or more from among a plurality of the use unique feature groups, causing these selected use unique feature groups to correspond to respective kinds of the objects, respectively, and adding the markers to the corresponding objects.

(A method of generating the marker)

Next, an operation of the marker generation device of this exemplary embodiment (a method of generating the marker) will be explained by making a reference to FIG. 46.

Figure 46:
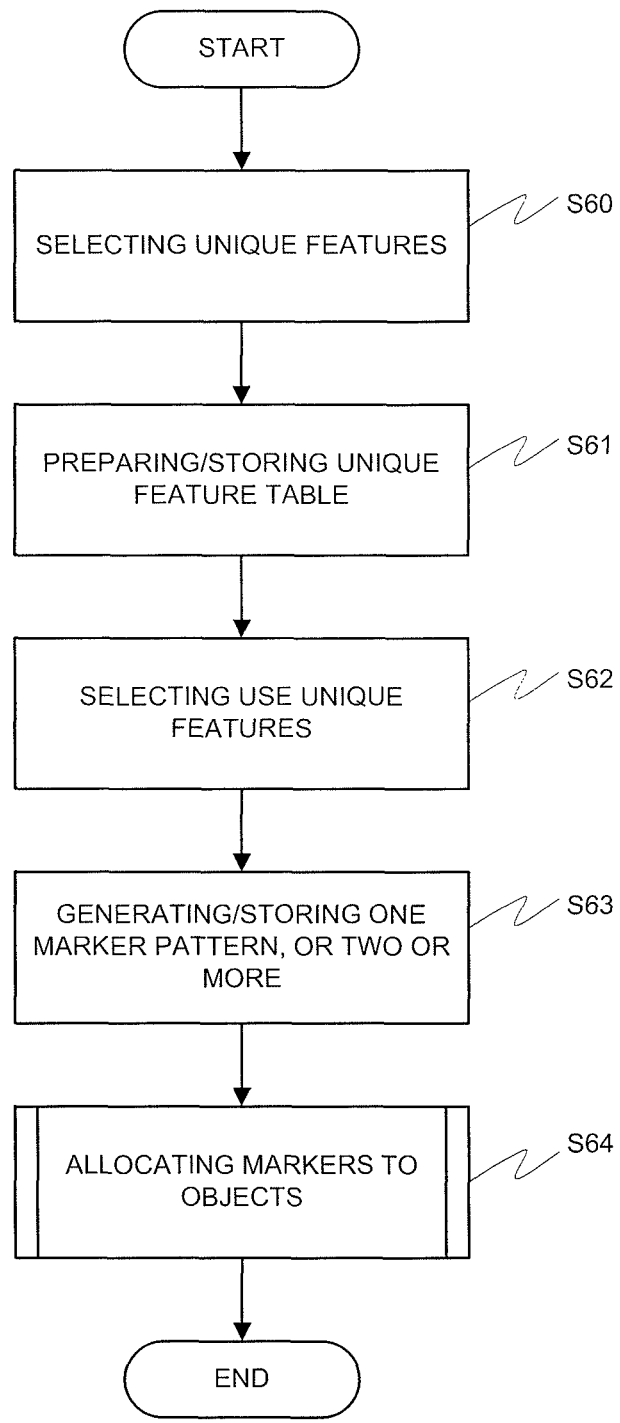
FIG. 46 is a flowchart illustrating an operational procedure of the marker generation device (marker generation method) in a second exemplary embodiment of the present invention.

FIG. 46 is a flowchart illustrating a processing procedure of the marker generation method.

In the marker generation device 1b, the unique feature selecting unit 12 of the unique feature selecting means 10 takes out "the feature point detection table" from the unique feature storing unit 11.

And, the unique feature selecting unit 12 makes a reference to "the feature point detection table", selects the segments of which the number of the feature points is zero, or is equal to or less than a predetermined number from the by-segment feature point numbers, and defines these as the unique features (Step 60).

Next, the unique feature selecting unit 12 put together data related to the selected unique features into "the unique feature table" (Step 61). And, the unique feature selecting unit 12 causes the unique feature storing unit 11 to store the above "unique feature table".

The marker pattern generating unit 21 of the marker pattern generating means 20b takes out "the unique feature table" from the unique feature storing unit 11. And, the marker pattern generating unit 21 selects one unique feature, or two or more to be employed for generating the marker pattern from among a plurality of the unique features shown in "the unique feature table", and defines these as the use unique feature (Step 62).

This selection of the use unique feature may be performed by employing one technique, or two or more, out of four techniques in the "the method of selecting the use unique features".

Next, the marker pattern generating unit 21 generates the marker pattern in a plural number by employing the use unique features (Step 63).

The marker storing unit 22 stores data related to the marker patterns generated by the marker pattern generating unit 21.

Continuously, the marker ID setting unit 23 of the marker pattern generating means 20b allocates a plurality of the marker patterns generated by the marker pattern generating unit 21 to plural kinds of the objects, respectively (Step 64).

And, the marker ID setting unit 23 puts together a result of this allocation into "the object-marker correspondence table", and causes the marker storing unit 22 to store it.

Figure 47:
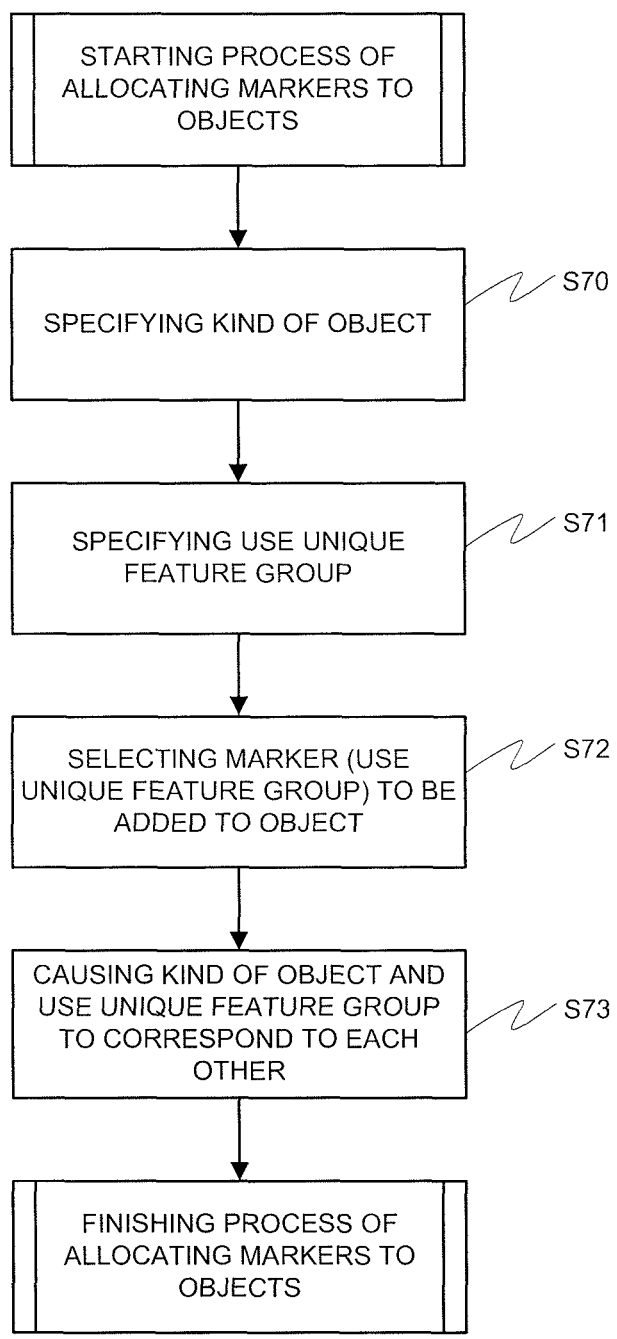
FIG. 47 is a flowchart illustrating a procedure of allocating the markers to the objects.

Next, a process of allocating the markers to the objects will be explained by making a reference to FIG. 47.

The marker ID setting unit 23, at the moment of using a plurality of the marker patterns generated by the marker pattern generating unit 21 as ID, decides which marker is added to which object (a process of allocating the markers to the objects).

At first, the marker ID setting unit 23 specifies the kinds of the object that are classified by use of the marker, namely, the kinds of the objects that the marker detection device is caused to identify (Step 70).

Next, the marker ID setting unit 23 specifies the use unique feature groups of which the number is equal to that of the kinds of the objects (Step 71).

Continuously, the marker ID setting unit 23 put the specified plural use unique feature groups side by side according to an arbitrary or a certain constant rule, and adds the number (No.) responding to this putting, and selects the markers that are added to the objects responding to this number (No.) (Step 72).

The technique of putting a plurality of the use unique feature groups side by side involves, for example, (i) putting side by side arbitrarily, (ii) putting side by side by employing the Levenshtein distance, (iii) putting side by side by employing each distance between the unique features in two use unique feature groups, and (iv) putting side by side based upon the shape approximation between two use unique feature groups.

Further, the technique of selecting the markers to be added to the objects involves "selecting by using the number (No.)", "selecting responding to the kind of the object", and "selecting responding to the robustness of the marker".

And, when the marker ID setting unit 23 selects the use unique feature groups for generating the marker from among a plurality of the use unique feature groups, it decides to which kind of the object is added to each of these selected use unique feature groups (a correspondence between the kind of the object and the use unique feature group, Step 73).

Next, the marker ID setting unit 23 puts together a result of the allocation as "the object-to-marker correspondence table". This "object-to-marker correspondence table" is stored in the marker storing unit 22.

Executing such a procedure enables the different marker to be added for each kind of the object. For this, it is possible to identify and detect the kind of each object in the marker detection stage.

Further, a plurality of the generated markers may be used as object ID. In this case, putting the markers side by side in an order from the nearest one to the most faraway one enables the ordered ID (for example, 4, 2, 7, . . . ) to be produced.

In addition, with the case in which the kinds of the objects assumes a hierarchical structure, employing the faraway use unique feature groups for the high-level hierarchy, and on the other hand, employing the near use unique feature groups for the low-level hierarchy makes it possible to yield a configuration such that even if the erroneous detection occurs at the time of the detection, the erroneous detection is likely to occur in the low-level hierarchy and the erroneous detection is not likely to occur in the high-level hierarchy. With this, endurance against the erroneous detection can be enhanced, and the order information can be almost correctly detected.

(The Third Exemplary Embodiment of the Marker Generation Device and the Marker Generation Method)

Next, the third exemplary embodiment of the marker generation device and the marker generation method of the present invention will be explained by making a reference to FIG. 48.

The same figure is a block diagram illustrating a configuration of the marker generation device of this exemplary embodiment.

Figure 48:
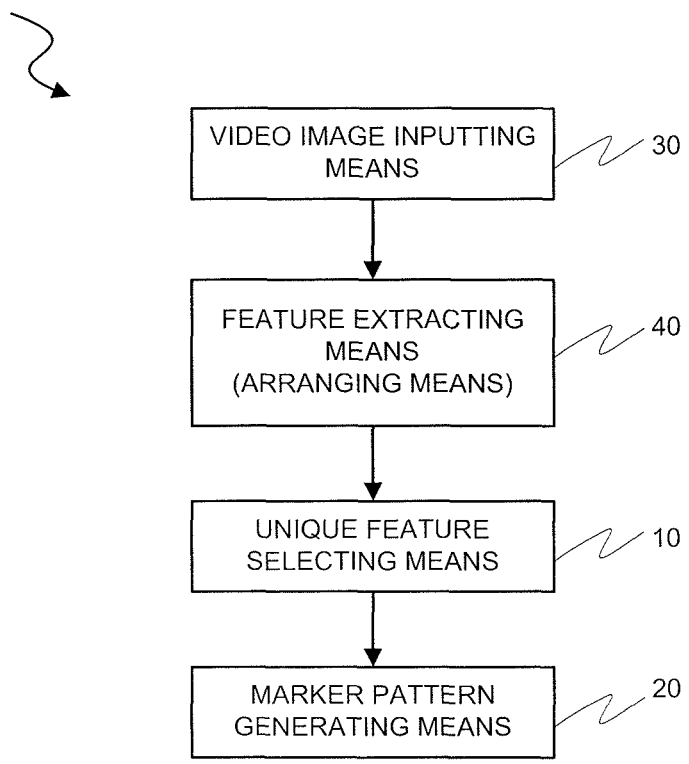
FIG. 48 is a block diagram illustrating a configuration of the marker generation device in a third exemplary embodiment of the present invention.

As shown in FIG. 48, a marker generation device 1c includes a unique feature selecting means 10, a marker pattern generating means 20, a video image inputting means 30, and a feature extracting means 40, being an arranging means.

Figure 49:
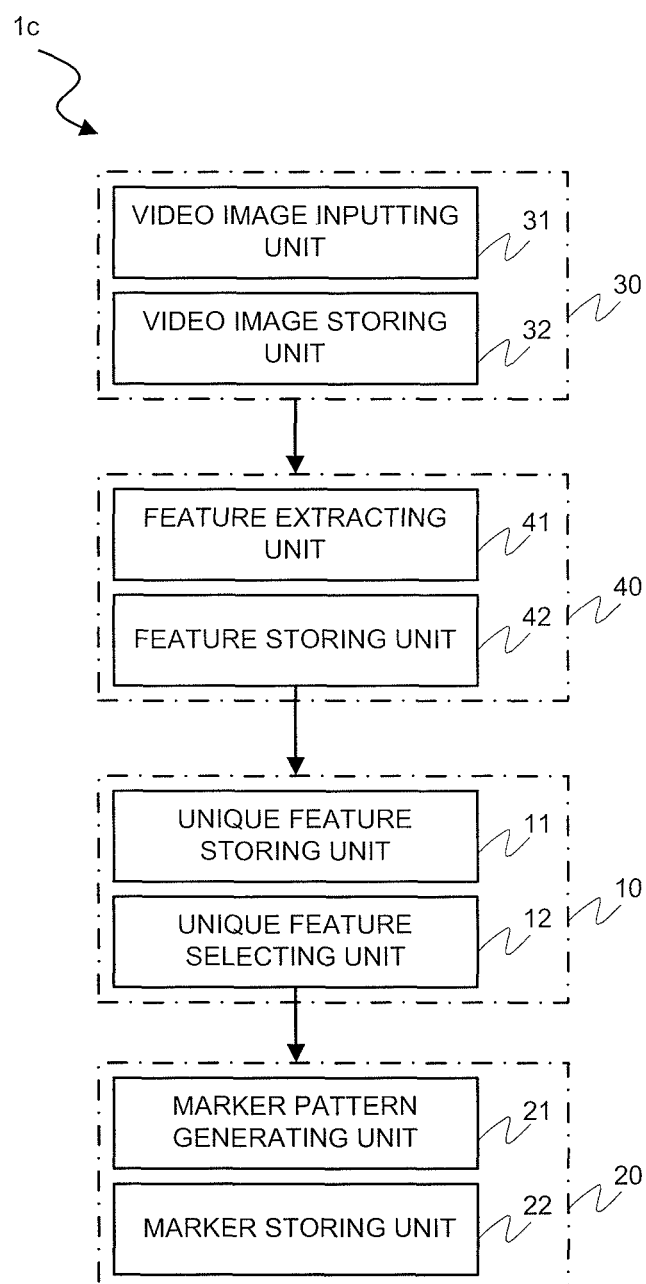
FIG. 49 is a block diagram illustrating a detailed configuration of the marker generation device in the third exemplary embodiment of the present invention.

Herein, the video image inputting means 30 includes a video image inputting unit 31 and a video image storing unit 32 as shown in FIG. 49.

The video image inputting unit 31 inputs the background video images.

The background video image is a video image obtained by imaging the environment (the environment in which no marker exists) prior to using the markers that are generated by the marker generation device 1c. For example, when a belt-conveyer for transporting the object added with the marker exists, the above background video image is equivalent to a video image obtained by imaging the belt-conveyer in the situation of not transporting the above object and its neighbor, or the like.

The above background video image could be a moving image (video image), and further, could be plural pieces of the still images taken at a predetermined time interval.

In addition, the above background video image may include a live video image, a recorded video image, a delivered video image, or the like.

Further, the video image inputting unit 31 may include the imaging device for itself. In this case, the video image inputting unit 31 may image the situation adjacent the location in which the corresponding marker generation device 1c has been mounted as the background video image.

In addition, the video image inputting unit 31 may input the background video images incorporated by devices other than the corresponding marker generation device 1c via a communication network, a communication cable or the like.

Figure 50:
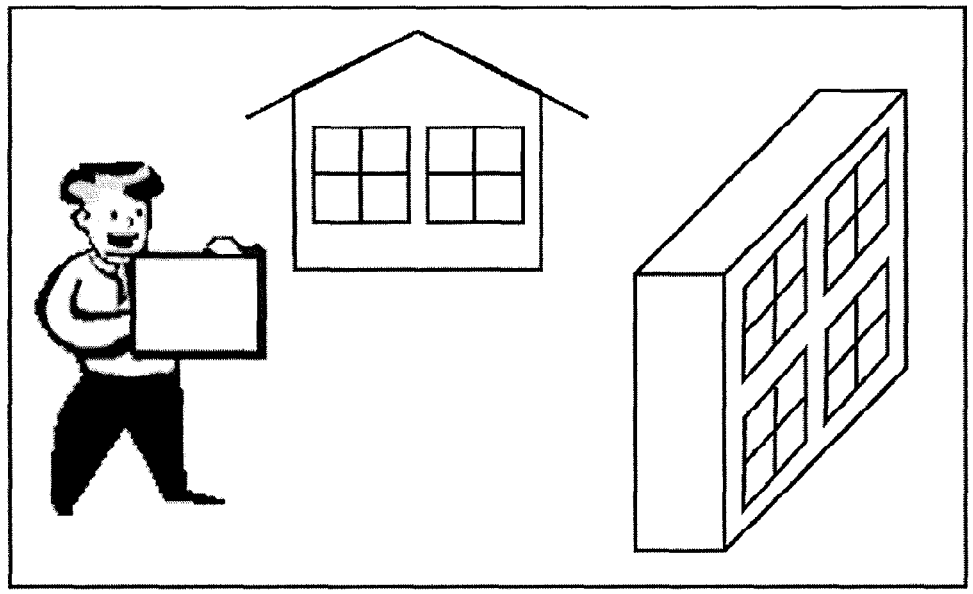
FIG. 50 is a view illustrating an example of the background video image.

An example of the background video images imaged or inputted by this video image inputting unit 31 is shown in FIG. 50.

The video image storing unit 32 stores the still images constituting the background video image as digitized frame images.

Further, the video image storing unit 32 stores the number added to each of a plurality of the frame images (for example, serial number). This number uniquely identifies one piece of the frame image. The above number is equivalent to (i−11) in FIG. 50.

In addition, the video image storing unit 32 may also store information specifying a time when the frame image was taken, a device that imaged the frame image, and the like (in a case where the frame image was inputted from the outside).

The feature extracting means 40, as shown in FIG. 49, includes a feature extracting unit 41 and a feature storing unit 42.

The feature extracting unit 41 takes out the frame images from the video image storing unit 32. And, the feature extracting unit 41 extracts the image features containing characteristic patterns within the taken-out frame images.

For the image feature, the feature extracting unit 41 may use a graphically distinctive property in the form of numeric values, for example.

Figure 51:
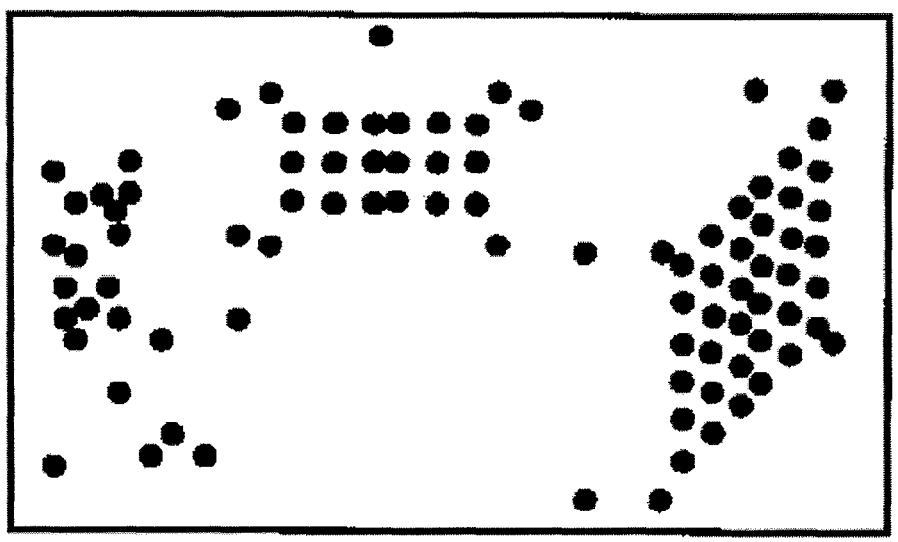
FIG. 51 is a view illustrating a feature space having a plurality of the feature points extracted from the background video image shown in FIG. 50 arranged therein.

For example, the method disclosed by T. Tommasini, et al. in "Making good features track better" presented in Proceedings of IEEE International Conference on Computer Vision and Pattern Recognition (1998) may be used therefor. This method is capable of extracting vertices of a shape of the object, intersections of linear objects, endpoints, etc. in the image. And, a series of position coordinate information of these points on the image may be defined as graphical features. For example, upon extracting the feature points for the frame image of FIG. 50 with this method, the feature points are arranged in plural number as shown in FIG. 51. The feature points may be managed with the coordinates on a one-by-one basis.

Additionally, the space having the feature points arranged therein is called a feature space. This feature space may be two-dimensional or may be three-dimensional. The space feature of this exemplary embodiment is assumed to be two-dimensional.

Further, as another method, there exists, for example, the method disclosed by Montanari in "On the option detection of curves in noisy pictures," Communications of ACM, 14, 1971. According to this, entries in an R table in which a distance from a reference point and a relative angle are stored may be used as the features. At this moment, by defining the reference point for all feature positions and exhaustively extracting the features, the marker may be made robust against partial loss of the features.

In addition, as another method of extracting the features, for example, there exists the method of using a luminance value or a color difference value of each pixel on the image as the feature.

Figure 52:
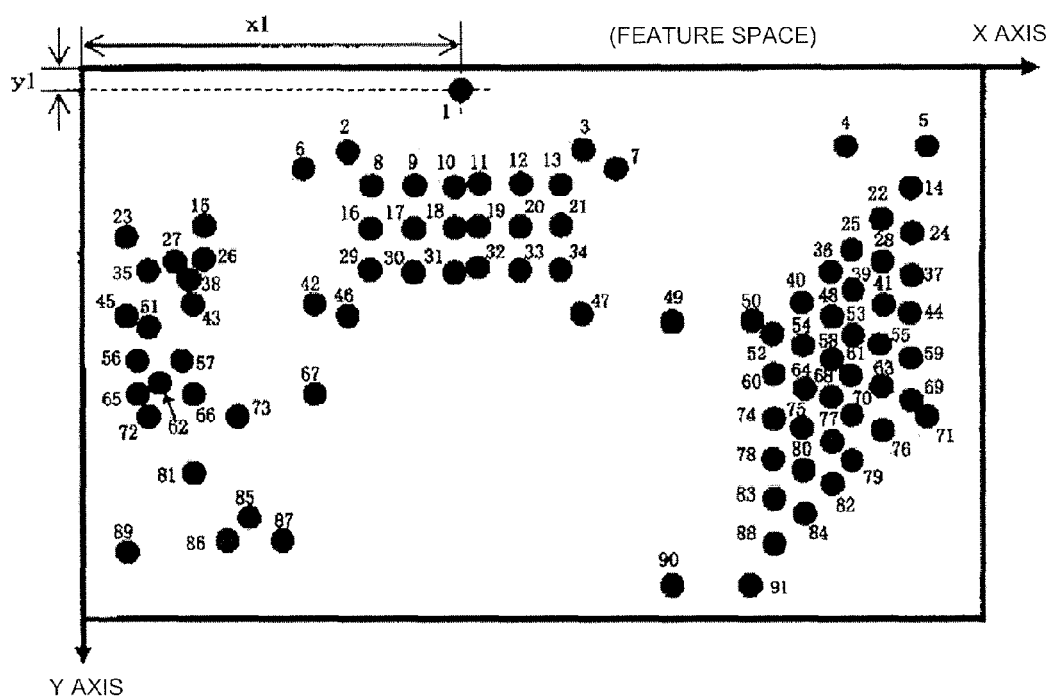
FIG. 52 is a view illustrating a situation in which numbers are added to the feature points arranged in the feature space.

Next, the feature extracting unit 41 adds the serial number to each of the feature points as shown in FIG. 52. This serial number may be added in the descending order of the feature point, to being with the highest-ranked feature point, in such a manner of 1, 2, 3, 4, . . . .

Continuously, the feature extracting unit 41 obtains respective coordinates of the feature points. For the coordinates, as shown in FIG. 52, an X axis and a Y axis may be set in the feature space to define a distance from the Y axis and a distance from the X axis as an X coordinate and a Y coordinate, respectively.

And, the feature extracting unit 41 causes the feature storing unit 42 to store the serial numbers and the coordinates of these feature points. The feature storing unit 42 may store these serial numbers and coordinates and the like as "a feature point information table" as shown in FIG. 53.

"The feature point information table", as shown in the same figure, may include "the serial number of the frame image" (A), "the serial number of the feature point" (B), "the x coordinate of the feature point" (C), "the y coordinate of the feature point" (D), "the coordinate of the segment in which the feature point is positioned" (E) and "the information related to the feature point" (F) as an item, respectively.

"The serial number of the frame image" is indicative of the number added to the frame image from which the feature points have been extracted.

"The information related to the feature points" may incorporate, for example, elements (edges, an intersections, etc.) recognized as the features as well as hue, brightness, and chroma of the pixel in which the feature point is positioned, and the like.

Additionally, "the coordinate of the segment in which the feature point is positioned" will be described later.

Figure 54:
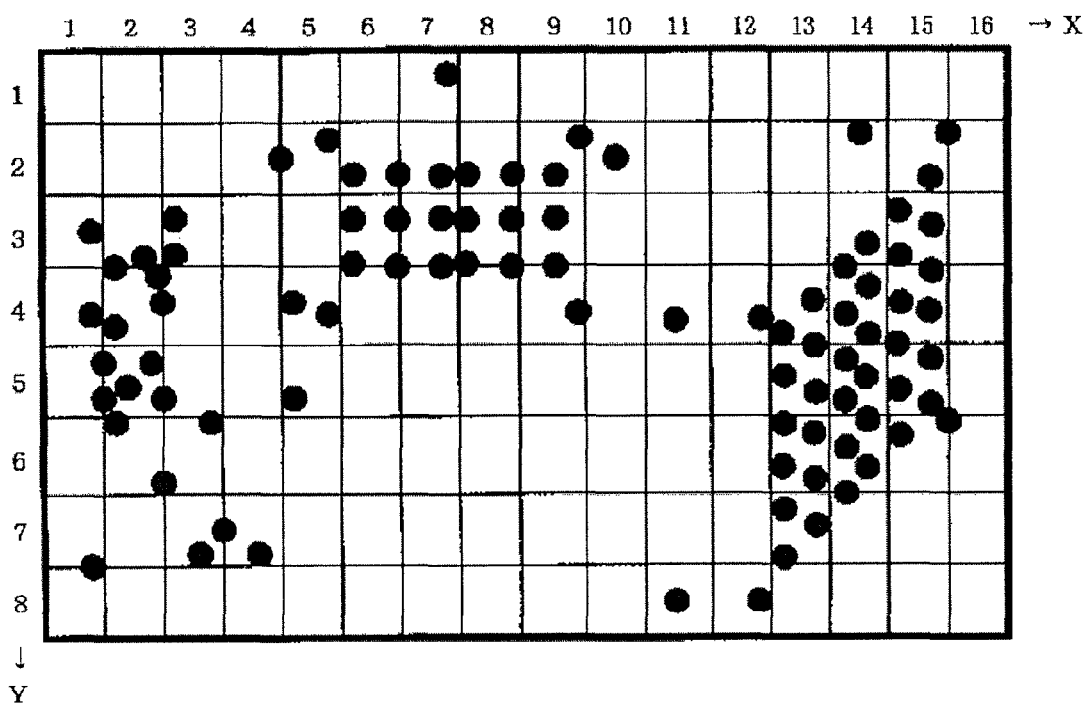
FIG. 54 is a view illustrating the feature space having segment lines added hereto.

Next, the feature extracting unit 41 divides the feature space into a plurality of segments by using grid-shape mesh cells as shown in FIG. 54.

At this moment, the feature extracting unit 41 calculates the coordinate of each segment. This coordinate of each segment may be displayed by coordinates of lines for separating each segment (segment lines).

Figure 55:
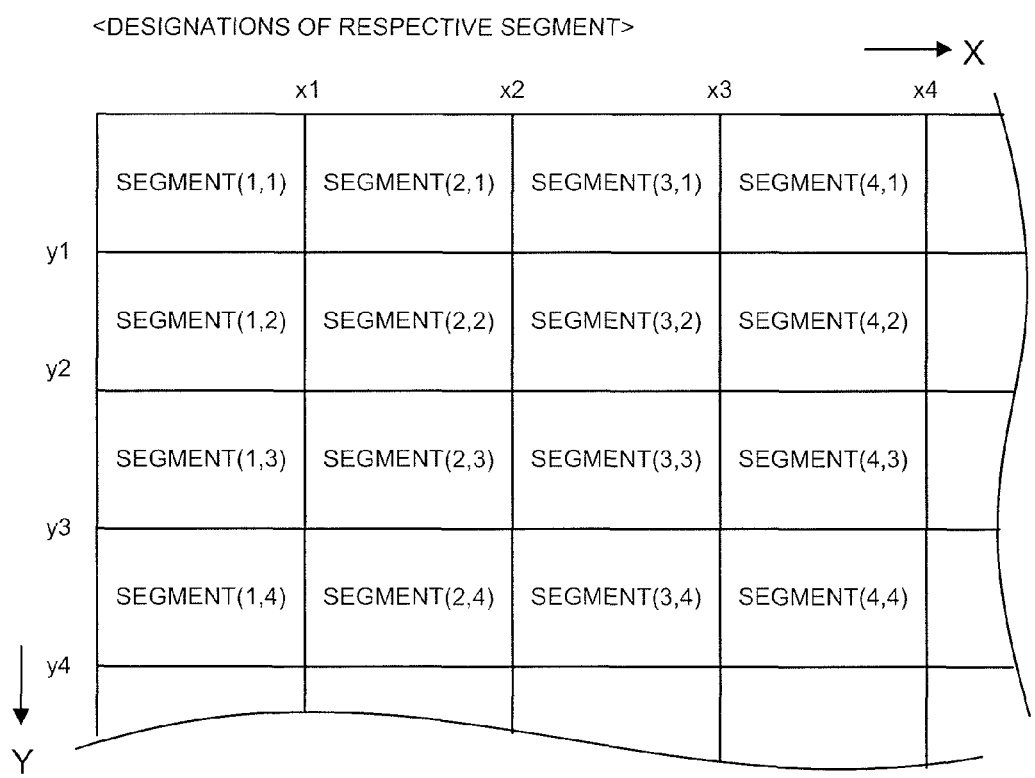
FIG. 55 is a view illustrating designations by each segment.

For example, as shown in FIG. 55, the coordinates of the separating lines are defined as x1, x2, x3, . . . , y1, y2, y3, . . . .

Further, designations of respective segment are defined as segment (1,1), segment (1,2), segment (1,3), . . . , segment (2,1), segment (2,2), segment (2,3), . . . . Segment (1,1), out of them, is a scope encircled by the coordinate (0,0)-(x1,0)-(x1,y1)-(0,y1)-(0,0).

Herein, x1 is an x coordinate of the first-place segment line in the X direction. Further, y1 is a y coordinate of the first-place segment line in the Y direction. With this, the coordinate of segment (1,1) may be displayed as (x1,y1) as shown in FIG. 56.

Likewise, the coordinate of segment (2,1), the coordinate of segment (3,1), the coordinate of segment (1,2), and the coordinate of segment (2,2) may be displayed as (x2,y1), (x3,y1), (x1,y2), and (x2,y2), respectively.

A relationship between the designation and the coordinate of each segment is shown in FIG. 56. The feature storing unit 42 may be caused to store these designations and the coordinates of respective segments as a segment coordinate table.

Further, size of one segment may be arbitrarily set. However, size of one segment is desirably decided in such a manner that at least two segments or more in which no feature point exists exist within the feature space.

Continuously, the feature extracting unit 41 obtains the number of the feature points for each segment.

This calculation of the number of the by-segment feature points may be performed by employing the coordinate of each segment and the coordinate of each feature point.

The calculated numbers of the by-segment feature points, as shown in FIG. 57, may be displayed as a "feature point number distribution diagram". This "feature point number distribution diagram" is stored in the feature storing unit 42.

Additionally, in FIG. 57, so as to make the explanation easily understandable, the segments in which one feature point or more exists are shaded in a gray color.

Further, the feature extracting unit 41 causes, for each feature point, the above feature point to correspond to the coordinate of the segment in which the above feature point exists. For example, the coordinate of the segment in which feature point 1 exists is (x7,y1) as shown in FIG. 54. Thereupon, the feature extracting unit 41, as shown in FIG. 58, causes the feature point 1 to the coordinate (x7,y1) of the segment in "the coordinates of the segments in which the feature point exists" of "the feature point information table", and causes the feature storing unit 42 to store this.

The feature storing unit 42 holds a predetermined memory region. This feature storing unit 42 stores each kind piece of data related to the process performed by the feature extracting unit 41. In particular, the feature storing unit 42 may store "the feature point information table", "the frame image-feature space correspondence table", "the segment coordinate table", and "the feature point number distribution diagram".

Additionally, the feature extracting means 40 has a function as "the arranging means" because of extracting the feature points to arrange them in the predetermined space (feature space).

The unique feature selecting means 10, as shown in FIG. 49, includes a unique feature storing unit 11 and a unique feature selecting unit 12.

The unique feature storing unit 11 stores "the feature point information table", "the frame image-feature space correspondence table", "the segment coordinate table", "the feature point number distribution diagram", and the coordinates of the unique features.

The unique feature selecting unit 12 takes out "the feature point number distribution diagram" from the feature storing unit 42, and causes the unique feature storing unit 11 to store it.

Further, the unique feature selecting unit 12 makes a reference to the taken-out "feature point number distribution diagram" and selects the segments in which the feature points of which the number is zero, or a predetermined value or less, out of the by-segment feature point numbers, are arranged as the unique features.

Specifically, the unique feature selecting unit 12 selects the segments having "0" described therein in the feature point number distribution diagram of FIG. 57. This enables the unique feature selecting unit 12 to select the image features not appearing in the background video images inputted by the video image inputting means 30 as the unique features.

In such a manner, the unique feature selecting unit 12 may select as the unique feature the feature that does not match with any background pattern, namely, may select the segment of the feature space in which none of the feature group extracted from the background video image appears. To avoid an unexpected event in which the unique feature becomes similar to the background pattern afterwards due to an error in the extraction of the feature points or the like, the unique features may be selected from a large area of the feature space in which none of the features of the background patterns exists.

This selection of the unique features may be regarded as equivalent to a problem of finding a large blank space from a distribution of the feature points in the feature space, whereby the algorithm such as, for example, "An Algorithm for Finding Maximal Whitespace Rectangles at Arbitrary Orientations for Document Layout Analysis" presented in Proceedings of the International Conference on Document Analysis and Recognition (2003) may be used to extract a large region, or a center of the obtained rectangular region that contains no feature point may be defined as the unique feature.

Another method may involve quantizing the feature space in a mesh cell having a particular size, generating a one-dimensional histogram or multi-dimensional histogram, and defining the center of the mesh cell of which an occurrence frequency of the feature point becomes zero as the unique feature. When the mesh cell of which the frequency becomes zero does not exist, the width of the mesh cell may be reduced to generate a histogram, and when the mesh cell of which the frequency becomes zero appears, the unique features may be selected from the mesh cells at this time. When no mesh cell of which the frequency becomes zero is found, a threshold process may be applied to the histogram by using a predetermined value to select the unique features from the mesh cells having a value equal to or less than the predetermined value.

Another example of the unique features selected by the unique feature selecting unit 12 is shown in FIG. 59 and FIG. 60. In a unique feature arrangement diagram shown in FIG. 59, the segment determined to be a segment of the unique feature is displayed in white color, and the segment determined not to be a segment of the unique feature is shaded in a gray color. FIG. 60 is a view in which centers of the unique features and a center point of the unique feature arrangement diagram are displayed with "●" based upon the unique feature arrangement diagram shown in FIG. 59.

Additionally, 82 unique features (the segments of which the accumulated number of the feature points is zero) exist in FIG. 57; however it is assumed that the unique features are selected as shown in FIG. 59 and FIG. 60 so as to easily explain the process of generating the marker pattern.

The unique feature selecting unit 12 obtains the coordinates of the selected unique features. For example, the unique feature selecting unit 12 defines the coordinates of the unique features as (2,6), (5,2), (5,4), (5,5), and (7,6), respectively, in the unique feature arrangement diagram shown in FIG. 59. These coordinates of the unique features are stored by the unique feature storing unit 11.

The marker pattern generating means 20 includes a marker pattern generating unit 21 and a marker storing unit 22 as shown in FIG. 49.

The marker pattern generating unit 21 takes out the coordinates of the unique features from the unique feature storing unit 11, and generates the marker pattern based upon these coordinates of the unique features.

There exist various methods as the method of generating the marker pattern.

For example, the case in which vertices, intersections, and endpoints in the image are used as the feature points will be exemplified. When the aforementioned method disclosed in "On the option detection of curves in noisy pictures", or the like is employed, the detection of the unique feature groups required in generating the marker pattern depends upon the feature point extraction algorithm used by the feature extracting means 40.

For example, the methods of generating the marker pattern as shown in FIG. 8 (*i*) to FIG. 8(*iv*) are exemplified.

Additionally, when the feature extracting means 40 extracts the features by using the brightness value or the color difference value, the device for adding the marker to the object may print the marker with paints corresponding to the brightness value and the color difference value that correspond to the unique features.

Further, it is possible to combine the method of utilizing the vertices, the intersections, the endpoints as the figurative feature, and the method of utilizing the brightness value or the color difference value as the feature. In this case, the marker pattern generating unit 21 may generate the markers having the brightness, the color, and the shape corresponding to the selected unique features.

The marker storing unit 22 stores data related to the markers generated by the marker pattern generating unit 21.

For example, when the marker pattern is one shown in FIG. 8 (*i*), the coordinates of the unique features are stored. Further, when the marker pattern is one shown in FIG. 8 (*ii*) the coordinates of the line segments constituting a convex hull besides the coordinates of the unique features are stored.

Next, an operational procedure of the marker generation device (a method of generating the marker) will be explained by making a reference to FIG. 61.

Figure 61:
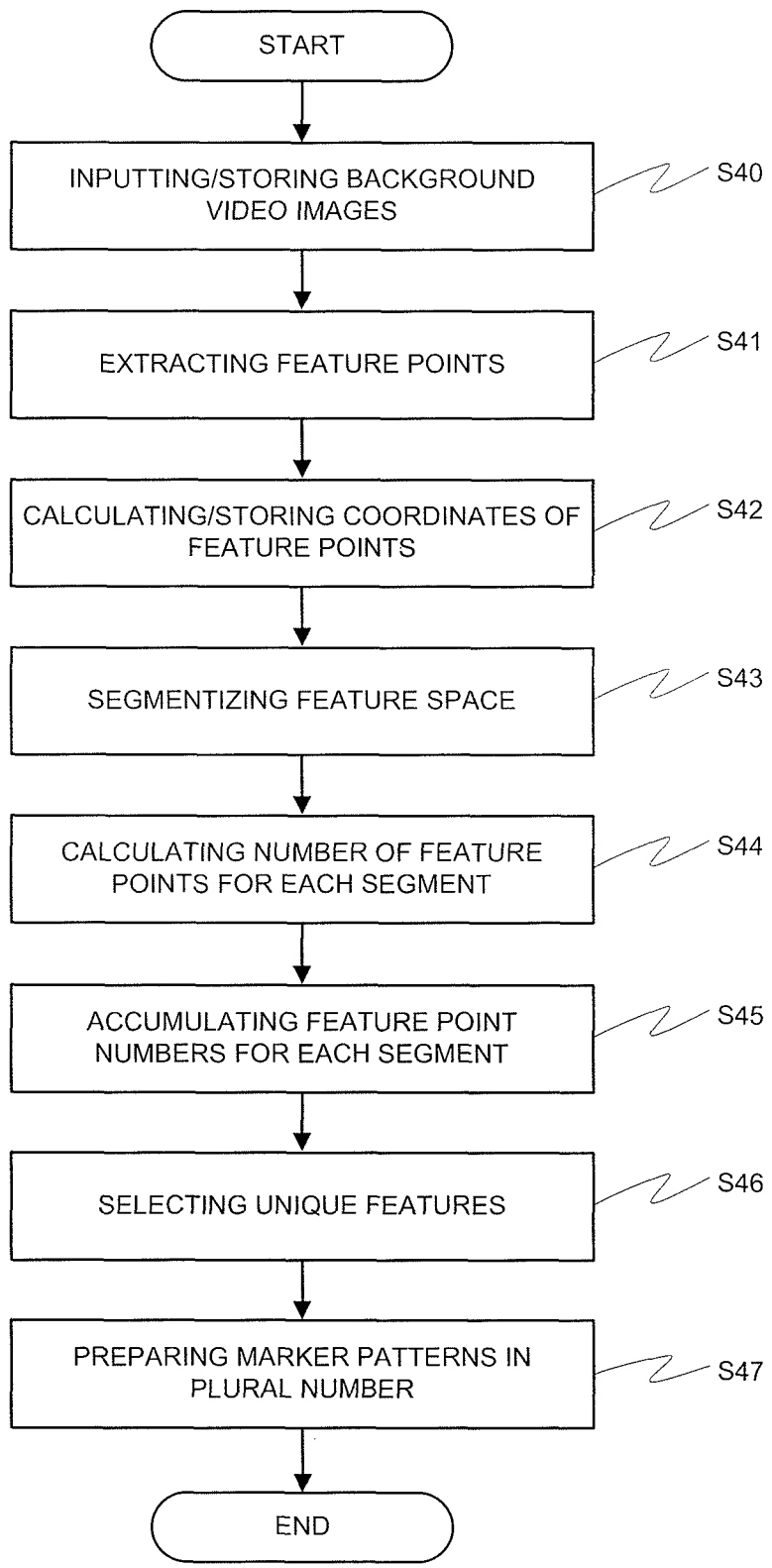
FIG. 61 is a flowchart illustrating an operational procedure of the marker generation device (marker generation method) in a third exemplary embodiment of the present invention.

FIG. 61 is a flow chart illustrating a processing procedure of the marker generation method.

In the marker generation device 1*c*, the video image inputting unit 31 of the video image inputting means 30 inputs the background video image (Step 40). This background video image is configured of plural pieces of the frame images. The video image storing unit 32 of the video image inputting means 30 stores as the frame image the background video image inputted by the video image inputting unit 31.

The feature extracting unit 41 of the feature extracting means 40 takes out the frame images from the video image storing unit 32, extracts the feature points from these frame images, and arranges these feature points in the feature space (Step 41).

Further, the feature extracting unit 41 calculates the coordinates of the feature points in the feature space (Step 42). These calculated coordinates are stored in the feature storing unit 42.

Next, the feature extracting unit 41 divides the feature space into a plurality of the segments by using grid-shape mesh cells (Step 43).

Continuously, the feature extracting unit 41 obtains the number of the feature points for each segment (Step 44).

In addition, for each of a plurality of the frame images, the feature extracting unit 41 extracts the feature points, arranges them in the feature space, calculates the feature point number for each segment, and accumulates these calculated feature point numbers for each segment (Step S45).

The feature storing unit 42 stores these segments, the coordinates of the segment lines, the by-segment numbers of the feature points.

Continuously, the unique feature selecting unit 12 of the unique feature selecting means 10 takes out the by-segment feature points from the feature storing unit 42.

And, the unique feature selecting unit 12 selects the segments of which the feature point number is zero, or is equal to or less than a predetermined number from the by-segment feature point numbers, and defines these segments as the unique features (Step 46).

The unique feature storing unit 11 stores the coordinates of the segments determined to be the unique features by the unique feature selecting unit 12.

The marker pattern generating unit 21 of the marker pattern generating means 20 takes out the coordinates of the unique features from the unique feature storing unit 11. And, the marker pattern generating unit 21 generates the marker patterns in a plural number based upon the above coordinates of the unique features (Step 47).

The marker storing unit 22 stores data related to the marker patterns generated by the marker pattern generating unit 21.

As explained above, the marker generation device and the marker generation method of this exemplary embodiment are capable of generating the marker pattern having a high robustness by the pattern not appearing in any background pattern of the background video image generated by the video image inputting means because the locations of the feature space in which the number of the feature points is equal to or less than a predetermined number are defined as the unique features, and the marker pattern is generated based upon these unique features.

[The Fourth Exemplary Embodiment of the Marker Generation Device and the Marker Generation Method]

Next, the fourth exemplary embodiment of the marker generation device and the marker generation method of the present invention will be explained by making a reference to FIG. 62.

Figure 62:
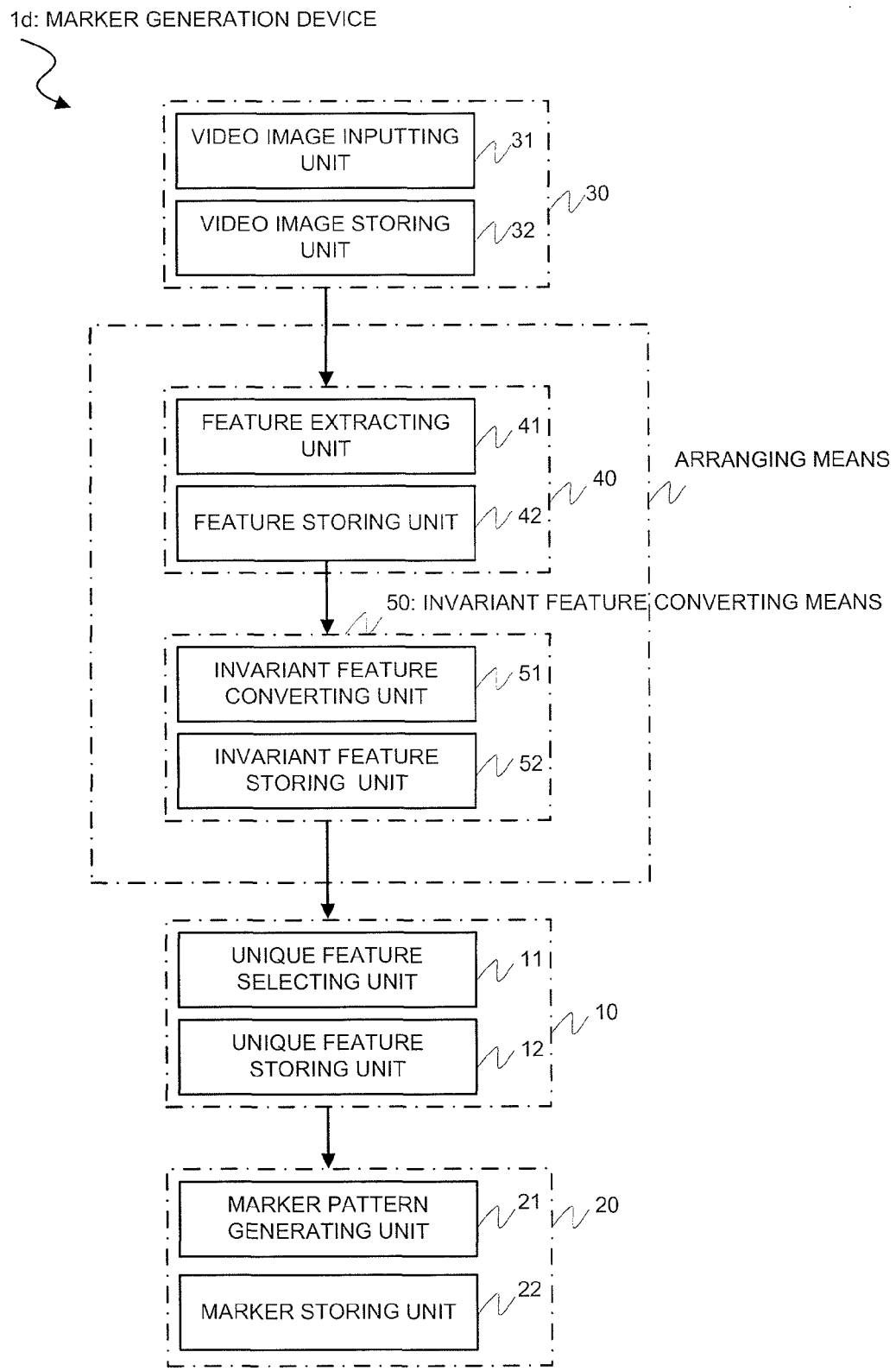
FIG. 62 is a block diagram illustrating a configuration of the marker generation device in a fourth exemplary embodiment of the present invention.

FIG. 62 is a block diagram illustrating a configuration of the marker generation device of this exemplary embodiment.

This exemplary embodiment, as compared with the first exemplary embodiment, differs in the space from which the unique features are selected. That is, while the unique features are selected from the feature space in the first exemplary embodiment, the unique features are selected from an invariant feature space in this exemplary embodiment. Other components are similar to those of the first exemplary embodiment.

Thus, in FIG. 62, the identical code is added to the constituent portion similar to that of FIG. 1, and the detailed explanation thereof is omitted.

As shown in FIG. 62, a marker generation device 1d is provided with a unique feature selecting means 10, a marker pattern generating means 20, a video image inputting means 30, a feature extracting means 40, and an invariant feature converting means 50.

Additionally, in this exemplary embodiment, the feature extracting means 40 and the invariant feature converting means 50 are equivalent to the "arranging means", respectively.

Herein, the invariant feature converting means 50 includes an invariant feature converting unit 51 and an invariant feature storing unit 52 as shown in FIG. 62.

The invariant feature converting unit 51 converts the feature points into the invariant features. This invariant feature converting unit 51 takes out "the feature point information table" from a feature storing unit 42 of the feature extracting means 40, converts the above feature points into the invariant features, and causes the invariant feature storing unit 52 to store them.

With the case of extracting a distinctive segment in an image and defining a series of position coordinate information on the above image as a graphical feature (for example, with the case of a process of extracting the feature points shown in FIG. 51 from the background video image shown in FIG. 50), conversion thereof into the invariant feature may conducted in a manner as described below, for example. For convenience, the series of the position coordinate information are referred to as feature point groups herein. For simplification, a geometrical invariant feature in a faraway background will be explained. However, consideration should be given so that a feature quantity is invariant even when an effect of optical distortion may cause shear deformative distortion in the image. However, it is easy to extend the invariant feature to that having a higher freedom degree in a case in which the background is not faraway, or the like. One exemplary method of generating a geometrical invariant feature from the positional relationship between the feature point groups will be explained, wherein the geometrical invariant feature is a feature quantity that is invariable irrespective of a change in the relative positional relationship resulting in the shear deformative distortion when a camera and a scene, being a to-be-imaged target, are rotated and translated relative to each other.

Three arbitrary feature points are selected from the feature point groups. On the other hand, the invariant feature space is defined as a two-dimensional plane spanned by two orthogonal axes. One of the feature points selected from the feature point groups is caused to correspond to an origin in the invariant feature space. Two other points are caused to correspond to position coordinates (1,0) and (0,1) in the invariant feature space, respectively. These three points are referred to as bases hereinbelow. At that time, a one-to-one linear map from the original image space to the invariant feature space may be defined as an affine transform. All feature point groups except the bases are mapped onto the invariant feature space by employing the same affine transform characterized by the bases, whereupon these feature point groups are invariant irrespective of the relative positional relationship between the camera and the scene. In practice, however, it is necessary to select the bases from all permutations and combinations of three of the feature point groups, and map non-basis feature points with respect to each basis onto the invariant feature space because not always the identical bases can be selected from the scenes.

All bases created in such a manner and the maps of all feature points onto the invariant feature space are stored in the invariant feature storing unit 52 as the invariant features. The reason why these feature point groups are invariant against the geometrical deformation is that the bases selected from the marker allow the resulting invariant feature to match in the video image containing other objects at any time.

While the technique of defining the number of the bases as three was explained until this, the number of the bases is not limited to three, and the number of the bases could be 1, 2, or four or more. Next, the technique of defining the number of the bases as one (1) will be explained.

It is assumed that the feature points extracted from a certain frame image, as shown in FIG. 51, are arranged in the feature space. Further, it is assumed that the serial number is added to each feature point as shown in FIG. 52.

The invariant feature converting unit 51 decides one feature point as the basis, moves this feature point so that it comes to a location of coordinate (0,0) on the invariant feature space, obtains this movement amount, and moves all other feature points as well to the invariant feature space by the above movement amount.

Figure 63:
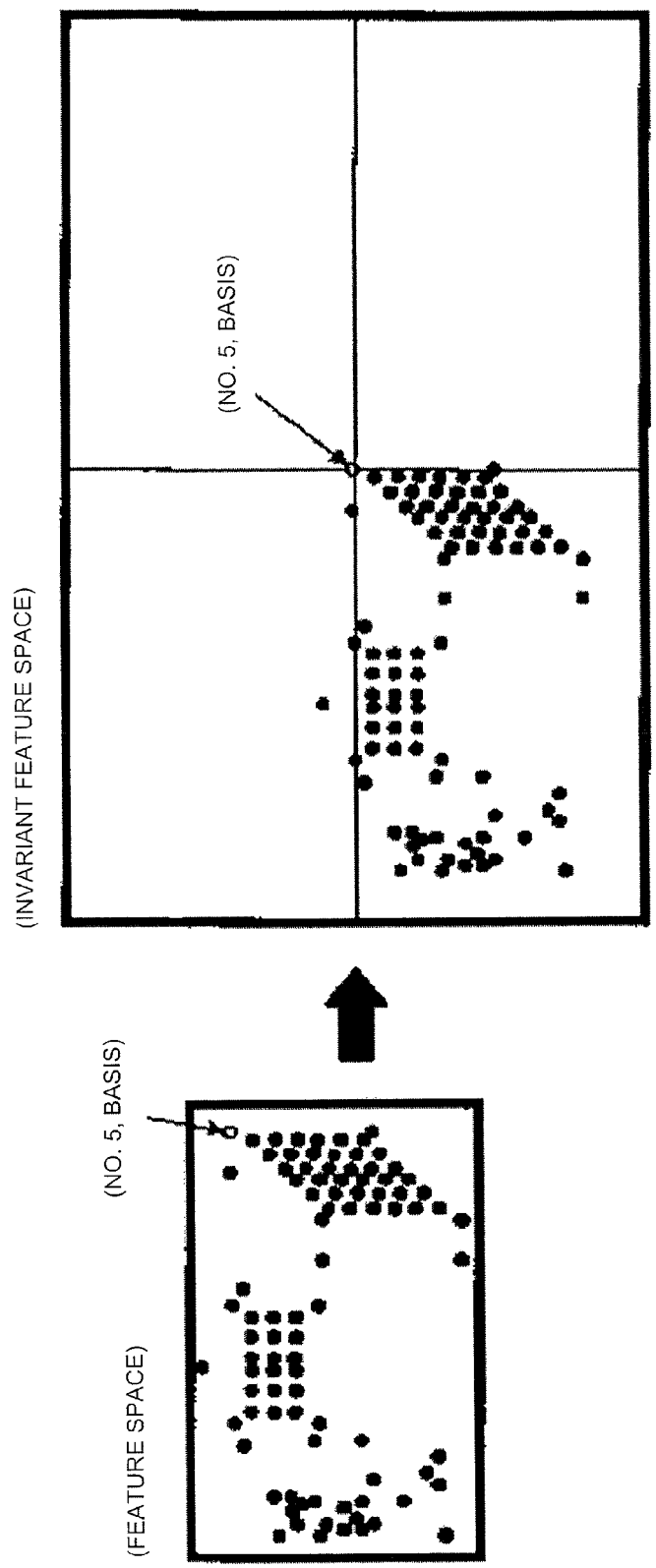
FIG. 63 is a view illustrating a situation in which respective feature points are mapped onto the invariant feature space with a feature point No. 5 defined as a basis.

For example, as shown in FIG. 63, the invariant feature converting unit 51 defines the feature point with the serial No. 5 as the basis, and translates all feature points so that this feature point with No. 5 comes to a location of coordinate (0, 0) in the invariant feature space. This allows the feature points to be arranged in the invariant feature space as shown in the right of the same figure. Additionally, the feature point arranged in the invariant feature space is referred to as an invariant feature.

Figure 64:
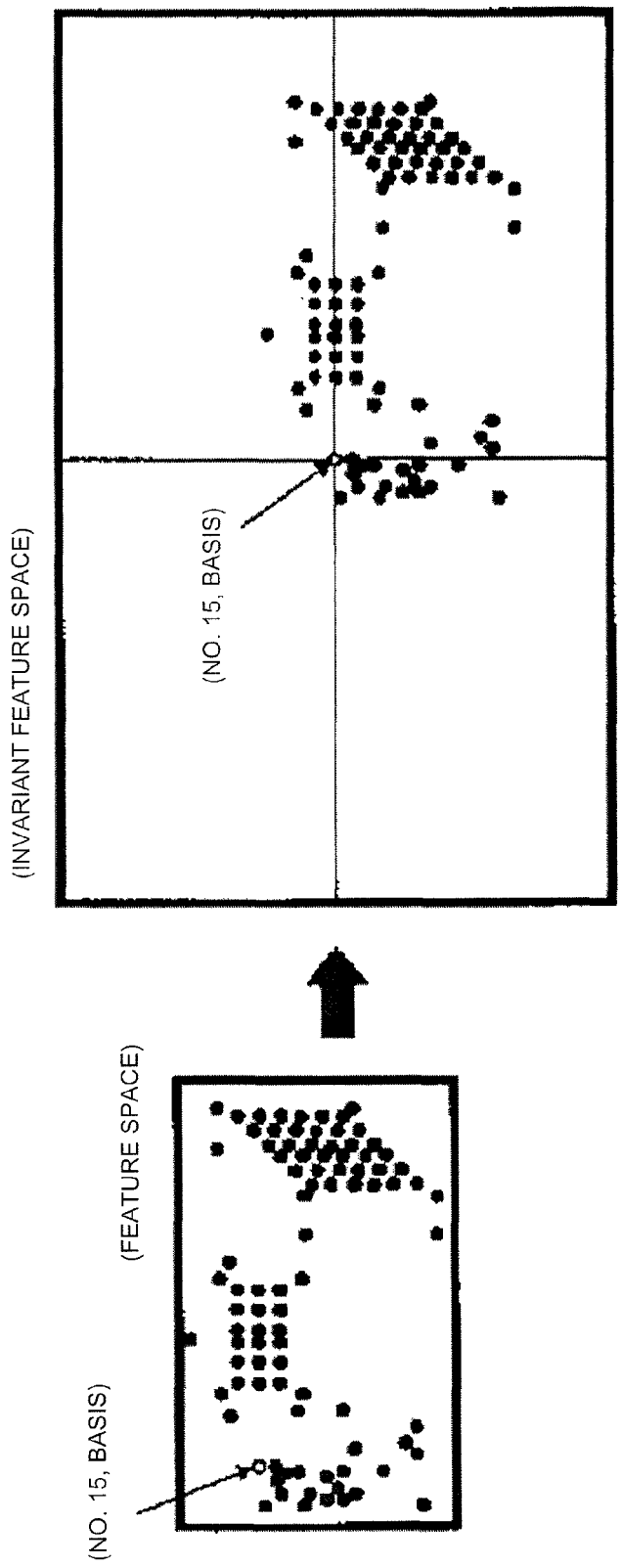
FIG. 64 is a view illustrating a situation in which respective feature points are mapped onto the invariant feature space with a feature point No. 15 defined as a basis.

Further, as shown in FIG. 64, when the invariant feature converting unit 51 defines the feature point with serial No. 15 as the basis, and translates all feature points so that the feature point with No. 15 comes to a location of coordinate (0, 0) in the invariant feature space, the invariant feature group is arranged as shown in the invariant feature space of the right of the same figure.

Figure 65:
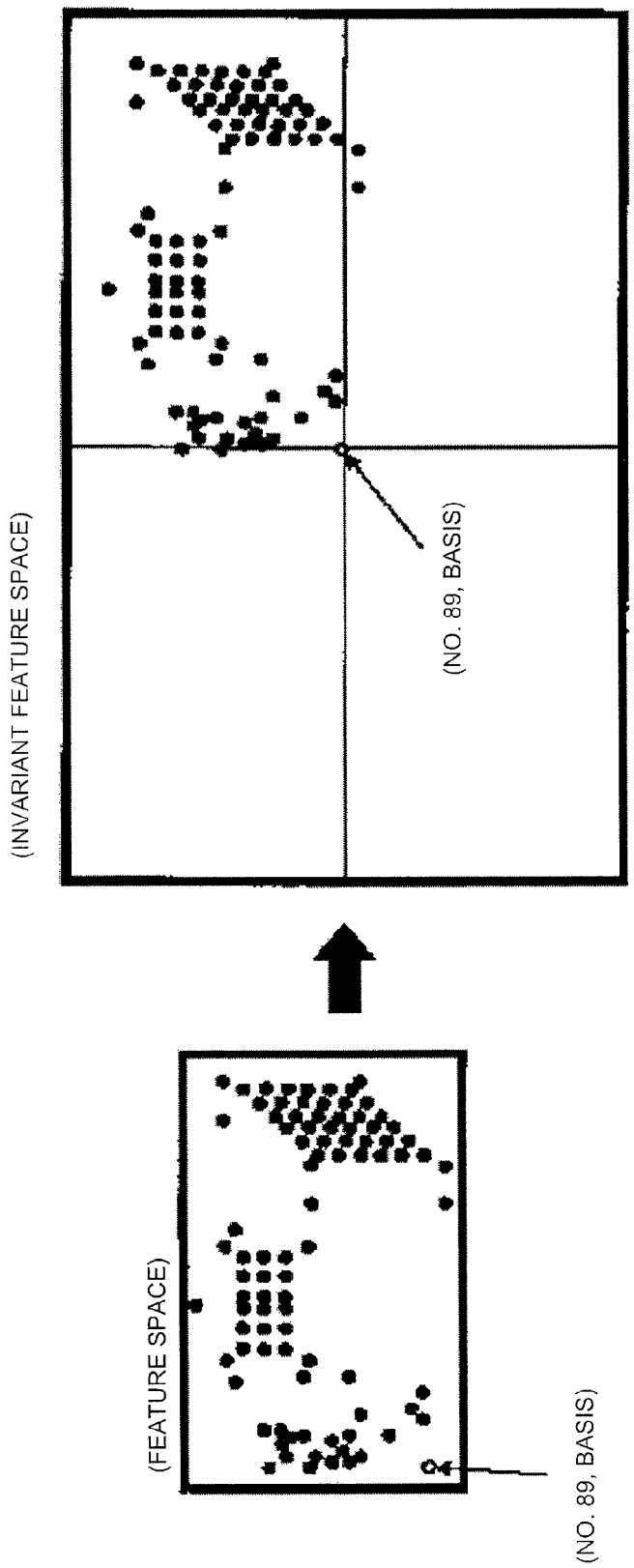
FIG. 65 is a view illustrating a situation in which respective feature points are mapped onto the invariant feature space with a feature point No. 89 defined as a basis.

In addition, as shown in FIG. 65, when the invariant feature converting unit 51 defines the feature point with serial No. 89 as the basis, and translates all feature points so that this feature point with No. 89 comes to a location of coordinate (0, 0) in the invariant feature space, the invariant feature group is arranged as shown in the invariant feature space of the right of the same figure.

Figure 66:
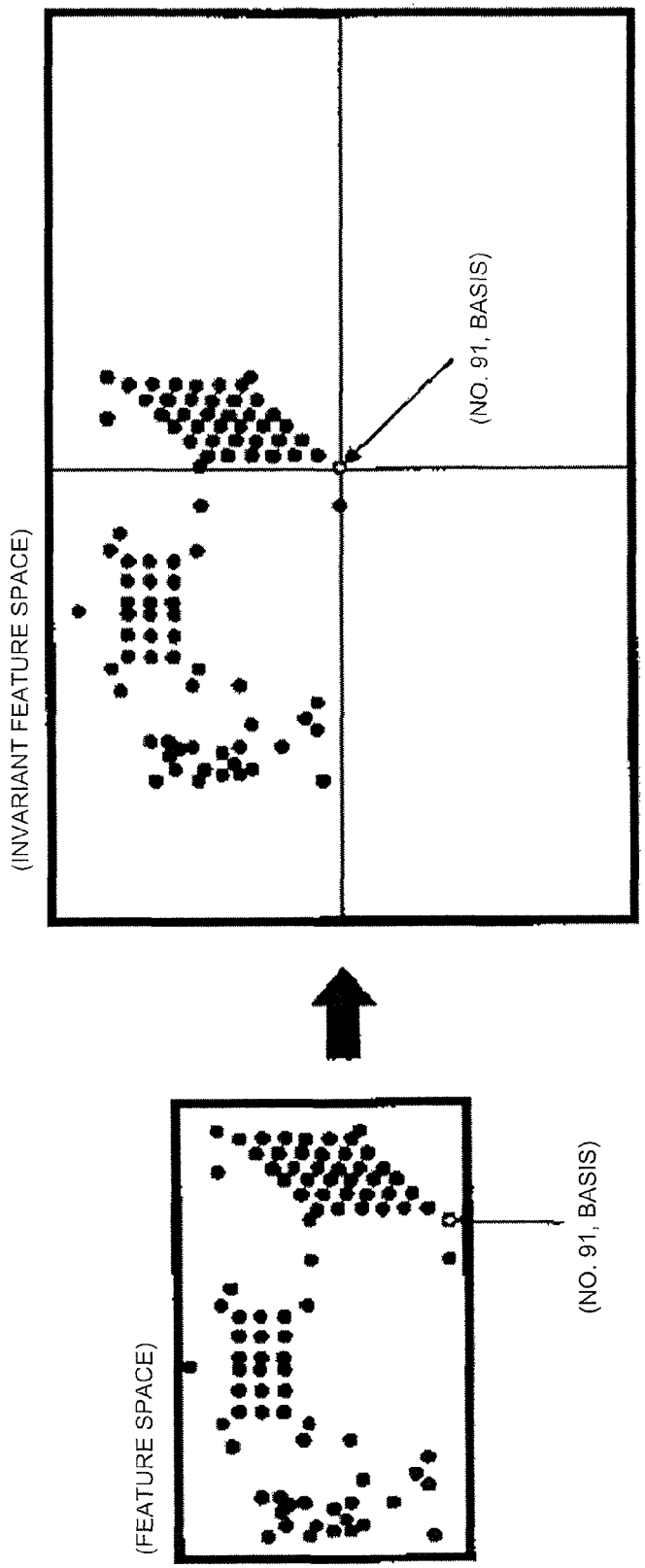
FIG. 66 is a view illustrating a situation in which respective feature points are mapped onto the invariant feature space with a feature point No. 91 defined as a basis.

And, as shown in FIG. 66, when the invariant feature converting unit 51 defines the feature point with serial No. 91 as the basis, and translates all feature points so that this feature point with No. 91 comes to a location of coordinate (0, 0) in the invariant feature space, the invariant feature group is arranged as shown in the invariant feature space of the right of the same figure.

In such a manner, the invariant feature converting unit 51 maps the feature points onto the invariant feature space by performing a process of deciding one feature point as the basis, moving this basis to an origin of the invariant feature space, and moving all feature points by a movement amount identical to the above amount, accompanied with this, whenever sequentially deciding each feature point as the basis, and superposing these moved feature points.

Figure 67:
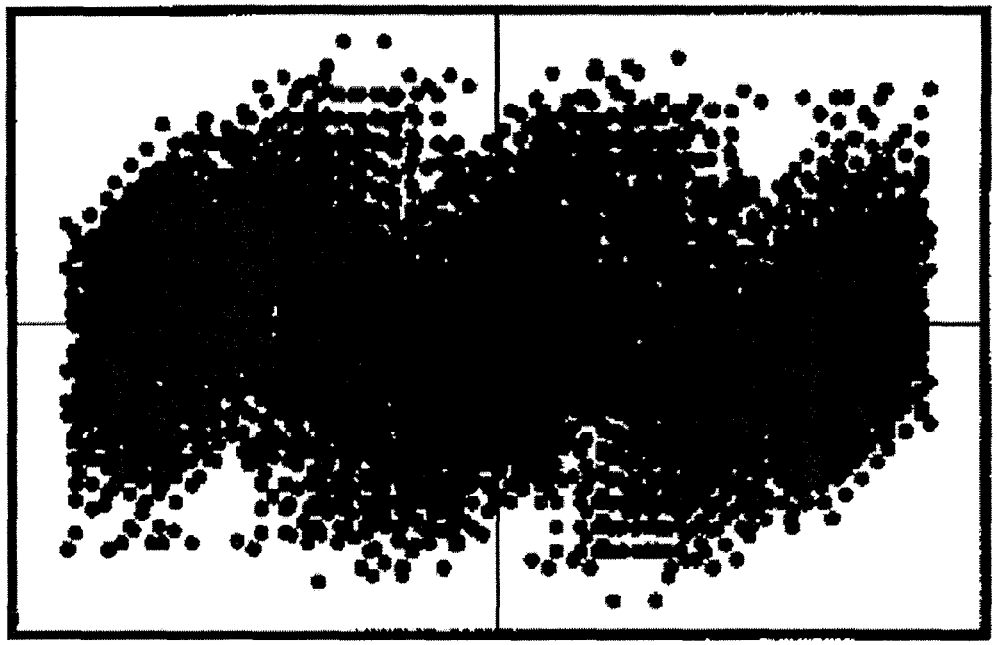
FIG. 67 is a view illustrating a situation in which all feature points shown in FIG. 5 are mapped onto the invariant feature space.

A result of having mapped the feature points shown in FIG. 51 onto the invariant feature space with the above-mentioned method is one shown in FIG. 67. This is a situation in which the invariant features have been arranged in the invariant feature space.

Additionally, while as a method of mapping the feature points onto the invariant feature space, the method shown in FIG. 63 to FIG. 67 are employed in this exemplary embodiment, the mapping method is not limited to these methods, and various methods may be employed.

For example, one feature point of a plurality of the feature points and another feature point are defined as a first basis and a second basis, respectively, the first basis and the second basis are moved to coordinate (0, 0) and coordinate (1, 0) of the invariant feature space, respectively, and all other feature points are moved according to a conversion rule identical to this movement rule, accompanied with this, and the coordinate of each feature point (invariant feature) subjected to the movement in the invariant feature space is stored. Continuously, the other two feature points are defined as a first basis and a second basis, respectively, the first basis and the second basis are moved, all feature points are moved according to the identical conversion rule, accompanied with this, and the coordinates of the invariant features in the invariant feature space are stored. And, when all feature points are decided to be either the first basis or the second basis, and accumulation of the coordinates of the invariant features in the invariant feature space is completed, the mapping onto the invariant feature space is finished.

Further, while the above explanation of the operation was made on the geographical invariant, several kinds of invariants other than the geographical invariant may be used.

For example, an object color may be employed as the invariant.

The color of an object may vary in imaging even the object is same, dependent upon the color of the light source present on the imaging environment. When an influence of a fluctuation in the light source color can be separated and removed from the image, the actual object color can be obtained. The actual object color to be obtained may be used as the object-color invariant. A portion exhibiting specular reflection is principally affected by the light source color, and the luminance value tends to saturation for the light source color component so that the component may be regarded as the light source color to prevent the color component corresponding to the saturated portion from being selected as the invariant feature.

Besides, the methods of estimating the object color from the image that may be employed include a method by Robby T. Tan and Katsushi Ikeuchi, disclosed in "Separating Reflection Components of Textured Surfaces Using a Single Image" IEEE TRANSACTIONS ON PATTERN ANALYSIS AND MACHINE INTELLIGENCE, VOL. 27, NO. 2, FEBRUARY 2005, PP. 178-193, a method by Graham D. Finlayson, Steven D. Hordley, Cheng Lu, and Mark S. Drew disclosed in "On the Removal of Shadows from Images", IEEE TRANSACTIONS ON PATTERN ANALYSIS AND MACHINE INTELLIGENCE, VOL. 28, NO. 1, JANUARY 2006, PP. 59-68, and the like.

In addition, a texture may be employed as the invariant.

A luminance distribution for a partial region in the image is subjected to numerical computation, and the resulting numerical value or vector is defined as a feature quantity. Similarly to the graphical invariant, the texture invariant is susceptible to an influence of the relative positional relationship between the camera and the to-be-imaged target, and thus, the feature quantity insusceptible to this influence is calculated and defined as a texture invariant. For example, the feature quantity invariable against a distance between the camera and the target or a zoom may be implemented by converting a partial image of interest into polar coordinates and taking a power spectrum in the radius direction. In addition, the power spectrum may be taken again with respect to the above-power spectrum in the azimuthal direction to obtain the feature quantity that is invariable against the rotation around an optical axis of the camera. Besides, the method by Chi-Man Pun and Moon-Chuen Lee disclosed in "Log-Polar Wavelet Energy Signatures for Rotation and Scale Invariant Texture Classification" IEEE TRANSACTIONS ON PATTERN ANALYSIS AND MACHINE INTELLIGENCE, VOL. 25, NO. 5, May 2003, or the like may be employed.

Further, with regard to the geometrical invariant, another kind of the geometrical invariant such as that by Richard Hartley and Andrew Zisserman disclosed in "Multiple View Geometry in Computer Vision" may be also employed. When the same scene is observed by a plurality of cameras, the method disclosed in this literature enables information on a distance or a relative positional relationship in the depth direction to be acquired, and in this case, when four points lying in non-identical planes are selected as the bases and the invariant feature space is assumed to be three-dimensional, a three-dimensional geometric invariant may be created. At this moment, a conversion map is obtained in which one of four bases selected from the feature point groups is caused to correspond to an origin of the invariant space, and the feature points of the other bases are caused to correspond to position coordinates (1,0,0), (0,1,0) and (0,0,1) in the invariant space, and this conversion map is used to map the other features onto the invariant space.

Figure 68:
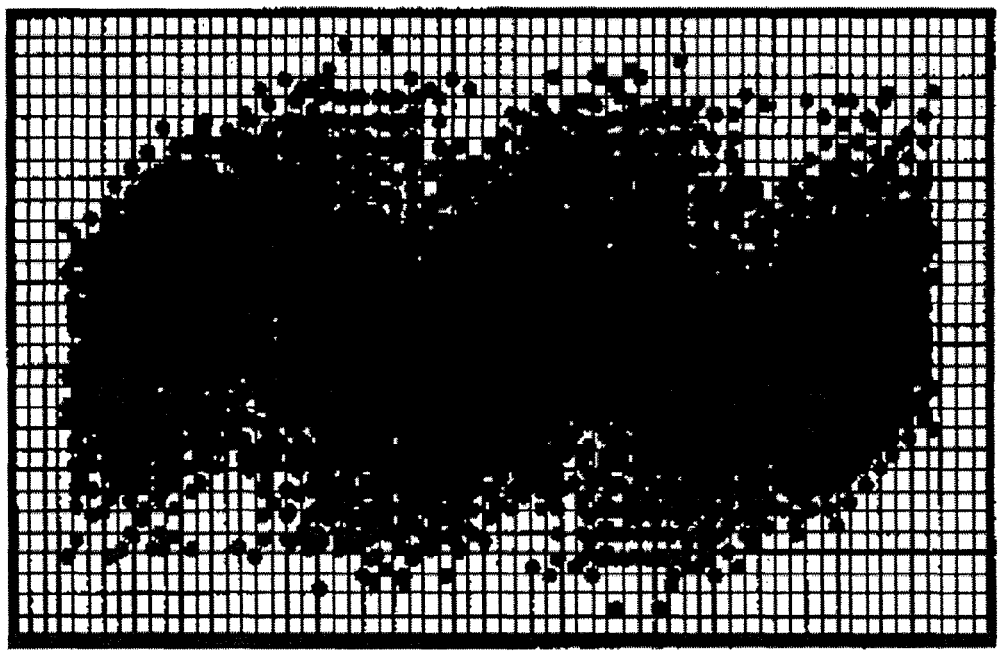
FIG. 68 is a view illustrating a situation in which segment lines are added to the invariant feature space.

The invariant feature converting unit 51 having mapped the feature points onto the invariant feature space divides the invariant feature space into a plurality of the segments by using grid-shape mesh cells as shown in FIG. 68.

Figure 69:
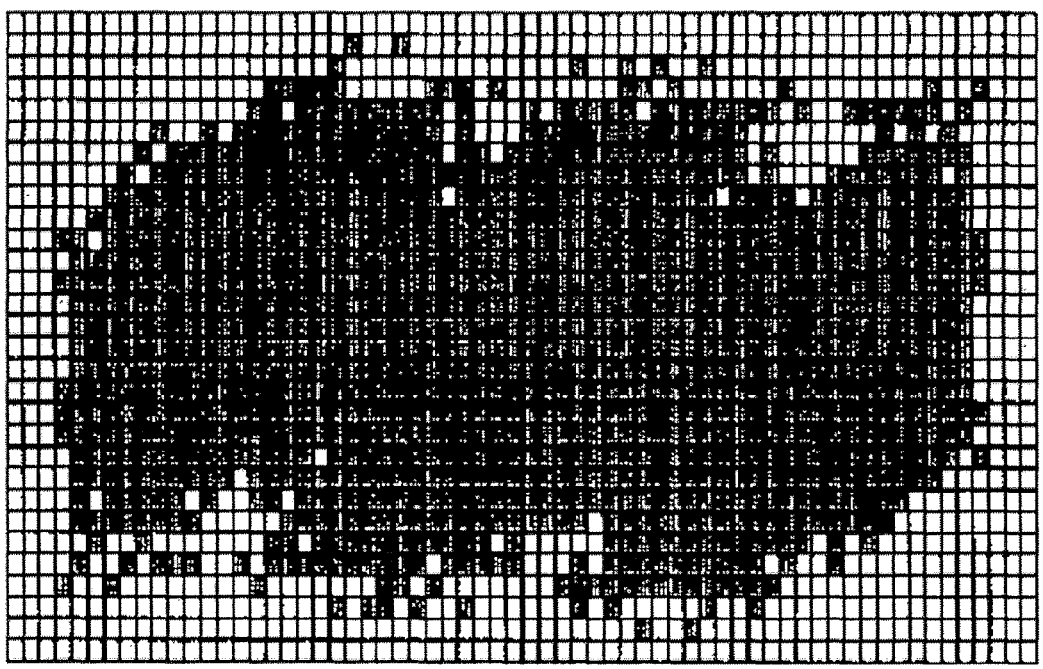
FIG. 69 is a view illustrating the invariant feature space in which the segments having one feature point or more arranged therein are hatched in a gray color.

Continuously, the invariant feature converting unit 51 obtains the number of the invariant features for each segment. A result of this calculation is shown in FIG. 69. FIG. 69 is a view in which the segments of the invariant feature space of which the number of the invariant features is one or more have been colorized in gray color.

The invariant feature storing unit 52 holds a predetermined memory region. This invariant feature storing unit 52 stores various kinds of data obtained by the invariant feature converting unit 51. The various kinds of data contains, for example, the coordinates of respective invariant features arranged in the invariant feature space, the coordinates (scopes) of respective segments, respective by-segment invariant feature numbers, and the like.

The unique feature selecting means 10, as shown in FIG. 62, includes a unique feature selecting unit 11 and a unique feature storing unit 12.

Figure 70:
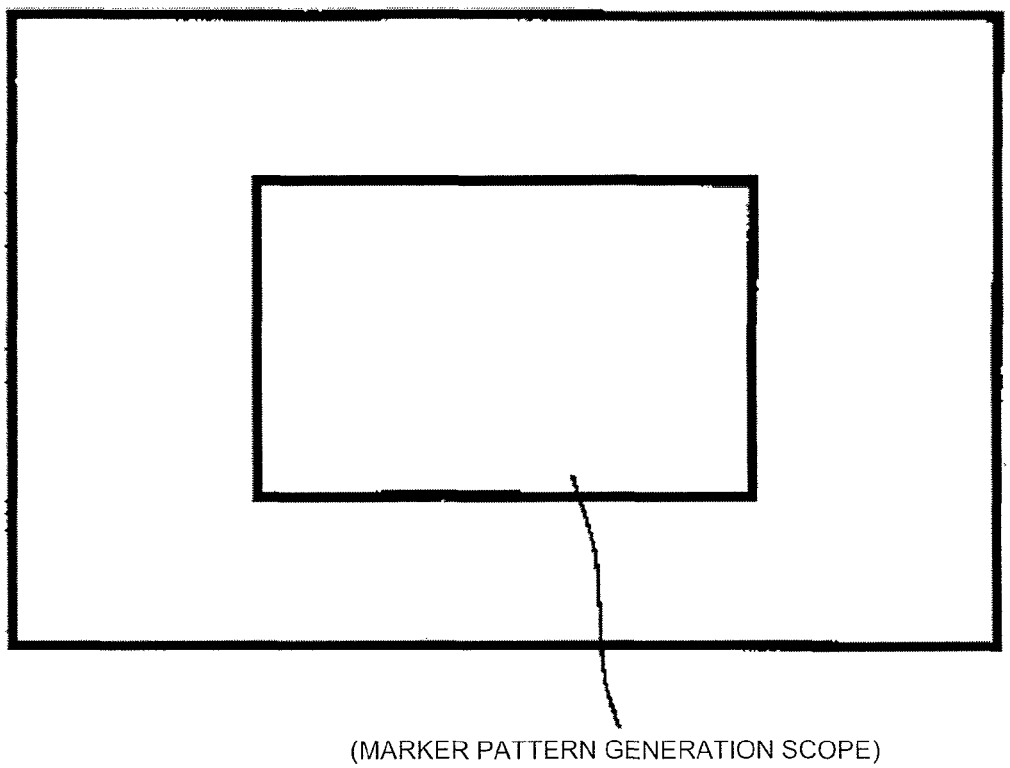
FIG. 70 is a view illustrating a marker pattern generation scope in the invariant feature space.

The unique feature selecting unit 11, as show in FIG. 70, decides a scope of the invariant feature space in which the marker pattern is generated to be a marker pattern generation scope. Size of this marker pattern generation scope could be identical to that of the still image frame.

Figure 71:
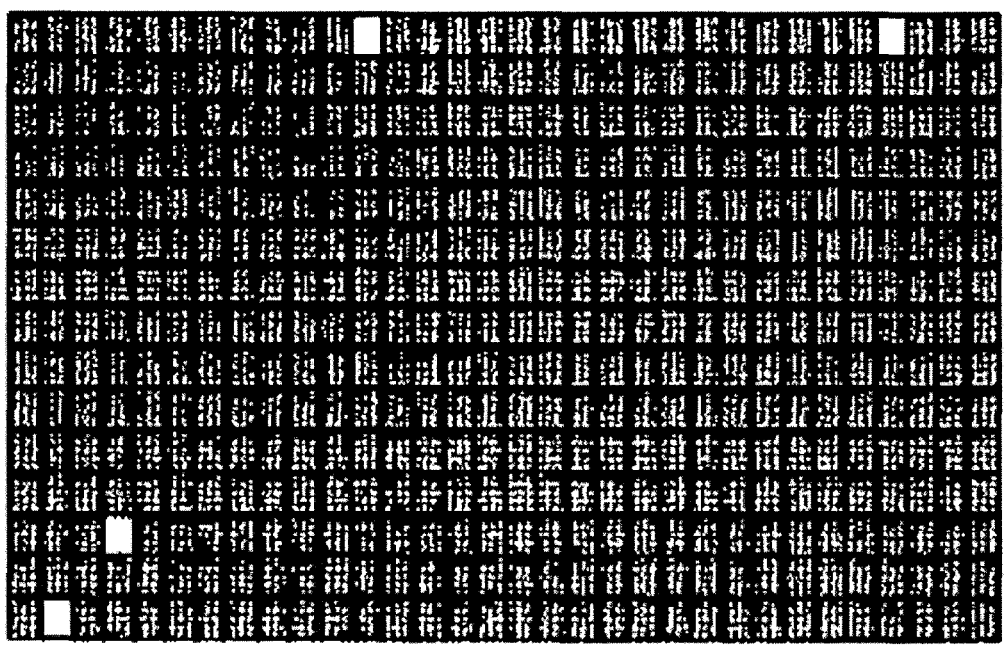
FIG. 71 is a view illustrating a situation of the taken-out marker pattern generation scope, out of the invariant feature space shown in FIG. 69.

Next, the unique feature selecting unit 11 takes out the by-segment invariant feature numbers in the above marker pattern generation scope from the invariant feature storing unit 52. These taken-out by-segment invariant feature numbers are shown in FIG. 71. Additionally, FIG. 71 is a view in which the segments of the marker pattern generation scope of which the number of the invariant features is one or more have been colorized in gray color.

Continuously, the unique feature selecting unit 11 selects the segments of the marker pattern generation scope of which the invariant feature number is zero, or equal to or less than a predetermined value, out of the by-segment invariant feature numbers as the unique features. This enables the unique feature selecting unit 11 to select the image feature not appearing in the scenes as the unique feature from the stored feature groups.

Additionally, in FIG. 71, the segments with white color are segments of which the invariant feature number is zero.

The unique feature storing unit 12 stores the coordinates of the unique features selected by the unique feature selecting unit 11.

The marker pattern generating means 20 has a function similar to that of the marker pattern generating means 20 in the first exemplary embodiment.

The invariant feature converting unit 51 maps the feature points shown in FIG. 51 onto the invariant feature space.

Next, the invariant feature converting unit 51 meshes the above invariant feature space, and calculates the feature points for each segment.

In addition, taking out the marker pattern generation scope, out of the invariant feature space of FIG. 69, yields one shown in FIG. 71.

Additionally, roughly speaking, the process ranging from the conversion into the invariant feature to the selection of the unique features in the case of combining two kinds or more of the invariants could operate as follows.

Herein, an exemplary operation in which the geometrical invariant and the object-color invariant are employed in combination will be explained.

It is assumed that the object-color invariant to be employed is the luminance value of the object color obtained by the aforementioned method by Tan, et al. for neighboring pixels of the feature point groups extracted at the moment of obtaining the geometrical invariant. At first, similarly to the aforementioned procedure of obtaining the geometrical invariant, three points are selected as the bases from the feature point groups, and projected onto a geometrical invariant space described in a two-dimensional plane. The object-color invariant corresponding to each feature position is obtained to assume a three-dimensional space including an axis orthogonal to the geometrical invariant plane, namely, an object-color invariant coordinate. The axes of the three-dimensional space are quantized and divided into rectangular parallelpiped mesh cells having a predefined size, and a histogram for each rectangular parallelpiped is generated. Similar calculation is performed on all combinations of the bases, and values of centers of the mesh cells each having a histogram of zero is defined as the unique feature. The generation of a marker may be achieved by generating the marker with the position and color corresponding to each unique feature.

Figure 72:
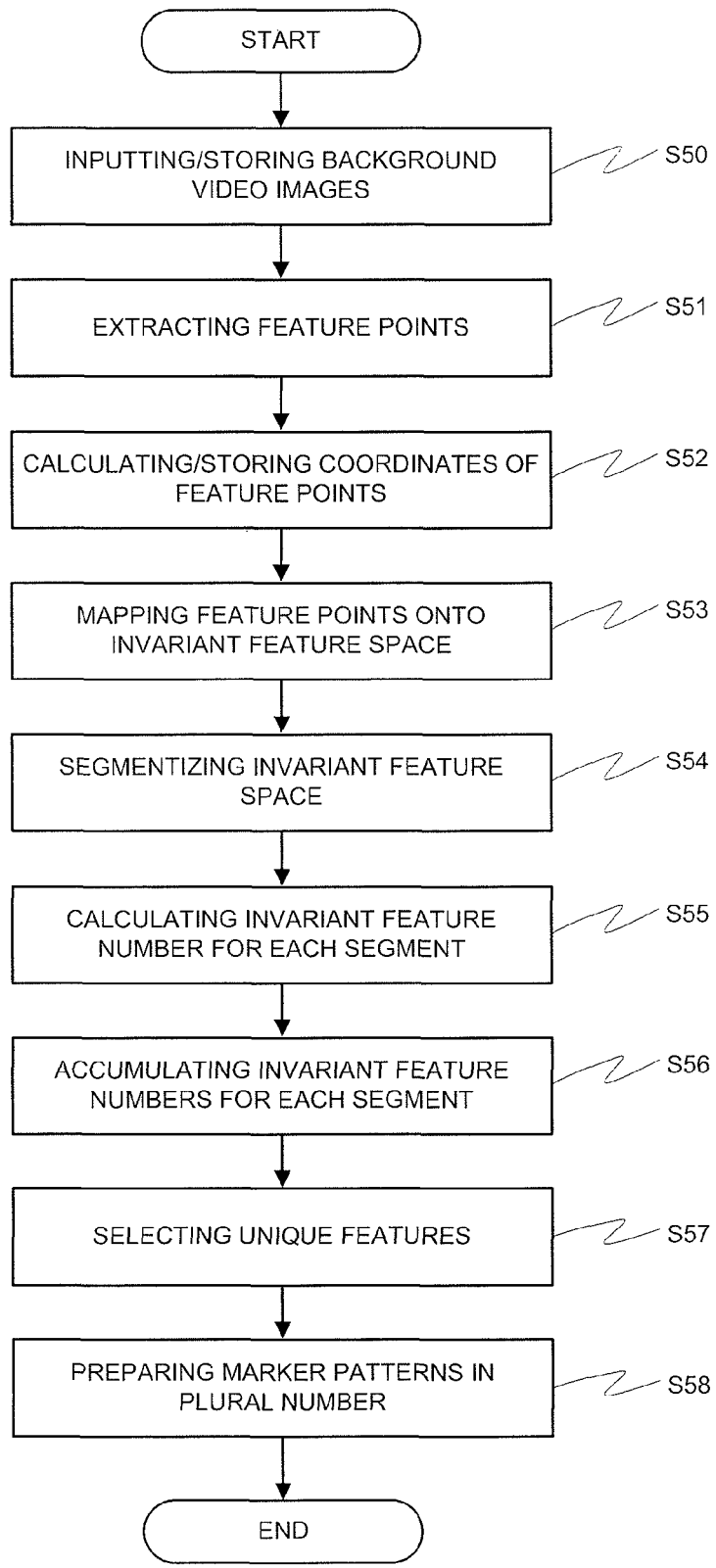
FIG. 72 is a flowchart illustrating an operational procedure of the marker generation device (marker generation method) in a fourth exemplary embodiment of the present invention.

Next, an operation of the marker generation device (a method of generating the marker) will be explained by making a reference to FIG. 72.

The same figure is a flowchart illustrating a processing procedure of the marker generation method of this exemplary embodiment.

In the marker generation device 1*d*, the video image inputting unit 31 of the video image inputting means 30 inputs the background video image (Step 50). This background video image is configured of plural pieces of the frame images. The video image storing unit 32 of the video image inputting means 30 stores as the frame image the background video image inputted by the video image inputting unit 31.

The feature extracting unit 41 of the feature extracting means 40 takes out the frame images from the video image storing unit 32, and extracts the feature points from these frame images (Step 51).

Further, the feature extracting unit 41 calculates the coordinates of the extracted feature points (Step 52). These calculated coordinates are stored in the feature storing unit 42.

The invariant feature converting unit 51 of the invariant feature converting means 50 takes out the coordinates of the feature points from the feature storing unit 42. Next, the invariant feature converting unit 51 maps respective feature points onto the invariant feature space based upon the coordinates of the taken-out feature points (Step 53).

Continuously, the invariant feature converting unit 51 meshes and segmentizes the invariant feature space (Step 54).

In addition, the invariant feature converting unit 51 calculates the invariant feature number for each segment (Step 55).

Further, the invariant feature converting unit 51 calculates the by-segment invariant feature numbers for each of a plurality of the frame images, and accumulates these (Step 56).

The invariant feature storing unit 52 stores an accumulation of the by-segment invariant feature numbers calculated by the invariant feature converting unit 51.

The unique feature selecting unit 11 of the unique feature selecting means 10 takes out the by-segment invariant feature numbers from the invariant feature storing unit 52. At this time, the unique feature selecting unit 11 may take out the by-segment invariant feature numbers in the marker pattern generation scope.

And, the unique feature selecting unit 11 selects the segments of which the invariant feature number is zero, or equal to or less than a predetermined number, out of the by-segment invariant feature numbers, and defines these as the unique features (Step 57).

The unique feature storing unit 12 stores the coordinates of the segments determined to be the unique features by the unique feature selecting unit 11.

The marker pattern generating unit 21 of the marker pattern generating means 20 takes out the coordinates of the unique features from the unique feature storing unit 12. And, the marker pattern generating unit 21 generates the marker patterns in a plural number based upon the above coordinates of the unique features (Step 58).

The marker storing unit 22 stores data related to the marker patterns generated by the marker pattern generating unit 21.

As explained above, the marker generation device and the marker generation method of this exemplary embodiment are capable of generating the marker pattern that is high in the robustness for any frame image because a plurality of the frame images are inputted by the video image inputting means, the feature points are extracted from all these frame images, these feature points are mapped as the invariant features onto the invariant feature space, the unique features are selected in this invariant feature space, and the marker patterns are generated based upon these unique features.

[The Marker Detection Device and the Marker Detection Method]

(The Marker Detection Device)

Next, the marker detection device will be explained by making a reference to FIG. 73 and FIG. 74.

Figure 73:
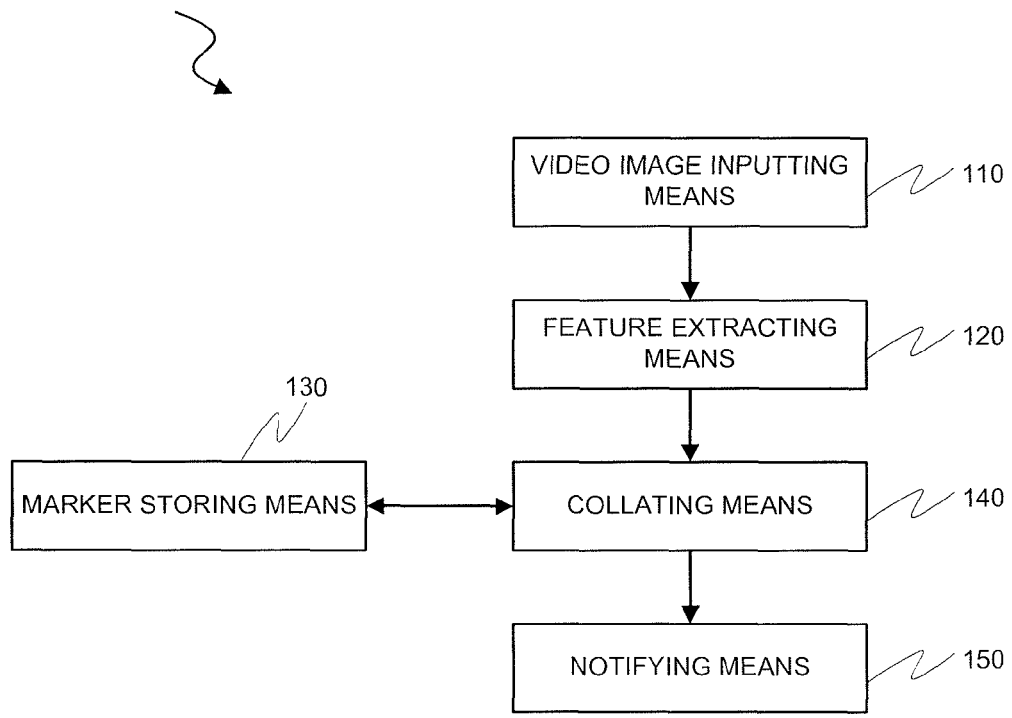
FIG. 73 is a block diagram illustrating a configuration of the marker detection device.

FIG. 73 is a block diagram illustrating a configuration of the marker detection device. FIG. 74 is a block diagram illustrating a detailed configuration of the marker detection device.

As shown in FIG. 73, a marker detection device 100 is provided with a video image inputting means 110, a feature extracting means 120, a marker storing means 130, a collating means 140, and a notifying means 150.

Figure 74:
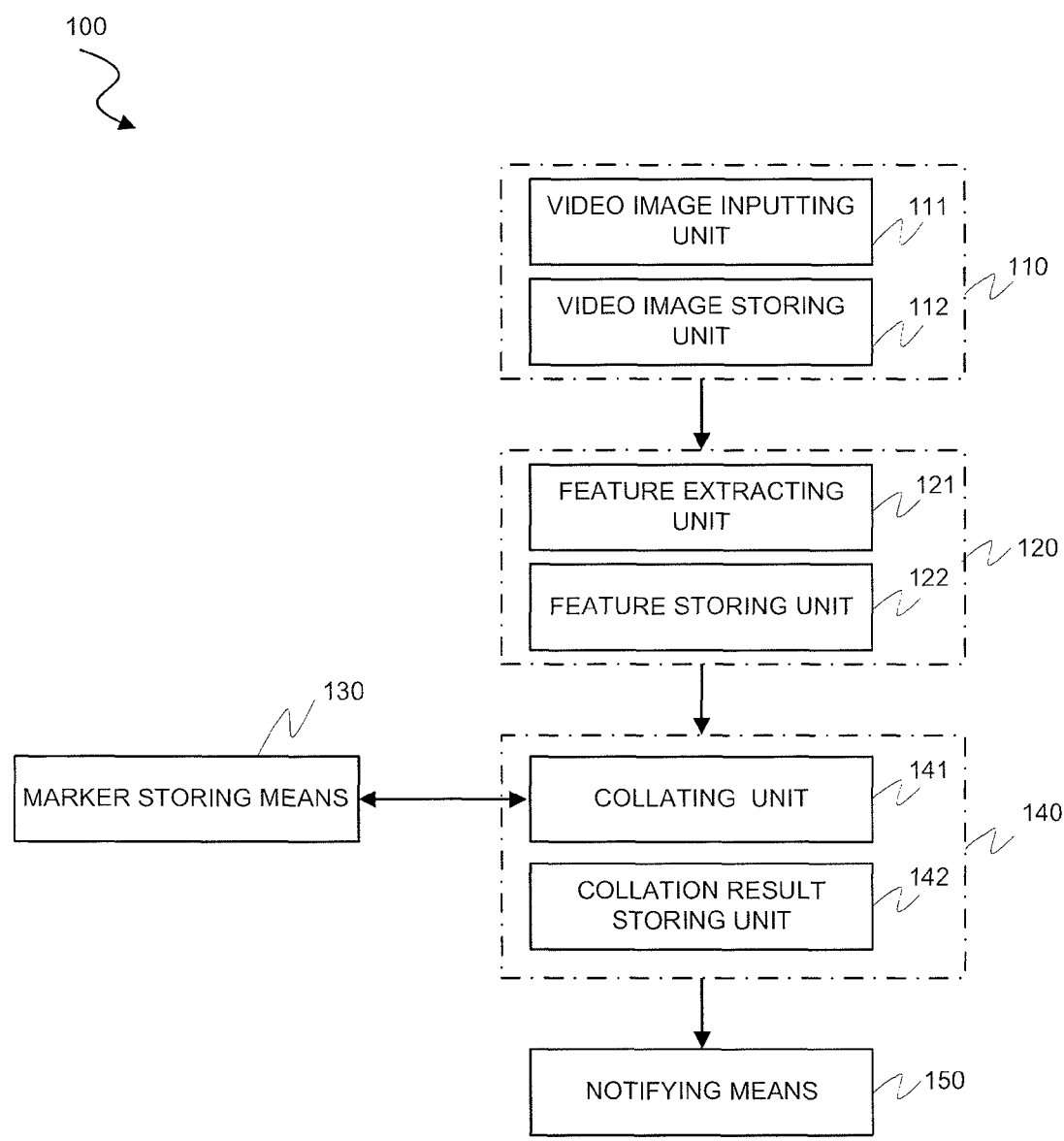
FIG. 74 is a block diagram illustrating a detailed configuration of the marker detection device.

Herein, the video image inputting means 110 includes a video image inputting unit 111 and a video image storing unit 112 as shown in FIG. 74.

Figure 75:
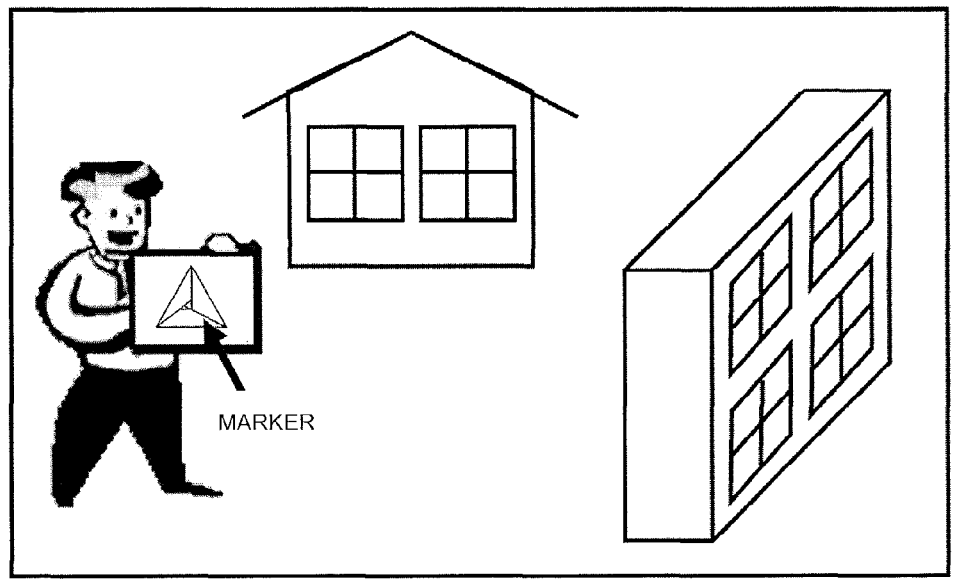
FIG. 75 is a view illustrating an example of the detection-targeted video image.

The video image inputting unit 111 images (inputs) the environment in which the marker might exist as the detection-targeted video image. For example, the video image inputting unit 111 may input the detection-targeted video image containing the marker as shown in FIG. 75.

The video image storing unit 112 stores the still image frames constituting the detection-targeted video image as digitalized frame images.

The feature extracting means 12040 includes a feature extracting unit 121 and a feature storing unit 122 as shown in FIG. 74.

The feature extracting unit 121 takes out the frame images from the video image storing unit 122. And, the feature extracting unit 121 extracts the image features containing characteristic patterns in the taken-out frame images.

Figure 76:
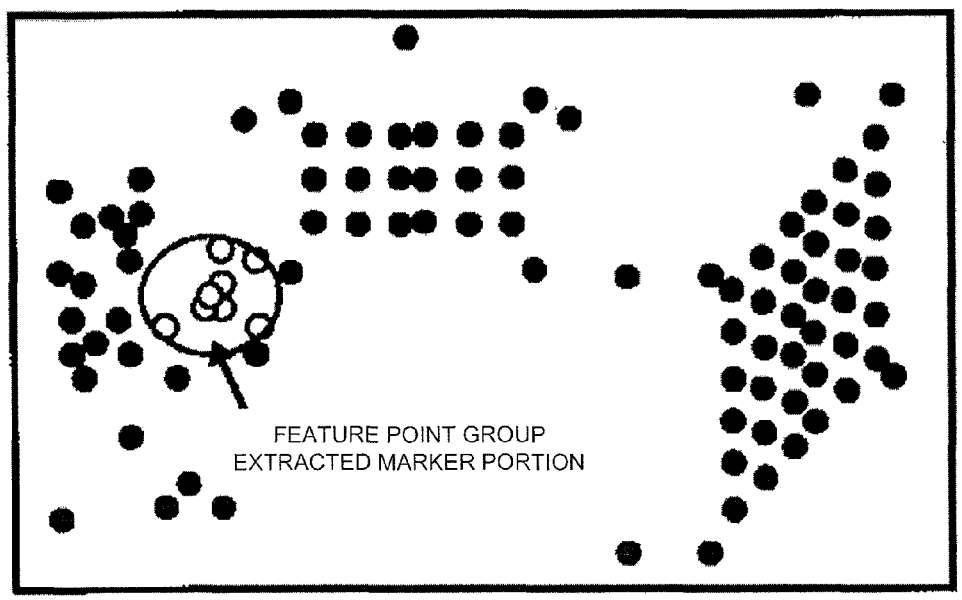
FIG. 76 is a view illustrating an example of the feature points extracted from the detection-targeted video image.

For example, when the detection-targeted video image is an image shown in FIG. 75, the feature extracting unit 121 extracts the feature points shown in FIG. 76 from the above detection-targeted video image.

The feature storing unit 122 stores each of the coordinates of the feature points extracted by the feature extracting unit 121.

The marker storing means 130 stores data related to each of the plural kinds of the marker patterns generated by the marker generation device 1. This marker storing means 130 may store, for example, the feature points based upon the marker patterns.

The collating means 140, as shown in FIG. 74, includes a collating unit 141 and a collation result storing unit 142.

The collating unit 141 takes outs each of the coordinates of the feature points based upon the detection targeted video images from the feature storing unit 122, takes out each of the coordinates of the feature points based upon each of plural kinds of the marker patterns from the marker storing means 130, and collates them. And, the collating unit 141 determines whether or not a feature point matching with the feature point based upon any of the plural kinds of the marker patterns exists within the feature points based upon the detection-targeted video image.

For example, a configuration may be made so that when one feature of the marker pattern and one feature generated from the detection-targeted video image have an Euclidean distance equal to or less than a predetermined value in the feature space, these features may be regarded as a match, and the number of the features regarded as a match is accumulated as a score, and when the score reaches a threshold, the detection of the markers is acknowledged. Further, a condition that the accumulated value of the aforementioned Euclidean distances is equal to or less than a predetermined value may be added hereto.

Further, for example, when the feature extracting unit 41 of the marker generation device 1c performs the determination of the unique features in a quantized feature space, the marker storing means 130 stores the coordinates of the above unique features beforehand. And, when the feature coming from the detection-targeted video image has been projected even once onto the mesh cell having a frequency of zero at the time of designing the marker, the collating unit 141 may regard it as contribution from the marker pattern to confirm the detection. With this, the marker detection can be quickly performed.

So as to avoid the erroneous detection of the marker due to noise or an error in the feature extraction calculation, the frequency of the projection to be acknowledged may be defined as a predetermined value of one or more. Alternatively, when the quantized feature space can be generated from the marker pattern, it may be utilized. In this case, the marker pattern detection may be acknowledged when the unique feature obtained from the detection-targeted video image matches with a feature space mesh onto which the marker pattern is projected once or a predetermined number of times.

When as a result of this collation, a feature point matching with the feature point based upon the marker pattern exists within the feature points based upon the detection-targeted video image, the collating unit 141 detects the coordinate of the above feature point in the detection-targeted video image, and causes the collation result storing unit 142 to store it. Further, the collating unit 141 sends out a notification signal to the notifying means 150.

On the other hand, when no feature point matching with the feature point based upon the marker pattern exists within the feature points based upon the detection-targeted video image, the collating unit 141 does not detect the coordinates of the feature points, nor sends out the notification signal.

Specifically, the collating unit 141 searches for a feature point matching with the feature point based upon the marker pattern extracted from the marker storing means 130, from the feature point groups shown in FIG. 76. At this time, the collating unit 141 expands or reduces the feature point group based upon the marker pattern, and collates it with the feature point group in the feature space.

As a result, when the collating unit 141 finds a feature point matching with the feature point based upon the marker pattern extracted from the marker storing means 130, from among the feature point groups shown in FIG. 76, it detects the coordinated of the above feature point in the feature space shown in FIG. 76, and causes the collation result storing unit 142 to store it.

The collation result storing unit 142 stores data related to the collation performed in the collating unit 141.

For example, the collation result storing unit 142 stores each of the coordinates of the feature points (in FIG. 76, feature points encircled by a left-side ellipse) matching with the feature points based upon the marker pattern, out of the feature points based upon the detection-targeted video image.

Upon receipt of the notification signal from the collating unit 141, the notifying means 150 notifies the outside that a feature point matching with the feature point based upon the marker pattern exists within the feature points based upon the detection-targeted video image. As a method of this notification, for example, there exists a voice output, a screen display, or the like.

(The Marker Detection Method)

Figure 77:
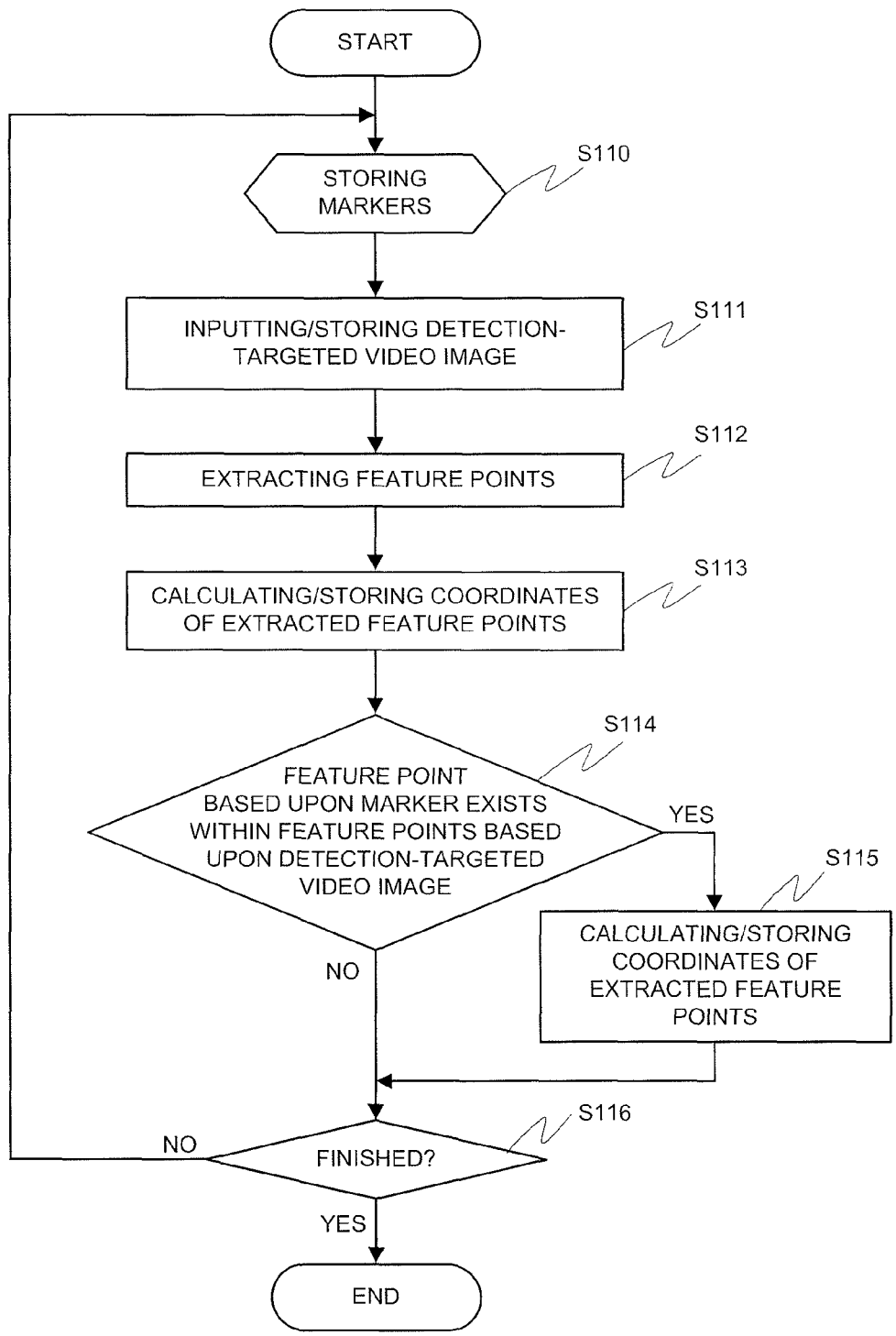
FIG. 77 is a flowchart illustrating a procedure of the marker detection method.

Next, the marker detection method of this exemplary embodiment will be explained by making a reference to FIG. 77.

The marker storing means 130 stores data related to each of the plural kinds of the marker patterns generated by the marker generation device 1 beforehand (Step 110). This marker storing means 130 may store, for example, the feature points based upon the marker pattern.

The video image inputting unit 111 of the video image inputting means 11030 inputs the environment in which the marker might exist as the detection-targeted video image (Step 111).

The video image storing unit 112 stores the still image frames constituting the detection-targeted video image as digitalized frame images.

The feature extracting unit 121 of the feature extracting means 12040 takes out the frame images from the video image storing unit 112. And, the feature extracting unit 121 extracts the image features containing characteristic patterns in the taken-out frame image (Step 112).

Further, the feature extracting unit 121 calculates the coordinates of the extracted feature points (Step 113).

The feature storing unit 122 stores each of the coordinates of the feature points extracted by the feature extracting unit 121.

The collating unit 141 of the collating means 140 takes outs each of the coordinates of the feature points based upon the detection-targeted video images from the feature storing unit 122, takes out each of the coordinates of the feature points based upon each of plural kinds of the marker patterns from the marker storing means 130, and collates them (Step 114). And, the collating unit 141 determines whether or not a feature point matching with the feature point based upon any of the plural kinds of the marker patterns exists within the feature points based upon the detection-targeted video image.

When as a result of the determination, a feature point matching with the feature point based upon any of plural kinds of the marker patterns exists within the feature points based upon the detection-targeted video image, the collating unit 141 detects the coordinate of the above feature point in the detection-targeted video image, and causes the collation result storing unit 142 to store the detected coordinate together with the marker pattern of the feature point matching therewith. Further, the collating unit 141 sends out the notification signal to the notifying means 150.

On the other hand, when no feature point matching with the feature point based upon each of plural kinds of the marker patterns exists within the feature points based upon the detection-targeted video image, the collating unit 141 does not detect the coordinates of the feature points, nor send outs the notification signal.

Upon receipt of the notification signal from the collating unit 141, the notifying means 150 notifies the outside that a feature point matching with the feature point based upon any of plural kinds of the marker patterns exists within the feature points based upon the detection-targeted video image (Step 115).

Thereafter, a determination as to whether or not to finish the operation is made (Step 116), and processes of the Step 111 to the Step 116 are repeated when the operation is not finished.

As explained above, the marker detection device and the marker detection method of this exemplary embodiment enable the marker reflected onto the detection-targeted video image to be surely detected by employing the marker patterns generated by the marker generating device.

Further, while it was assumed that the detection of the marker was implemented in the feature space in this exemplary embodiment, the detection of the marker is not limited to the implementation in the feature space, and for example, the detection of the marker may be implemented in the invariant feature space. In this case, in the marker generation stage, the unique feature arrangement diagram from which the unique features have been selected is stored beforehand, and in the marker detection stage, the feature points are extracted from the detection-targeted video image, these feature points are mapped onto the invariant feature space and are defined as the invariant features, this invariant feature space and the aforementioned unique feature arrangement diagram are superposed, and when the invariant feature indicated in the invariant feature space appears in the segments of the invariant features indicated in the unique feature arrangement diagram, this invariant feature may be detected as the invariant feature based upon the marker.

In addition, when the object-color invariant and the texture invariant are employed at the time of generating the marker pattern, the marker is detected by employing these object-color invariant and texture invariant at the time of detecting the marker. In this case, in the marker generation stage, the object-color invariant and the texture invariant are extracted from the background video image, and the unique features based upon these are selected and stored beforehand, and in the marker detection stage, when the object-color invariant and the texture invariant are extracted from the detection-targeted video image, and these object-color invariant and texture invariant match with the unique feature, these object-color invariant and texture invariant may be detected as the marker.

[The Marker Generation Detection Device and the Marker Generation Detection System]

(The Marker Generation Detection Device)

Next, the marker generation detection device will be explained by making a reference to FIG. 78.

Figure 78:
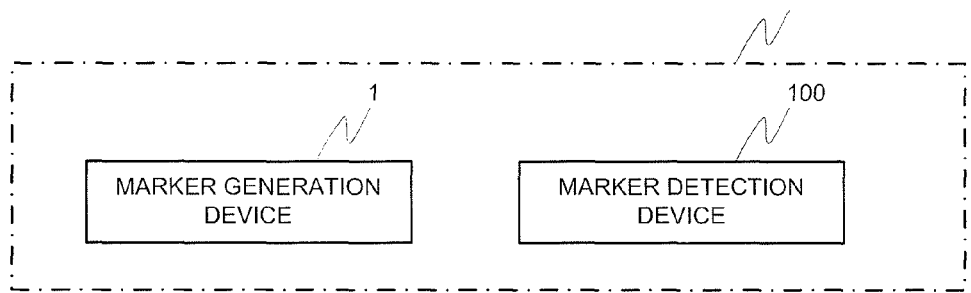
FIG. 78 is a block diagram illustrating a configuration of the marker generation detection device.

FIG. 78 is a block diagram illustrating a configuration of the marker generation detection device.

As shown in FIG. 78, a marker generation detection device 200 is provided with a marker generation device 1 and a marker detection device 100.

Herein, as the marker generation device 1, any of the marker generation devices 1 (1a to 1d) of the first exemplary embodiment to the fourth exemplary embodiment described before may be employed.

As the marker detection device 100, the marker detection device 100 shown in FIG. 37 described before may be employed.

In such a manner, the marker generation detection device 200 may assume a configuration in which the marker generation device 1 and the marker detection device 100 are unified.

Further, the marker generation detection device 200 may assume a configuration as shown in FIG. 79 because the marker generation device 1 and the marker detection device 100 include a function that can be shared.

For example, the marker generation detection device 200 includes a unique feature selecting means 10, a marker pattern generating means 20, a video image inputting means 30, a feature extracting means 40, a collating means 140, and a notifying means 150. Further, the marker pattern generating means 20 includes a marker generating unit 21 and a marker storing unit 22.

The unique feature selecting means 10, the marker pattern generating means 20, the video image inputting means 30, and the feature extracting means 40, out of them, include a function as the marker generation device, respectively.

On the other hand, the video image inputting means 30, the feature extracting means 40, the marker storing unit 22, the collating means 140, and the notifying means 150 include a function as the marker detection device, respectively.

And, the video image inputting means 30, the feature extracting means 40, and the marker storing unit 22 are portions that are common in the marker generation device and the marker detection device.

The marker generation method in the marker generation device is similar to the marker generation method in the first exemplary embodiment to the fourth exemplary embodiment described before.

Further, the marker detection method in the marker detection device is similar to the marker detection method in the exemplary embodiments described before.

(The Marker Generation Detection System)

Next, the marker generation detection system of this exemplary embodiment will be explained by making a reference to FIG. 80.

As shown in the same figure, a marker generation detection system 300 is provided with a marker generation device 1 and a marker detection device 100. These marker generation device 1 and marker detection device 100 may be connected to each other via a communication network, a communication cable 400, or the like.

The marker generation device 1 includes a unique feature selecting means 10, a marker pattern generating means 20, a video image inputting means 30, a feature extracting means 40, and a communicating means 60.

The communicating means 60 takes out data related to the markers stored in the marker storing unit 22, and transmit it to the marker detection device 100.

The marker detection device 100 includes a video image inputting means 110, a feature extracting means 120, a marker storing means 130, a collating means 140, a notifying means 150, and a communicating means 160.

The communicating means 160 receives the data related to the markers transmitted from the marker generation device 1. Further, the communicating means 160 causes the marker storing means 130 to store the above received data related to the markers.

As explained above, in accordance with the marker generation detection device and the marker generation detection system, the marker generation detection device or the marker generation function of the marker generation detection system is capable of generating plural kinds of the marker patterns. With this, for example, causing the kind of the marker pattern and the kind of the object to correspond to each other enables not only the object, being a to-be-detected target, but also the kind of the above object to be detected in the marker detection stage.

Further, putting a plurality of the use unique feature groups side by side based upon the distance, selecting two use unique feature groups or more in such a manner that the above distance becomes faraway, and adding the marker to the object enables the kind of the object to be detected by the marker having a high robustness.

[The Marker Generation Program and the Marker Detection Program]

Next, the marker generation program and the marker detection program will be explained.

The marker generation function (function of executing the marker generation method) and the marker detection function (function of executing the marker detection method) of a computer (the marker generation device, the marker detection device, the marker generation detection device, and the marker generation detection system) in the above-mentioned each exemplary embodiment are realized with the marker generation program or the marker detection program stored in the storing means (for example, ROM (Read Only Memory), a hard disk, or the like).

The marker generation program and the marker detection program, which are loaded into a controlling means (CPU (Central Processing Unit) etc.) of the computer, send a command to each of the components of the computer, and cause the components of the computer to execute predetermined processes, for example, the video image input process, the feature extraction process, the unique feature selection process, the marker pattern plural-kind generation process, object-use unique feature group correspondence process, the invariant feature conversion process, the invariant feature accumulation process, the invariant feature synthesis process, and the video image input control process of the marker generation device as well as the video image input process, the feature extraction process, the collation process, and the notification process of the marker detection device, and the like.

With this, the configuring means of the marker generation program, being software, and the computer (the marker generation device, the marker detection device, the marker generation detection device, and the marker generation detection system), being the hardware resource, cooperate with each other, thereby allowing the marker generation function and the marker detection function to be realized.

Additionally, the marker generation program for realizing the marker generation function and the marker detection function is stored in ROM and a hard disk of the computer, and the like, and besides, it may be filed in computer-readable recording mediums, for example, an external storage device and a portable recording medium.

The so-called external storage device could be a memory expansion device that has the recording medium such as CD-ROM (Compact Disc-Read Only Memory) built-in therein and is externally connected to the marker generation device. On the other hand, the so-called portable recording medium is a recording medium that is installable into a recording medium driving device (driving device) and yet is portable, and for example, could be a flexible disc, a memory card, an optical magnetic disc, and the like.

And, the program recorded in the recording medium is loaded into RAM (Random Access Memory) of the computer or the like, and is executed by CPU (controlling means). This execution allows the function of the marker generation device of each exemplary embodiment described above to be realized.

In addition, when the marker generation program is loaded by the computer, the marker generation program kept by other computers may be downloaded into RAM or an external storage device, which the above computer includes, by utilizing a communication line. This downloaded marker generation program is also executed by CPU, and the marker generation function of the marker generation device of each of the above-mentioned exemplary embodiments is realized.

While the preferred exemplary embodiments of the marker generation device, the marker generation detection system, the marker generation detection device, the marker, the marker generation method, and the marker generation program of the present invention were explained above, the marker generation device, the marker generation detection system, the marker generation detection device, the marker, the marker generation method, and the marker generation program in accordance with the present invention are not limited only to the exemplary embodiments described above, and it will be understood that various changes in form and details may be made herein without departing from the spirit and scope of the present invention as defined by the claims.

For example, while in the exemplary embodiments described above, it was exemplified that plural kinds of the markers were generated in the one-time marker generation process, the number of the times of the marker generation process is not limited to one (1), and the marker generation process may be performed in plural times. And, a configuration may be made so that the markers generated until then are not generated in the second-time marker generation process and after it.

Additionally, as the marker generation device, the marker generation detection system, the marker generation detection device, the marker, the marker generation method, and the marker generation program of the present invention, the marker generation devices, the marker generation detection systems, the marker generation detection devices, the markers, the marker generation methods, and the marker generation programs in the first exemplary embodiment to the fourth exemplary embodiment may be arbitrarily combined.

Further, the content of the above-mentioned exemplary embodiments can be expressed as follows.

(Supplementary note 1) A marker generation device comprising:

a unique feature selecting means that selects, in a predetermine space in which feature points extracted from an image are displayed, portions of said predetermine space in which the number of said feature points is equal to or less than a predetermined number in a plural number as unique features; and a marker pattern generating means that generates plural kinds of marker patterns by employing the whole or one part of said plurality of the unique features.

(Supplementary note 2) A marker generation device according to Supplementary note 1, wherein one unique feature, or two or more to be employed for generating one said marker pattern is defined as a use unique feature group, a plurality of the use unique feature groups for generating plural kinds of said marker patterns are configured of a combination of different unique features, respectively, and when selecting said use unique feature groups in a plural number from among a plurality of the unique features selected by said unique feature selecting means, said marker pattern generating means calculates data of distances related to the unique features constituting said use unique feature groups based upon coordinates of said unique features in said predetermined space, and selects the use unique feature groups to be employed for generating said markers based upon this data of the distances.

(Supplementary note 3) A marker generation device according to Supplementary note 2, wherein said marker pattern generating means selects, in such a manner that a sum total of respective distances between each of a plurality of the unique features constituting one said use unique feature group and the other becomes large, the above plurality of the unique features.

(Supplementary note 4) A marker generation device according to Supplementary note 2, wherein said marker pattern generating means selects a plurality of the unique features constituting one said use unique feature group and a plurality of the unique features constituting another said use unique feature group in such a manner that a sum total of respective distances between each of a plurality of the unique features constituting one said use unique feature group and each of a plurality of the unique features constituting another use unique feature group becomes large.

(Supplementary note 5) A marker generation device according to Supplementary note 2, wherein said marker pattern generating means:

executes a process of superposing one unique feature to be contained in one said use unique feature group and one unique feature to be contained in another use unique feature group upon each other, and calculating a sum total of respective distances between each of one unique feature, or two or more that is not superposed in one said use unique feature group, and each of one unique feature, or two or more that is not superposed in another said use unique feature group, whenever superposing upon each of a plurality of the unique features constituting one said use unique feature group each of a plurality of the unique features constituting another said use unique feature group, and defines a smallest sum total, out of a plurality of the sum totals calculated with this execution as a shape approximation; and selects one unique feature, or two or more constituting one said use unique feature group and one unique feature, or two or more constituting another said use unique feature group from among a plurality of the unique features selected by said unique feature selecting means in such a manner that this shape approximation becomes a large value.

(Supplementary note 6) A marker generation device according to one of Supplementary note 1 to Supplementary note 5, comprising a marker setting means that causes two use unique feature groups or more, out of a plurality of the use unique feature groups selected by said marker pattern generating means, to correspond to any of a plurality of objects.

(Supplementary note 7) A marker generation device according to Supplementary note 6, wherein said marker setting means selects the use unique feature groups corresponding to said plurality of the objects in such a manner that said distance related to the use unique feature groups calculated according to a predetermined distance calculation process becomes faraway.

(Supplementary note 8) A marker generation device according to Supplementary note 7:

wherein said distance to be calculated with the predetermined distance calculation process is a Levenshtein distance; and wherein said marker setting means calculates the Levenshtein distance between each of said plurality of the use unique feature groups and the other, and selects the use unique feature groups corresponding to said plurality of the objects in such a manner that this calculated Levenshtein distance becomes faraway.

(Supplementary note 9) A marker generation device according to Supplementary note 7:

wherein said distance to be calculated with the predetermined distance calculation process is a Euclidean distance in the predetermined space; and wherein said marker setting means calculates said Euclidean distance between each of said plurality of the use unique feature groups and the other, and selects the use unique feature groups corresponding to said plurality of the objects in such a manner that this calculated Euclidean distance becomes faraway.

(Supplementary note 10) A marker generation device according to Supplementary note 7:

wherein said distance to be calculated with the predetermined distance calculation process is a sum total of respective distances between the unique features in two use unique feature groups; and wherein said marker setting means calculates a sum total of respective distances between the unique features in two use unique feature groups in terms of said plurality of the use unique feature groups, and selects the use unique feature groups corresponding to said plurality of the objects in such a manner that this calculated sum total becomes large.

(Supplementary note 11) A marker generation device according to Supplementary note 7:

wherein said distance to be calculated with the predetermined distance calculation process is a shape approximation between two use unique feature groups; and wherein said marker setting means calculates the shape approximation between two use unique feature groups in terms of said plurality of the use unique feature groups, and selects the use unique feature groups corresponding to said plurality of the objects in such a manner that this calculated shape approximation becomes large.

(Supplementary note 12) A marker generation device according to one of Supplementary note 6 to Supplementary note 11:

wherein said plurality of the objects can be classified into two kinds or more;

wherein at least one kind, out of said two kinds or more, can be furthermore classified into low-level kinds; and wherein said marker setting means causes the use unique feature groups having a faraway distance to correspond for each high-level kind, and causes the use unique feature groups having a near distance to correspond for each low-level kind.

(Supplementary note 13) A marker generation detection system comprising a marker Generation device and a marker detection device:

wherein said marker generation device comprises:

a first video image inputting means that inputs an image;

a first arranging means that extracts feature points from said image inputted by this first video image inputting means; and displays these extracted feature points onto a predetermined space;

a unique feature selecting means that selects as unique features portions of said space in which the number of said feature points is equal to or less than a predetermined number; and a marker generating means that generates plural kinds of marker patterns by employing said unique features; and wherein said marker detection device comprises:

a marker storing means that stores said plural kinds of the marker patterns;

a second video image inputting means that inputs the image;

a second arranging means that extracts the feature points based upon said image inputted by this second video image inputting means, and displays these extracted feature points onto the predetermined space; and a collating means that determines whether or not an arrangement of the unique feature based upon said marker pattern exists in an arrangement of a feature point group displayed onto said predetermined space.

(Supplementary note 14) A marker generation detection system according to Supplementary note 13: wherein one unique feature, or two or more to be employed for generating one said marker pattern is defined as a use unique feature group, a plurality of the use unique feature groups for generating plural kinds of said marker patterns are configured of a combination of different unique features, respectively, and when selecting said use unique feature groups in a plural number from among a plurality of the unique features selected by said unique feature selecting means, said marker pattern generating means calculates data of distances related to the unique features constituting said use unique feature groups based upon coordinates of said unique features in said predetermined space, and selects the use unique feature groups to be employed for generating said markers based upon this data of the distances.

(Supplementary note 15) A marker generation detection device comprising:

a first video image inputting means that inputs an image;

a first arranging means that extracts feature points from said image inputted by this first video image inputting means, and displays these extracted feature points onto a predetermined space;

a unique feature selecting means that selects as unique features portions of said space in which the number of said feature points is equal to or less than a predetermined number;

a marker generating means that generates plural kinds of marker patterns by employing said unique features;

a marker storing means that stores said marker patterns;

a second video image inputting means that inputs the image;

a second arranging means that extracts the feature points based upon said image inputted by this second video image inputting means, and displays these extracted feature points onto the predetermined space; and a collating means that determines whether or not an arrangement of the unique feature based upon said marker pattern exists in an arrangement of a feature point group displayed onto said predetermined space.

(Supplementary note 16) A marker generation detection device according to Supplementary note 15: wherein one unique feature, or two or more to be employed for generating one said marker is defined as a use unique feature group, a plurality of the use unique feature groups for generating plural kinds of said marker patterns are configured of a combination of different unique features, respectively, and when selecting said use unique feature groups in a plural number from among a plurality of the unique features selected by said unique feature selecting means, said marker pattern generating means calculates data of distances related to the unique features constituting said use unique feature groups based upon coordinates of said unique features in said predetermined space, and selects the use unique feature groups to be employed for generating said markers based upon this data of the distances.

(Supplementary note 17) A marker generated in plural kinds by selecting, in a predetermined space onto which feature points extracted for each image are displayed, portions in which the number of said feature points are equal to or less than a predetermined number as unique features, and employing these selected unique features.

(Supplementary note 18) A marker according to Supplementary note 17, wherein one unique feature, or two or more to be employed for generating one said marker is defined as a use unique feature group, a plurality of the use unique feature groups for generating plural kinds of marker patterns are configured of a combination of different unique features, respectively, and when selecting said use unique feature groups in a plural number from among a plurality of the unique features, data of distances related to the unique features constituting said use unique feature groups is calculated based upon coordinates of said unique features in said predetermined space, and the use unique feature groups to be employed for generating said markers are selected based upon this data of the distances.

(Supplementary note 19) A marker generation method comprising the steps of:

inputting an image;

extracting feature points from said image;

displaying said feature points onto a predetermined space;

selecting as unique features portions of said space in which the number of said feature points is equal to or less than a predetermined number in a plural number; and generating plural kinds of marker patterns by employing the whole or one part of said plurality of the unique features.

(Supplementary note 20) A marker generation method according to Supplementary note 19 in which one unique feature, or two or more to be employed for generating one said marker is defined as a use unique feature group, and a plurality of the use unique feature groups for generating plural kinds of said marker are configured of a combination of different unique features, respectively, comprising the steps of:

when selecting said use unique feature groups in a plural number from among a plurality of the unique features selected by said unique feature selecting step, calculating data of distances related to the unique features constituting said use unique feature groups based upon coordinates of said unique features in said predetermined space; and selecting the use unique feature groups to be employed for generating said markers based upon this data of distances.

(Supplementary note 21) A marker generation program for causing an information processing device to execute the processes of:

inputting an image;

extracting feature points from said image;

displaying said feature points onto a predetermined space;

selecting as unique features portions of said space in which the number of said feature points is equal to or less than a predetermined number in a plural number; and generating plural kinds of marker patterns by employing the whole or one part of said plurality of the unique features.

(Supplementary note 22) A marker generation program according to Supplementary note 21 in which one unique feature, or two or more to be employed for generating one said marker is defined as a use unique feature group, and a plurality of the use unique feature groups for generating plural kinds of said marker are configured of a combination of different unique features, respectively, causing the information processing device to execute the processes of:

when selecting said use unique feature groups in a plural number from among a plurality of the unique features selected by said unique feature selecting process, calculating data of distances related to the unique features constituting said use unique feature groups based upon coordinates of said unique features in said predetermined space; and selecting the use unique feature groups to be employed for generating said markers based upon this data of distances.

This application is based upon and claims the benefit of priority from Japanese patent application No. 2009-171838, filed on Jul. 23, 2009, the disclosure of which is incorporated herein in its entirety by reference.

INDUSTRIAL APPLICABILITY

The present invention is an invention relating to generation of a marker, and may be applied to fields for devices or appliances for generating a marker. Besides, the present invention may also be applied for fields of video image monitoring such as those represented by article management and physical security, robot vision, mixed reality UI, and content generation.

REFERENCE SIGNS LIST 1a to 1d marker generation devices
10 unique feature selecting means
20 marker pattern generating means
21 marker pattern generating unit
22 marker storing unit
23 marker ID setting unit
30 video image inputting means
40 feature extracting means
50 invariant feature converting means

The invention claimed is:

1. A marker generation device comprising:

a unique feature selector that selects, in a predetermine space in which feature points extracted from an image are displayed, portions of said predetermine space in which the number of said feature points is equal to or less than a predetermined number in a plural number as unique features; and a marker pattern generator that generates plural kinds of marker patterns by employing the whole or one part of said plurality of the unique features, and wherein one unique feature, or two or more to be employed for generating one said marker pattern is defined as a use unique feature group, a plurality of the use unique feature groups for generating plural kinds of said marker patterns are configured of a combination of different unique features, respectively, and when selecting said use unique feature groups in a plural number from among a plurality of the unique features selected by said unique feature selector, said marker pattern generator calculates data of distances related to the unique features constituting said use unique feature groups based upon coordinates of said unique features in said predetermined space, and selects the use unique feature groups to be employed for generating said markers based upon this data of the distances.

2. A marker generation device according to claim 1, wherein said marker pattern generator selects, in such a manner that a sum total of respective distances between each of a plurality of the unique features constituting one said use unique feature group and the other becomes large, the above plurality of the unique features.

3. A marker generation device according to claim 1, wherein said marker pattern generator selects a plurality of the unique features constituting one said use unique feature group and a plurality of the unique features constituting another said use unique feature group in such a manner that a sum total of respective distances between each of a plurality of the unique features constituting one said use unique feature group and each of a plurality of the unique features constituting another use unique feature group becomes large.

4. A marker generation device according to claim 1, wherein said marker pattern generator:

executes a process of superposing one unique feature to be contained in one said use unique feature group and one unique feature to be contained in another use unique feature group upon each other, and calculating a sum total of respective distances between each of one unique feature, or two or more that is not superposed in one said use unique feature group, and each of one unique feature, or two or more that is not superposed in another said use unique feature group, whenever superposing upon each of a plurality of the unique features constituting one said use unique feature group each of a plurality of the unique features constituting another said use unique feature group, and defines a smallest sum total, out of a plurality of the sum totals calculated with this execution as a shape approximation; and selects one unique feature, or two or more constituting one said use unique feature group and one unique feature, or two or more constituting another said use unique feature group from among a plurality of the unique features selected by said unique feature selector in such a manner that this shape approximation becomes a large value.

5. A marker generation device according to claim 1, comprising a marker setting unit configured to cause two use unique feature groups or more, out of a plurality of the use unique feature groups selected by said marker pattern generator, to correspond to any of a plurality of objects.

6. A marker generation device according to claim 5, wherein said marker setting unit is configured to select the use unique feature groups corresponding to said plurality of the objects in such a manner that said distance related to the use unique feature groups calculated according to a predetermined distance calculation process becomes faraway.

7. A marker generation device according to claim 6:
wherein said distance to be calculated with the predetermined distance calculation process is a Levenshtein distance; and
wherein said marker setting unit is configured to calculate the Levenshtein distance between each of said plurality of the use unique feature groups and the other, and selects to select the use unique feature groups corresponding to said plurality of the objects in such a manner that this calculated Levenshtein distance becomes faraway.

8. A marker generation device according to claim 6:
wherein said distance to be calculated with the predetermined distance calculation process is a Euclidean distance in the predetermined space; and
wherein said marker setting unit is configured to calculate said Euclidean distance between each of said plurality of the use unique feature groups and the other, and to select the use unique feature groups corresponding to said plurality of the objects in such a manner that this calculated Euclidean distance becomes faraway.

9. A marker generation device according to claim 6:
wherein said distance to be calculated with the predetermined distance calculation process is a sum total of respective distances between the unique features in two use unique feature groups; and
wherein said marker setting unit is configured to calculate a sum total of respective distances between the unique features in two use unique feature groups in terms of said plurality of the use unique feature groups, and to select the use unique feature groups corresponding to said plurality of the objects in such a manner that this calculated sum total becomes large.

10. A marker generation device according to claim 6:
wherein said distance to be calculated with the predetermined distance calculation process is a shape approximation between two use unique feature groups; and
wherein said marker setting unit is configured to calculate the shape approximation between two use unique feature groups in terms of said plurality of the use unique feature groups, and to select the use unique feature groups corresponding to said plurality of the objects in such a manner that this calculated shape approximation becomes large.

11. A marker generation device according to claim 5:
wherein said plurality of the objects can be classified into two kinds or more;
wherein at least one kind, out of said two kinds or more, can be furthermore classified into low-level kinds; and
wherein said marker setting unit is configured to cause the use unique feature groups having a faraway distance to correspond for each high-level kind, and to cause the use unique feature groups having a near distance to correspond for each low-level kind.

12. A marker generation detection system comprising a marker generation device and a marker detection device:
wherein said marker generation device comprises:
a first video image inputting unit configured to input an image;
a first arranging unit configured to extract feature points from said image inputted by this first video image inputting unit, and to display these extracted feature points onto a predetermined space;
a unique feature selector configured to select as unique features portions of said space in which the number of said feature points is equal to or less than a predetermined number; and
a marker generator configured to generate plural kinds of marker patterns by employing said unique features; and
wherein said marker detection device comprises:
a marker storage configured to store said plural kinds of the marker patterns;
a second video image inputting unit configured to input the image;
a second arranging unit configured to extract the feature points based upon said image inputted by this second video image inputting unit, and to display these extracted feature points onto the predetermined space; and
a collating unit configured to determine whether or not an arrangement of the unique feature based upon said marker pattern exists in an arrangement of a feature point group displayed onto said predetermined space.

13. A marker generation detection system according to claim 12: wherein one unique feature, or two or more to be employed for generating one said marker pattern is defined as a use unique feature group, a plurality of the use unique feature groups for generating plural kinds of said marker patterns are configured of a combination of different unique features, respectively, and when selecting said use unique feature groups in a plural number from among a plurality of the unique features selected by said unique feature selector, said marker pattern generator calculates data of distances related to the unique features constituting said use unique feature groups based upon coordinates of said unique features in said predetermined space, and selects the use unique feature groups to be employed for generating said markers based upon this data of the distances.

14. A marker generation detection device comprising:
a first video image inputting unit configured to input an image;
a first arranging unit configured to extract feature points from said image inputted by this first video image inputting unit, and to display these extracted feature points onto a predetermined space;
a unique feature selector configured to select as unique features portions of said space in which the number of said feature points is equal to or less than a predetermined number;
a marker generator configured to generate plural kinds of marker patterns by employing said unique features;
a marker storage configured to store said marker patterns;
a second video image inputting unit configured to input the image;
a second arranging unit configured to extract the feature points based upon said image inputted by this second video image inputting unit, and to display these extracted feature points onto the predetermined space; and
a collating unit configured to determine whether or not an arrangement of the unique feature based upon said marker pattern exists in an arrangement of a feature point group displayed onto said predetermined space.

15. A marker generation detection device according to claim 14: wherein one unique feature, or two or more to be employed for generating one said marker is defined as a use unique feature group, a plurality of the use unique feature groups for generating plural kinds of said marker patterns are configured of a combination of different unique features, respectively, and when selecting said use unique feature groups in a plural number from among a plurality of the unique features selected by said unique feature selector, said marker pattern generator calculates data of distances related to the unique features constituting said use unique feature groups based upon coordinates of said unique features in said predetermined space, and selects the use unique feature groups to be employed for generating said markers based upon this data of the distances.

16. A marker generation method comprising the steps of:
  inputting an image;
  extracting feature points from said image;
  displaying said feature points onto a predetermined space;
  selecting as unique features portions of said space in which the number of said feature points is equal to or less than a predetermined number in a plural number; and
  generating plural kinds of marker patterns by employing the whole or one part of said plurality of the unique features.

17. A marker generation method according to claim 16 in which one unique feature, or two or more to be employed for generating one said marker is defined as a use unique feature group, and a plurality of the use unique feature groups for generating plural kinds of said marker are configured of a combination of different unique features, respectively, comprising the steps of:
  when selecting said use unique feature groups in a plural number from among a plurality of the unique features selected by said unique feature selecting step, calculating data of distances related to the unique features constituting said use unique feature groups based upon coordinates of said unique features in said predetermined space; and
  selecting the use unique feature groups to be employed for generating said markers based upon this data of distances.

18. A non-transitory computer readable storage medium storing a marker generation program for causing an information processing device to execute the processes of:
  inputting an image;
  extracting feature points from said image;
  displaying said feature points onto a predetermined space;
  selecting as unique features portions of said space in which the number of said feature points is equal to or less than a predetermined number in a plural number; and
  generating plural kinds of marker patterns by employing the whole or one part of said plurality of the unique features.

19. A non-transitory computer readable storage medium storing a marker generation program according to claim 18 in which one unique feature, or two or more to be employed for generating one said marker is defined as a use unique feature group, and a plurality of the use unique feature groups for generating plural kinds of said marker are configured of a combination of different unique features, respectively, causing the information processing device to execute the processes of:
  when selecting said use unique feature groups in a plural number from among a plurality of the unique features selected by said unique feature selecting process, calculating data of distances related to the unique features constituting said use unique feature groups based upon coordinates of said unique features in said predetermined space; and
  selecting the use unique feature groups to be employed for generating said markers based upon this data of distances.

* * * * *

UNITED STATES PATENT AND TRADEMARK OFFICE
CERTIFICATE OF CORRECTION

PATENT NO. : 8,705,864 B2
APPLICATION NO. : 13/386294
DATED : April 22, 2014
INVENTOR(S) : Noboru Nakajima It is certified that error appears in the above-identified patent and that said Letters Patent is hereby corrected as shown below:

On the Title page Col. 2, Line 1-2: Delete "Arbituary" and insert -- Arbitrary --

In the Specification

Column 10, Line 35: Delete "(ii);" and insert -- (ii)) --

Column 15, Line 39: Delete "β" and insert -- t3 --

Column 17, Line 15: Delete "t4;" and insert -- t4 --

Column 17, Line 24: Delete "(i)" and insert -- (i), --

Column 17, Line 30: Delete "(i)" and insert -- (i), --

Column 17, Line 39: Delete " $t1(t3')=(t2-t4)+(t2-t5)+(t3-t4)+(t3-t5)$ " and insert -- $\Sigma t1(t3')=(t2-t4)+(t2-t5)+(t3-t4)+(t3-t5)$ --

Column 18, Line 1: Delete "(ii)" and insert -- (ii), --

Column 18, Line 4: Delete "(ii)" and insert -- (ii), --

Column 18, Line 46: Delete "$t1(t5)=16.2715$" and insert -- $\Sigma t1(t5)=16.2715$ --

Column 19, Line 15 (Approx.): Delete "p" and insert -- β --

Column 21, Line 36: Delete "(II)" and insert -- (ii) --

Column 22, Line 8: Delete "(i)" and insert -- (iii) --

Signed and Sealed this
Second Day of December, 2014

Michelle K. Lee
*Deputy Director of the United States Patent and Trademark Office*

CERTIFICATE OF CORRECTION (continued)
U.S. Pat. No. 8,705,864 B2

Column 22, Line 58: Delete "(IV)" and insert -- (iv) --

Column 25, Line 52: Delete "(ii)" and insert -- (ii), --

Column 25, Line 56: Delete "(ii)" and insert -- (ii), --

Column 29, Line 29: Delete "(ii)"Selecting" and insert -- (ii) "Selecting --

Column 37, Line 60: Delete "(ii)" and insert -- (ii), --

Column 37, Line 66: Delete "flow chart" and insert -- flowchart --

Column 45, Line 16: Delete "12040" and insert -- 120 --

Column 46, Line 65: Delete "11030" and insert -- 110 --

Column 47, Line 5: Delete "12040" and insert -- 120 --

Column 53, Line 17: Delete "Generation" and insert -- generation --

In the Claims

Column 57, Line 16: Claim 7, before "to" delete "selects"